(12) United States Patent
Mathur et al.

(10) Patent No.: US 11,170,565 B2
(45) Date of Patent: Nov. 9, 2021

(54) SPATIALLY-RESOLVED DYNAMIC DIMMING FOR AUGMENTED REALITY DEVICE

(71) Applicant: Magic Leap, Inc., Plantation, FL (US)

(72) Inventors: Vaibhav Mathur, Weston, FL (US); David Manly, Miami, FL (US); Jahja I. Trisnadi, Cupertino, CA (US); Clinton Carlisle, Parkland, FL (US); Lionel Ernest Edwin, Plantation, FL (US); Michael Anthony Klug, Austin, TX (US)

(73) Assignee: Magic Leap, Inc., Plantation, FL (US)

(*) Notice: Subject to any disclaimer, the term of this patent is extended or adjusted under 35 U.S.C. 154(b) by 0 days.

(21) Appl. No.: 16/557,706

(22) Filed: Aug. 30, 2019

(65) Prior Publication Data

US 2020/0074724 A1 Mar. 5, 2020

Related U.S. Application Data

(60) Provisional application No. 62/858,252, filed on Jun. 6, 2019, provisional application No. 62/725,993, filed on Aug. 31, 2018.

(51) Int. Cl.
*G06T 15/50* (2011.01)
*G06F 3/01* (2006.01)
(Continued)

(52) U.S. Cl.
CPC ........ *G06T 15/506* (2013.01); *G02B 27/0172* (2013.01); *G06F 3/013* (2013.01);
(Continued)

(58) Field of Classification Search
None
See application file for complete search history.

(56) References Cited

U.S. PATENT DOCUMENTS 3,632,865 A 1/1972 Haskell et al.
4,204,742 A 5/1980 Johnson et al.
(Continued)

FOREIGN PATENT DOCUMENTS

EP 2649485 A1 10/2013
JP 2006293604 A 10/2006
(Continued)

OTHER PUBLICATIONS

Aronoff, et al., "Collaborative Augmented Reality for Better Standards", Complex Systems Concurrent Engineering, Available online at: http://www.nist.gov/customcf/get_pdf.cfm?pub_id-32632, Apr. 16, 2014, pp. 479-486.
(Continued)

*Primary Examiner* — Frank S Chen
(74) *Attorney, Agent, or Firm* — Kilpatrick Townsend & Stockton LLP

(57) ABSTRACT

Techniques are described for operating an optical system. In some embodiments, light associated with a world object is received at the optical system. Virtual image light is projected onto an eyepiece of the optical system. A portion of a system field of view of the optical system to be at least partially dimmed is determined based on information detected by the optical system. A plurality of spatially-resolved dimming values for the portion of the system field of view may be determined based on the detected information. The detected information may include light information, gaze information, and/or image information. A dimmer of the optical system may be adjusted to reduce an intensity of light associated with the world object in the portion of the system field of view according to the plurality of dimming values.

13 Claims, 39 Drawing Sheets

(51) Int. Cl.
*G06T 15/80* (2011.01)
*G02B 27/01* (2006.01)

(52) U.S. Cl.
CPC ...... *G06T 15/80* (2013.01); *G02B 2027/0118* (2013.01); *G02B 2027/0178* (2013.01); *G06T 2215/16* (2013.01)

(56) References Cited

U.S. PATENT DOCUMENTS

| | | |
|---|---|---|
| 4,984,179 A | 1/1991 | Waldern |
| 5,138,555 A | 8/1992 | Albrecht |
| 5,271,093 A | 12/1993 | Hata et al. |
| 5,311,879 A | 5/1994 | Yamada et al. |
| 5,311,897 A | 5/1994 | Greer |
| 5,422,653 A | 6/1995 | Maguire, Jr. |
| 5,526,042 A | 6/1996 | Ozawa et al. |
| 5,742,264 A | 4/1998 | Inagaki et al. |
| 5,933,125 A | 8/1999 | Fernie et al. |
| 6,011,526 A | 1/2000 | Toyoshima et al. |
| 6,151,179 A | 11/2000 | Poss |
| 6,441,811 B1 | 8/2002 | Sawada et al. |
| 6,917,370 B2 | 7/2005 | Benton |
| 6,947,219 B1 | 9/2005 | Ou |
| 7,023,536 B2 | 4/2006 | Zhang et al. |
| 7,038,846 B2 | 5/2006 | Mandella |
| 7,088,440 B2 | 8/2006 | Buermann et al. |
| 7,110,100 B2 | 9/2006 | Buermann et al. |
| 7,113,270 B2 | 9/2006 | Buermann et al. |
| 7,161,664 B2 | 1/2007 | Buermann et al. |
| 7,203,384 B2 | 4/2007 | Carl |
| 7,268,956 B2 | 9/2007 | Mandella |
| 7,386,799 B1 | 6/2008 | Clanton et al. |
| 7,474,809 B2 | 1/2009 | Carl et al. |
| 7,729,515 B2 | 6/2010 | Mandella et al. |
| 7,758,185 B2 | 7/2010 | Lewis |
| 7,826,641 B2 | 11/2010 | Mandella et al. |
| 7,961,909 B2 | 6/2011 | Mandella et al. |
| 8,223,024 B1 | 7/2012 | Petrou |
| 8,508,830 B1 | 8/2013 | Wang |
| 8,542,219 B2 | 9/2013 | Carl et al. |
| 8,553,935 B2 | 10/2013 | Mandella et al. |
| 8,696,113 B2 | 4/2014 | Lewis |
| 8,730,129 B2 | 5/2014 | Solomon |
| 8,757,812 B2 | 6/2014 | Melville et al. |
| 8,831,278 B2 | 9/2014 | Fedorovskaya et al. |
| 8,832,233 B1 | 9/2014 | Brin et al. |
| 8,879,155 B1 | 11/2014 | Teller |
| 8,897,494 B2 | 11/2014 | Mandella et al. |
| 8,970,709 B2 | 3/2015 | Gonzalez-Banos et al. |
| 9,189,856 B1 | 11/2015 | Gonzalez-Banos et al. |
| 9,229,540 B2 | 1/2016 | Mandella et al. |
| 9,235,934 B2 | 1/2016 | Mandella et al. |
| 9,239,473 B2 | 1/2016 | Lewis |
| 10,185,147 B2 | 1/2019 | Lewis |
| 2001/0035870 A1 | 11/2001 | Takeuchi et al. |
| 2003/0014212 A1 | 1/2003 | Ralston et al. |
| 2003/0137449 A1 | 7/2003 | Vashisth et al. |
| 2003/0156253 A1 | 8/2003 | Watanabe et al. |
| 2003/0158654 A1 | 8/2003 | Morita |
| 2004/0119715 A1 | 6/2004 | Everett et al. |
| 2004/0130520 A1 | 7/2004 | Maeda et al. |
| 2004/0178894 A1 | 9/2004 | Janssen |
| 2004/0258314 A1 | 12/2004 | Hashimoto |
| 2005/0046953 A1 | 3/2005 | Repetto et al. |
| 2005/0110732 A1 | 5/2005 | Kim |
| 2005/0148388 A1 | 7/2005 | Vayra et al. |
| 2005/0248852 A1 | 11/2005 | Yamasaki |
| 2005/0253055 A1 | 11/2005 | Sprague et al. |
| 2005/0254135 A1 | 11/2005 | Ou |
| 2006/0007056 A1 | 1/2006 | Ou |
| 2006/0105838 A1 | 5/2006 | Mullen |
| 2006/0109280 A1 | 5/2006 | Dawson |
| 2006/0132915 A1 | 6/2006 | Yang et al. |
| 2006/0214911 A1 | 9/2006 | Miller |
| 2006/0226231 A1 | 10/2006 | Johnston et al. |
| 2006/0227151 A1 | 10/2006 | Bannai |
| 2006/0256110 A1 | 11/2006 | Okuno et al. |
| 2006/0267889 A1 | 11/2006 | Kimura |
| 2006/0284791 A1 | 12/2006 | Chen et al. |
| 2007/0086668 A1 | 4/2007 | Ackley et al. |
| 2008/0005702 A1 | 1/2008 | Skourup et al. |
| 2008/0058629 A1 | 3/2008 | Seibel et al. |
| 2008/0059578 A1 | 3/2008 | Albertson et al. |
| 2008/0062131 A1 | 3/2008 | Chan et al. |
| 2008/0071559 A1 | 3/2008 | Arrasvuori |
| 2008/0186255 A1 | 8/2008 | Cohen et al. |
| 2008/0199049 A1 | 8/2008 | Daly |
| 2008/0215974 A1 | 9/2008 | Harrison et al. |
| 2008/0215975 A1 | 9/2008 | Harrison et al. |
| 2008/0215994 A1 | 9/2008 | Harrison et al. |
| 2008/0276178 A1 | 11/2008 | Fadell et al. |
| 2008/0278480 A1 | 11/2008 | Katano |
| 2009/0003662 A1 | 1/2009 | Joseph et al. |
| 2009/0066690 A1 | 3/2009 | Harrison |
| 2009/0089685 A1 | 4/2009 | Mordecai et al. |
| 2009/0147331 A1 | 6/2009 | Ashkenazi |
| 2009/0164916 A1 | 6/2009 | Jeong et al. |
| 2009/0177042 A1 | 7/2009 | Johnston |
| 2009/0187389 A1 | 7/2009 | Dobbins et al. |
| 2009/0213114 A1 | 8/2009 | Dobbins et al. |
| 2009/0222424 A1 | 9/2009 | Van |
| 2009/0225001 A1 | 9/2009 | Biocca et al. |
| 2009/0285484 A1 | 11/2009 | Mallinson et al. |
| 2009/0293012 A1 | 11/2009 | Alter et al. |
| 2009/0316116 A1 | 12/2009 | Melville et al. |
| 2009/0322671 A1 | 12/2009 | Scott et al. |
| 2010/0020216 A1 | 1/2010 | Christian et al. |
| 2010/0060647 A1 | 3/2010 | Brown et al. |
| 2010/0085462 A1 | 4/2010 | Sako et al. |
| 2010/0110368 A1 | 5/2010 | Chaum |
| 2010/0137684 A1 | 6/2010 | Shibasaki et al. |
| 2010/0141555 A1 | 6/2010 | Rorberg et al. |
| 2010/0149073 A1 | 6/2010 | Chaum et al. |
| 2010/0197390 A1 | 8/2010 | Craig et al. |
| 2010/0260426 A1 | 10/2010 | Huang et al. |
| 2010/0287500 A1 | 11/2010 | Whitlow et al. |
| 2011/0075902 A1 | 3/2011 | Song et al. |
| 2011/0096337 A1 | 4/2011 | Hirose et al. |
| 2011/0227812 A1 | 9/2011 | Haddick et al. |
| 2011/0234879 A1 | 9/2011 | Kashitani |
| 2011/0246908 A1 | 10/2011 | Akram et al. |
| 2011/0267361 A1 | 11/2011 | Kurozuka |
| 2011/0313653 A1 | 12/2011 | Lindner |
| 2012/0050140 A1 | 3/2012 | Border et al. |
| 2012/0068913 A1 | 3/2012 | Bar-Zeev et al. |
| 2012/0086728 A1 | 4/2012 | McArdle et al. |
| 2012/0087580 A1 | 4/2012 | Woo et al. |
| 2012/0089949 A1 | 4/2012 | Chen et al. |
| 2012/0092328 A1 | 4/2012 | Flaks et al. |
| 2012/0113092 A1 | 5/2012 | Bar-Zeev et al. |
| 2012/0120103 A1 | 5/2012 | Border et al. |
| 2012/0127062 A1 | 5/2012 | Bar-Zeev et al. |
| 2012/0127136 A1 | 5/2012 | Schneider et al. |
| 2012/0127284 A1 | 5/2012 | Bar-Zeev et al. |
| 2012/0154277 A1 | 6/2012 | Bar-Zeev et al. |
| 2012/0154557 A1 | 6/2012 | Perez et al. |
| 2012/0169752 A1 | 7/2012 | Kurozuka |
| 2012/0182313 A1 | 7/2012 | Ahn et al. |
| 2012/0183137 A1 | 7/2012 | Laughlin |
| 2012/0188148 A1 | 7/2012 | Dejong |
| 2012/0194554 A1 | 8/2012 | Kaino et al. |
| 2012/0200600 A1 | 8/2012 | Demaine |
| 2012/0206452 A1 | 8/2012 | Geisner et al. |
| 2012/0212399 A1 | 8/2012 | Border et al. |
| 2012/0218301 A1 | 8/2012 | Miller |
| 2012/0236262 A1 | 9/2012 | Johansson |
| 2012/0242560 A1 | 9/2012 | Nakada et al. |
| 2012/0244939 A1 | 9/2012 | Braun |
| 2012/0249586 A1 | 10/2012 | Wither et al. |
| 2012/0249797 A1 | 10/2012 | Haddick et al. |
| 2012/0327116 A1 | 12/2012 | Liu et al. |
| 2013/0021373 A1 | 1/2013 | Vaught et al. |
| 2013/0042296 A1 | 2/2013 | Hastings et al. |
| 2013/0044128 A1 | 2/2013 | Liu et al. |

(56) References Cited

U.S. PATENT DOCUMENTS

| | | |
|---|---|---|
| 2013/0050186 A1 | 2/2013 | Large et al. |
| 2013/0050258 A1 | 2/2013 | Liu et al. |
| 2013/0050260 A1 | 2/2013 | Reitan |
| 2013/0050432 A1 | 2/2013 | Perez et al. |
| 2013/0050642 A1 | 2/2013 | Lewis et al. |
| 2013/0083011 A1 | 4/2013 | Geisner et al. |
| 2013/0083173 A1 | 4/2013 | Geisner et al. |
| 2013/0093788 A1 | 4/2013 | Liu et al. |
| 2013/0117377 A1 | 5/2013 | Miller |
| 2013/0120224 A1 | 5/2013 | Cajigas et al. |
| 2013/0120706 A1 | 5/2013 | Kakinuma et al. |
| 2013/0141419 A1 | 6/2013 | Mount et al. |
| 2013/0156266 A1 | 6/2013 | Horii |
| 2013/0194164 A1 | 8/2013 | Sugden et al. |
| 2013/0208014 A1 | 8/2013 | Fleck et al. |
| 2013/0215230 A1 | 8/2013 | Miesnieks et al. |
| 2013/0249946 A1 | 9/2013 | Kimura |
| 2013/0257748 A1 | 10/2013 | Ambrus et al. |
| 2013/0286004 A1 | 10/2013 | McCulloch et al. |
| 2013/0293468 A1 | 11/2013 | Perez et al. |
| 2013/0307875 A1 | 11/2013 | Anderson |
| 2013/0342564 A1 | 12/2013 | Kinnebrew et al. |
| 2013/0342569 A1 | 12/2013 | Karkkainen et al. |
| 2013/0342571 A1 | 12/2013 | Kinnebrew et al. |
| 2014/0002496 A1 | 1/2014 | Lamb et al. |
| 2014/0064557 A1 | 3/2014 | Hara et al. |
| 2014/0071163 A1 | 3/2014 | Kinnebrew et al. |
| 2014/0098137 A1 | 4/2014 | Fein et al. |
| 2014/0098425 A1 | 4/2014 | Schoen et al. |
| 2014/0118829 A1 | 5/2014 | Ma et al. |
| 2014/0132484 A1 | 5/2014 | Pandey et al. |
| 2014/0139551 A1 | 5/2014 | McCulloch et al. |
| 2014/0145997 A1 | 5/2014 | Tiruvuru |
| 2014/0178029 A1 | 6/2014 | Raheman et al. |
| 2014/0192085 A1 | 7/2014 | Kim |
| 2014/0204077 A1 | 7/2014 | Kamuda et al. |
| 2014/0218361 A1 | 8/2014 | Abe et al. |
| 2014/0222432 A1 | 8/2014 | Ahn et al. |
| 2014/0267402 A1 | 9/2014 | Hing et al. |
| 2014/0354685 A1 | 12/2014 | Lazarow et al. |
| 2014/0368532 A1 | 12/2014 | Keane et al. |
| 2015/0097865 A1 | 4/2015 | Subramanian et al. |
| 2015/0205126 A1 | 7/2015 | Schowengerdt |
| 2015/0254793 A1 | 9/2015 | Hastings et al. |
| 2015/0301356 A1 | 10/2015 | Tabirian et al. |
| 2016/0055822 A1 | 2/2016 | Bell |
| 2016/0063706 A1 | 3/2016 | Gonzalez-Banos et al. |
| 2016/0093106 A1 | 3/2016 | Black |
| 2016/0179336 A1 | 6/2016 | Ambrus et al. |
| 2016/0327798 A1 | 11/2016 | Xiao |
| 2017/0168307 A1 | 6/2017 | Itani |
| 2018/0053284 A1 | 2/2018 | Rodriguez et al. |
| 2018/0180890 A1 | 6/2018 | Baerenrodt et al. |
| 2018/0188528 A1 | 7/2018 | Browy et al. |
| 2018/0356639 A1 | 12/2018 | Schaefer et al. |
| 2019/0088021 A1* | 3/2019 | Tanaka ................ G02B 27/017 |
| 2020/0058256 A1* | 2/2020 | Seibert .................... G06F 3/013 |

FOREIGN PATENT DOCUMENTS

| | | |
|---|---|---|
| JP | 2011175439 A | 9/2011 |
| WO | 2012020527 A1 | 2/2012 |
| WO | 2012078410 A1 | 6/2012 |

OTHER PUBLICATIONS

Freeman, et al., "Scanned Laser Pico-Projectors: Seeing the Big Picture with a Small Device", Optics and Photonics News, vol. 20, Issue 5, Available Online at: http://www.microvision.com/wp-contenUuploads/2014/07 /OPN_Article.pdf>, May 2009, pp. 28-34.

PCT/US2019/049176, "International Search Report and Written Opinion", dated Nov. 14, 2019, 8 pages.

Roscher, et al., "Low-Cost Projection Device With A 2D Resonant Microscanning Mirror", MOEMS Display and Imaging Systems II, Proceedings of SPIE vol. 5348, Jan. 24, 2004, pp. 22-31.

U.S. Appl. No. 16/158,041, "Non-Final Office Action", dated Apr. 28, 2020, 9 pages.

PCT/US2020/013130, "International Search Report and Written Opinion", dated May 22, 2020, 15 pages.

Azuma, "A Survey of Augmented Reality", In Presence: Teleoperators and Virtual Environment 6, Aug. 4, 1997, 48 pages.

Bimber, et al., "Spatial Augmented Reality", Merging Real and Virtual Worlds, 2005, 393 pages.

U.S. Appl. No. 16/158,041, "Non-Final Office Action", dated Mar. 8, 2021, 10 pages.

Chen et al., "Electrically Adjustable Location of a Projected Image in Augmented Reality via a Liquid-crystal Lens", Optics Express, vol. 23, No. 22, Nov. 2015, pp. 28154-28162.

EP18818480.8, "Extended European Search Report", dated Feb. 23, 2021, 7 pages.

PCT/US2019/049176, "International Preliminary Report on Patentability", dated Mar. 11, 2021, 7 pages.

* cited by examiner

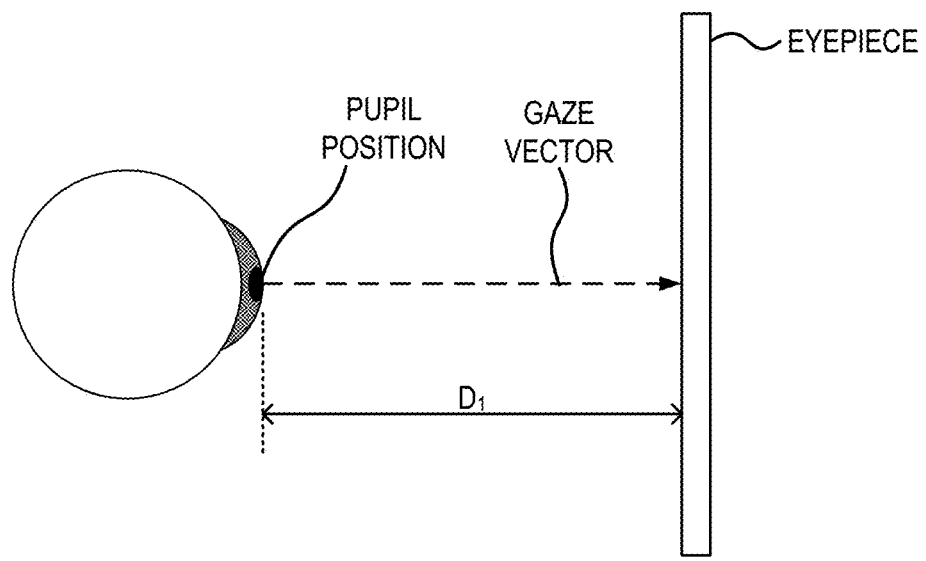
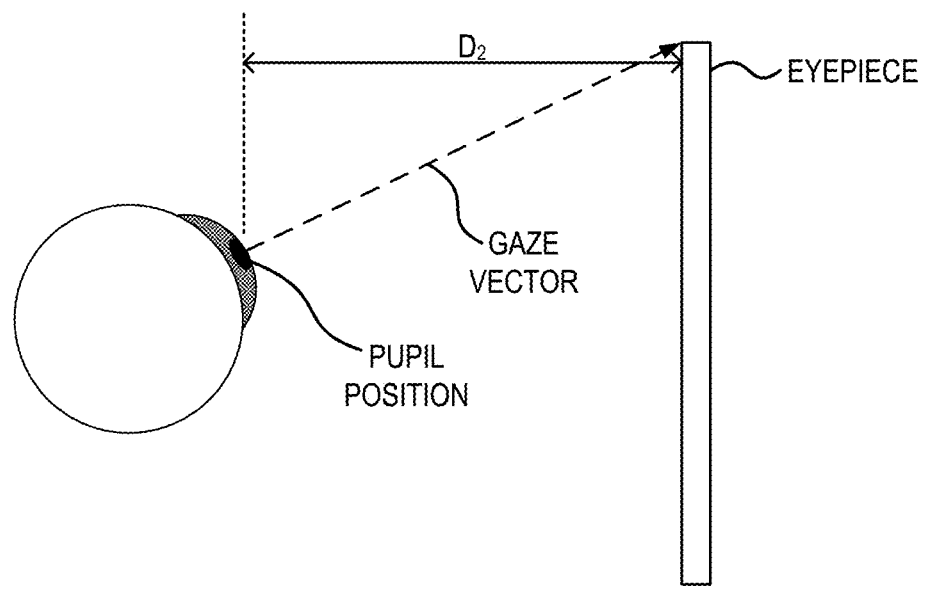
FIG. 6

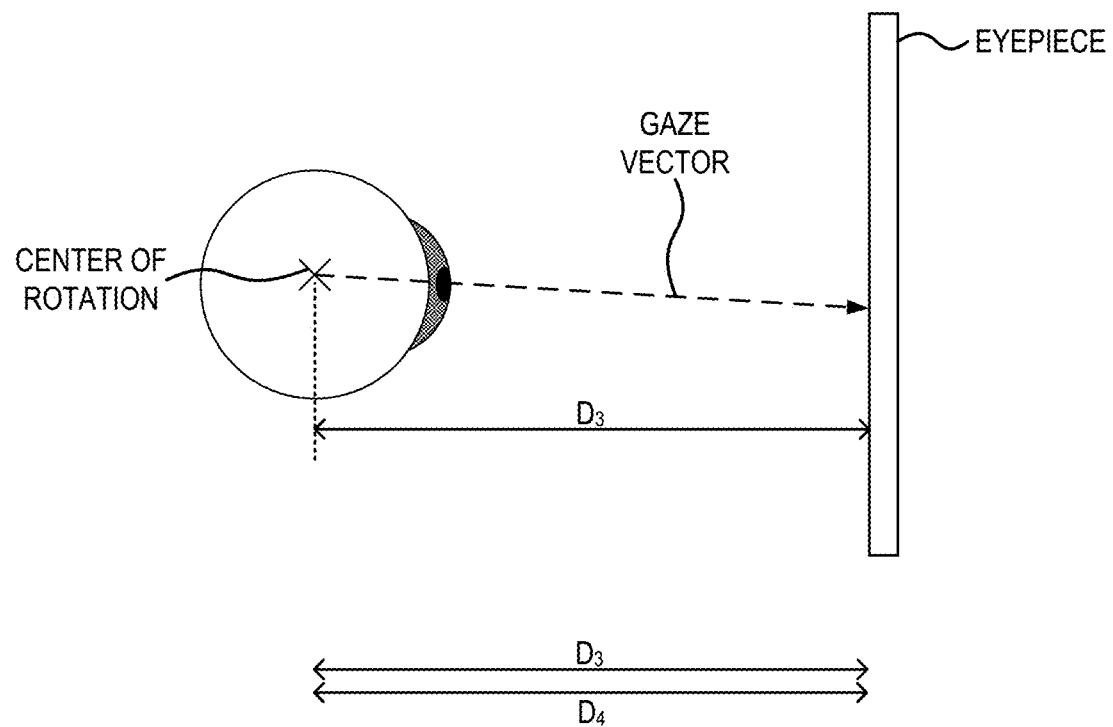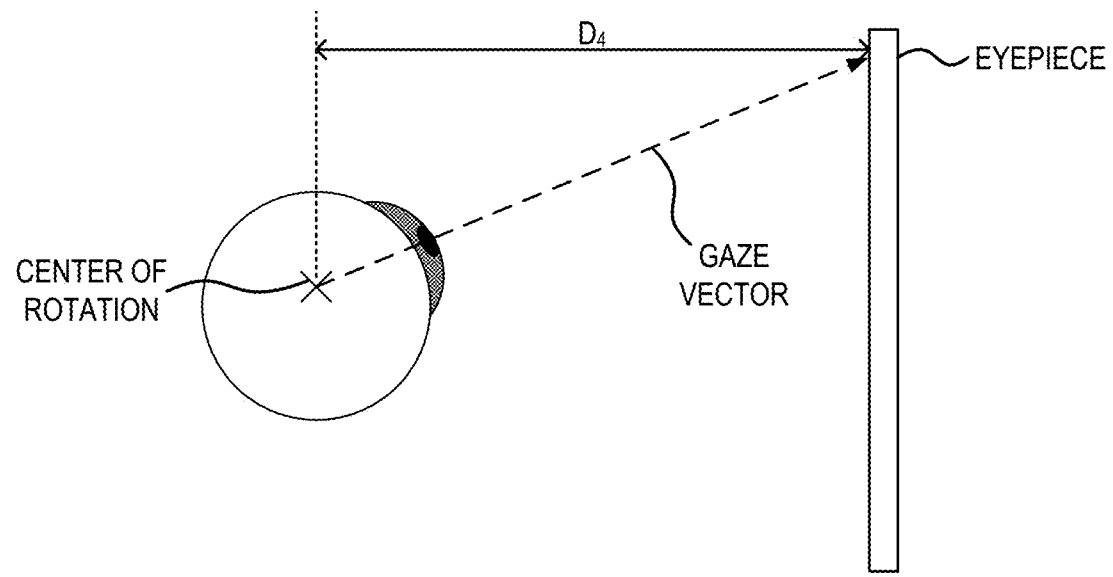
FIG. 7

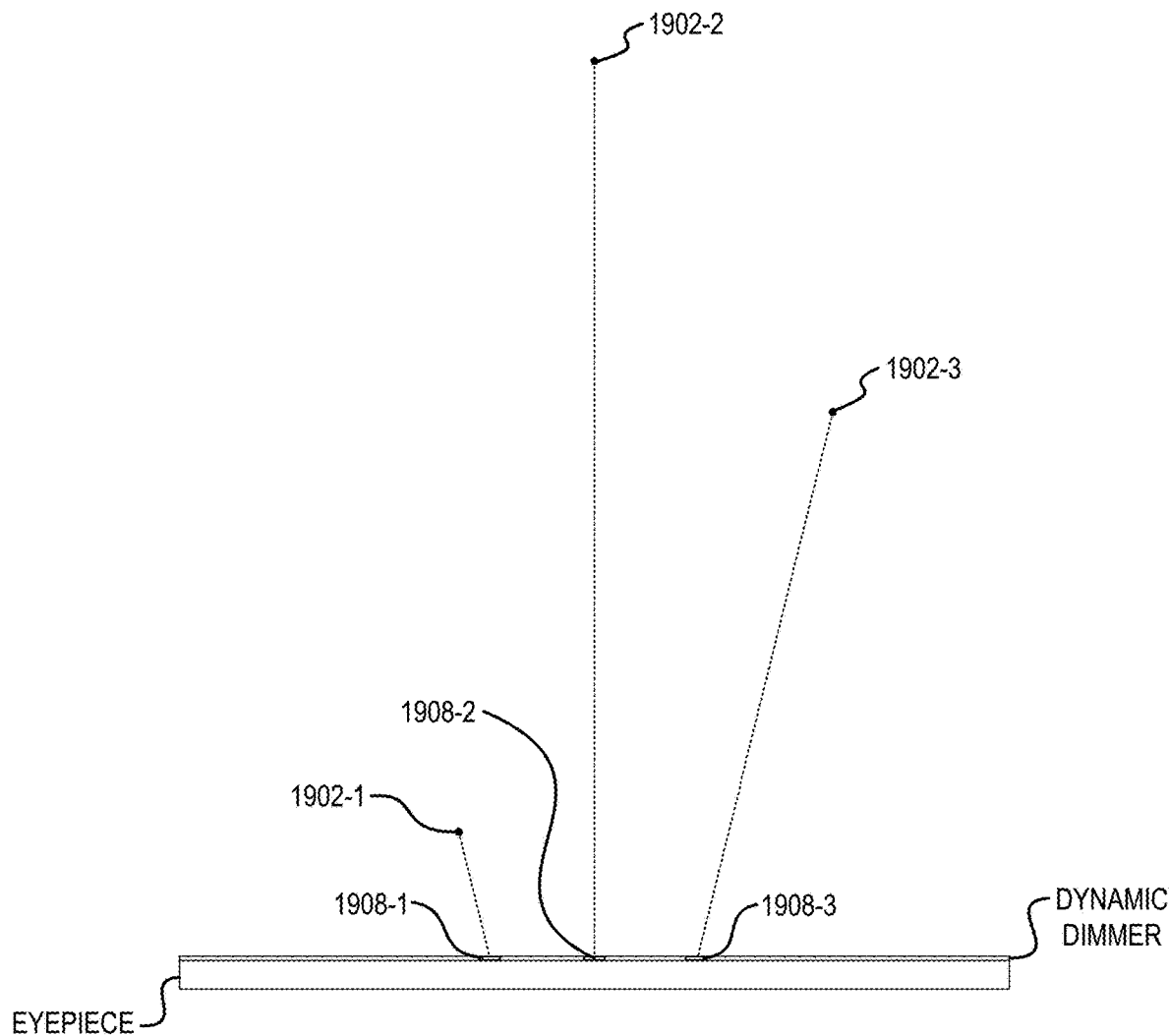
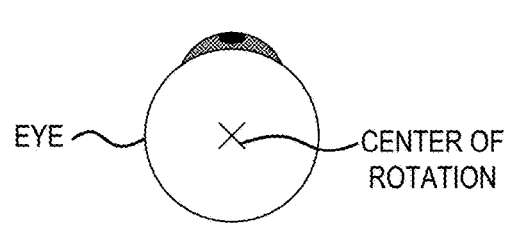
FIG. 19B

SPATIALLY-RESOLVED DYNAMIC DIMMING FOR AUGMENTED REALITY DEVICE

CROSS-REFERENCES TO RELATED APPLICATIONS

This application claims the benefit of priority to U.S. Provisional Patent Application No. 62/725,993, filed Aug. 31, 2018, entitled "SPATIALLY-RESOLVED DYNAMIC DIMMING FOR AUGMENTED REALITY DEVICE," and U.S. Provisional Patent Application No. 62/858,252 filed Jun. 6, 2019, entitled "SPATIALLY-RESOLVED DYNAMIC DIMMING FOR AUGMENTED REALITY DEVICE," the contents of which are herein incorporated in their entirety.

BACKGROUND OF THE INVENTION

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR," scenario typically involves presentation of digital or virtual image information without transparency to other actual real-world visual input; an augmented reality, or "AR," scenario typically involves presentation of digital or virtual image information as an augmentation to visualization of the actual world around the user.

Despite the progress made in these display technologies, there is a need in the art for improved methods, systems, and devices related to augmented reality systems, particularly, display systems.

SUMMARY OF THE INVENTION

The present disclosure relates generally to techniques for improving optical systems in varying ambient light conditions. More particularly, embodiments of the present disclosure provide systems and methods for operating an augmented reality (AR) device comprising a dimming element. Although the present invention is described in reference to an AR device, the disclosure is applicable to a variety of applications in computer vision and image display systems.

A summary of the invention is provided below in reference to several examples. As used below, any reference to a series of examples is to be understood as a reference to each of those examples disjunctively (e.g., "Examples 1-4" is to be understood as "Examples 1, 2, 3, or 4").

Example 1 is a method of operating an optical system, the method comprising: receiving, at the optical system, light associated with a world object; projecting virtual image light onto an eyepiece; determining a portion of a system field of view of the optical system to be at least partially dimmed based on information detected by the optical system; and adjusting a dimmer to reduce an intensity of the light associated with the world object in the portion of the system field of view.

Example 2 is the method of example(s) 1, wherein the optical system comprises a light sensor configured to detect light information corresponding to the light associated with the world object, wherein the detected information includes the light information.

Example 3 is the method of example(s) 1-2, wherein the light information includes a plurality of spatially-resolved light values.

Example 4 is the method of example(s) 1-3, wherein the light information includes a global light value.

Example 5 is the method of example(s) 1-4, wherein the optical system comprises an eye tracker configured to detect gaze information corresponding to an eye of a user of the optical system, wherein the detected information includes the gaze information.

Example 6 is the method of example(s) 1-5, wherein the gaze information includes a pixel location that intersects with a gaze vector of the eye of the user.

Example 7 is the method of example(s) 1-6, wherein the gaze information includes one or more of a pupil position of the eye of the user, a center of rotation of the eye of the user, a pupil size of the eye of the user, a pupil diameter of the eye of the user, and cone and rod locations of the eye of the user.

Example 8 is the method of example(s) 1-7, further comprising: detecting image information corresponding to the virtual image light, wherein the detected information includes the image information.

Example 9 is the method of example(s) 1-8, wherein the image information includes a plurality of spatially-resolved image brightness values.

Example 10 is the method of example(s) 1-9, wherein the image information includes a global image brightness value.

Example 11 is the method of example(s) 1-10, further comprising: determining a plurality of spatially-resolved dimming values for the portion of the system field of view based on the detected information, wherein the dimmer is adjusted according to the plurality of dimming values.

Example 12 is the method of example(s) 1-11, wherein the dimmer comprises a plurality of pixels.

Example 13 is the method of example(s) 1-12, wherein the dimmer is adjusted to completely block the intensity of the light associated with the world object in all of the system field of view.

Example 14 is the method of example(s) 1-13, further comprising: adjusting a brightness associated with the virtual image light.

Example 15 is the method of example(s) 1-14, wherein the virtual image light is characterized by an image field of view, and wherein the image field of view is equal to the system field of view.

Example 16 is the method of example(s) 1-15, wherein determining a portion of a system field of view of the optical system to be at least partially dimmed is based at least partly on the at least one world object.

Example 17 is the method of example(s) 1-16, wherein determining a portion of a system field of view of the optical system to be at least partially dimmed is based at least partly on at least one object included in the virtual image.

Example 18 is a non-transitory computer-readable medium comprising instructions that, when executed by a processor, cause the processor to perform operations comprising: receiving, at an optical system, light associated with a world object; projecting virtual image light onto an eyepiece; determining a portion of a system field of view of the optical system to be at least partially dimmed based on information detected by the optical system; and adjusting a dimmer to reduce an intensity of the light associated with the world object in the portion of the system field of view.

Example 19 is the non-transitory computer-readable medium of example(s) 18, wherein the optical system comprises a light sensor configured to detect light information corresponding to the light associated with the world object, wherein the detected information includes the light information.

Example 20 is the non-transitory computer-readable medium of example(s) 19, wherein the light information includes a plurality of spatially-resolved light values.

Example 21 is the non-transitory computer-readable medium of example(s) 19, wherein the light information includes a global light value.

Example 22 is the non-transitory computer-readable medium of example(s) 18, wherein the optical system comprises an eye tracker configured to detect gaze information corresponding to an eye of a user of the optical system, wherein the detected information includes the gaze information.

Example 23 is the non-transitory computer-readable medium of example(s) 22, wherein the gaze information includes a pixel location that intersects with a gaze vector of the eye of the user.

Example 24 is the non-transitory computer-readable medium of example(s) 22, wherein the gaze information includes one or more of a pupil position of the eye of the user, a center of rotation of the eye of the user, a pupil size of the eye of the user, a pupil diameter of the eye of the user, and cone and rod locations of the eye of the user.

Example 25 is the non-transitory computer-readable medium of example(s) 18, wherein the operations further comprise: detecting image information corresponding to the virtual image light, wherein the detected information includes the image information.

Example 26 is the non-transitory computer-readable medium of example(s) 25, wherein the image information includes a plurality of spatially-resolved image brightness values.

Example 27 is the non-transitory computer-readable medium of example(s) 25, wherein the image information includes a global image brightness value.

Example 28 is the non-transitory computer-readable medium of example(s) 18, wherein the operations further comprise: determining a plurality of spatially-resolved dimming values for the portion of the system field of view based on the detected information, wherein the dimmer is adjusted according to the plurality of dimming values.

Example 29 is the non-transitory computer-readable medium of example(s) 18, wherein the dimmer comprises a plurality of pixels.

Example 30 is the non-transitory computer-readable medium of example(s) 18, wherein the dimmer is adjusted to completely block the intensity of the light associated with the world object in all of the system field of view.

Example 31 is the non-transitory computer-readable medium of example(s) 18, wherein the operations further comprise: adjusting a brightness associated with the virtual image light.

Example 32 is the non-transitory computer-readable medium of example(s) 18, wherein the virtual image light is characterized by an image field of view, and wherein the image field of view is equal to the system field of view.

Example 33 is an optical system comprising: a projector configured to project virtual image light onto an eyepiece; a dimmer configured to dim light associated with a world object; a processor communicatively coupled to the projector and the dimmer, wherein the processor is configured to perform operations comprising: determining a portion of a system field of view of the optical system to be at least partially dimmed based on information detected by the optical system; and adjusting the dimmer to reduce an intensity of the light associated with the world object in the portion of the system field of view.

Example 34 is the optical system of example(s) 33, further comprising: a light sensor configured to detect light information corresponding to the light associated with the world object, wherein the detected information includes the light information.

Example 35 is the optical system of example(s) 34, wherein the light information includes a plurality of spatially-resolved light values.

Example 36 is the optical system of example(s) 34, wherein the light information includes a global light value.

Example 37 is the optical system of example(s) 33, further comprising: an eye tracker configured to detect gaze information corresponding to an eye of a user of the optical system, wherein the detected information includes the gaze information.

Example 38 is the optical system of example(s) 37, wherein the gaze information includes a pixel location that intersects with a gaze vector of the eye of the user.

Example 39 is the optical system of example(s) 37, wherein the gaze information includes one or more of a pupil position of the eye of the user, a center of rotation of the eye of the user, a pupil size of the eye of the user, a pupil diameter of the eye of the user, and cone and rod locations of the eye of the user.

Example 40 is the optical system of example(s) 33, wherein the operations further comprise: detecting image information corresponding to the virtual image light, wherein the detected information includes the image information.

Example 41 is the optical system of example(s) 40, wherein the image information includes a plurality of spatially-resolved image brightness values.

Example 42 is the optical system of example(s) 40, wherein the image information includes a global image brightness value.

Example 43 is the optical system of example(s) 33, wherein the operations further comprise: determining a plurality of spatially-resolved dimming values for the portion of the system field of view based on the detected information, wherein the dimmer is adjusted according to the plurality of dimming values.

Example 44 is the optical system of example(s) 33, wherein the dimmer comprises a plurality of pixels.

Example 45 is the optical system of example(s) 33, wherein the dimmer is adjusted to completely block the intensity of the light associated with the world object in all of the system field of view.

Example 46 is the optical system of example(s) 33, wherein the operations further comprise: adjusting a brightness associated with the virtual image light.

Example 47 is the optical system of example(s) 33, wherein the virtual image light is characterized by an image field of view, and wherein the image field of view is equal to the system field of view.

Example 48 is an optical system comprising: a frame configured to be worn about a head of a user of the optical system; a dimming component carried by the frame and configured to be positioned between an eye of the user and an environment of the user; an eye tracker configured to monitor a positioning of the eye of the user; and control circuitry communicatively coupled to the dimming component and the eye tracker, the control circuitry configured to: receive data from the eye tracker; determine, based on the data received from the eye tracker, a location along an optical axis of the eye of the user at which a particular anatomical region of the eye of the user is positioned; identify one or more points in three-dimensional space located within the environment of the user; and for each of the one or more identified points within the environment of the user: identify a set of one or more pixels of the dimming component based at least in part on the determined location of the particular anatomical region of the eye of the user and the respective point in three-dimensional space located within the environment of the user; and control the dimming component to dim the identified set of one or more pixels.

Example 49 is the optical system of example(s) 48, wherein the particular anatomical region of the eye of the user comprises a center of rotation of the eye of the user.

Example 50 is the optical system of example(s) 48, wherein the particular anatomical region of the eye of the user comprises a center of a pupil of the eye of the user.

Example 51 is the optical system of example(s) 48, further comprising: a projector configured to emit light representing virtual content; and a waveguide carried by the frame and configured to be positioned between the eye of the user and the dimming component, wherein the waveguide is configured to receive and direct light from the projector to the eye of the user.

Example 52 is the optical system of example(s) 51, wherein the control circuitry is communicatively coupled to the projector, the control circuitry further configured to control the projector to emit light representing one or more pixels of virtual content.

Example 53 is the optical system of example(s) 52, wherein the one or more points in three-dimensional space located within the environment of the user correspond to one or more locations in three-dimensional space at which the one or more pixels of virtual content are to be perceived by the user, respectively.

Example 54 is the optical system of example(s) 52, wherein the one or more pixels of virtual content comprise a plurality of pixels of a virtual object.

Example 55 is the optical system of example(s) 54, wherein the one or more points in three-dimensional space located within the environment of the user correspond to one or more locations in three-dimensional space at which one or more pixels of a virtual shadow associated with the virtual object is to be perceived by the user, respectively.

Example 56 is the optical system of example(s) 48, wherein the one or more points in three-dimensional space located within the environment of the user correspond to one or more points in three-dimensional space physically occupied by a real world object in the environment of the user.

Example 57 is the optical system of example(s) 48, wherein to identify the set of one or more pixels of the dimming component, the control circuitry is configured to: cast a set of one or more rays from the respective point in three-dimensional space located within the environment of the user to the determined location of the particular anatomical region of the eye of the user; and identify a set of one or more points of intersection between the set of one or more rays and the dimming component.

Example 58 is the optical system of example(s) 48, wherein the dimming component is curved in shape.

Example 59 is the optical system of example(s) 48, wherein the control circuitry is further configured to determine a set of one or more dimming values for the identified set of one or more pixels of the dimming component, respectively, and wherein the control circuitry is configured to control the dimming component to dim the identified set of one or more pixels in accordance with the determined set of one or more dimming values.

Example 60 is the optical system of example(s) 59, wherein the control circuitry is further configured to determine one or more characteristics of the eye of the user based on the data received from the eye tracker, and wherein the control circuitry is configured to determine the set of one or more dimming values for the identified set of one or more pixels of the dimming component, respectively, based at least in part on the one or more determined characteristics of the eye of the user.

Example 61 is the optical system of example(s) 60, wherein the one or more characteristics of the eye of the user include one or more of a pupil size of the eye of the user, a pupil diameter of the eye of the user, cone and rod locations of the eye of the user, and an accommodative state of a lens of the eye of the user.

Example 62 is the optical system of example(s) 61, wherein the control circuitry is configured to identify the set of one or more pixels of the dimming component based at least in part on the one or more determined characteristics of the eye of the user.

Example 63 is the optical system of example(s) 59 further comprising: a projector communicatively coupled to the control circuitry and configured to emit light representing virtual content; and a waveguide carried by the frame and configured to be positioned between the eye of the user and the dimming component, wherein the waveguide is configured to receive and direct light from the projector to the eye of the user, wherein the control circuitry is further configured to control the projector to emit light representing one or more pixels of virtual content at one or more levels of brightness, respectively, and wherein the control circuitry is configured to determine the set of one or more dimming values for the identified set of one or more pixels of the dimming component, respectively, based at least in part on the one or more levels of brightness of the one or more pixels of virtual content.

Example 64 is the optical system of example(s) 63, wherein the control circuitry is configured to determine the set of one or more dimming values for the identified set of one or more pixels of the dimming component, respectively, based at least in part on one or more of a predetermined contrast and a predetermined level of visibility specified for the virtual content.

Example 65 is the optical system of example(s) 63, wherein the virtual content comprises a virtual object, and wherein the control circuitry is configured to identify the set of one or more pixels of the dimming component based at least in part on one or more characteristics of the virtual object.

Example 66 is the optical system of example(s) 65, wherein the one or more characteristics of the virtual object include one or more of a size of the virtual object, a shape of the virtual object, a position in the environment of the user at which the virtual object is to be perceived by the user, and a depth at which the virtual object is to be perceived by the user.

Example 67 is the optical system of example(s) 59 further comprising: an optical sensor communicatively coupled to the control circuitry and configured to monitor one or more levels of brightness of light associated with one or more portions of the environment of the user, respectively, and wherein the control circuitry is configured to determine the set of one or more dimming values for the identified set of one or more pixels of the dimming component, respectively, based at least in part on the one or more levels of brightness associated with the one or more portions of the environment of the user.

Example 68 is the optical system of example(s) 67, wherein the optical sensor comprises a camera.

Example 69 is the optical system of example(s) 67, wherein the optical sensor comprises one or more photodiodes.

Example 70 is the optical system of example(s) 67 further comprising: a projector communicatively coupled to the control circuitry and configured to emit light representing virtual content; and a waveguide carried by the frame and configured to be positioned between the eye of the user and the dimming component, wherein the waveguide is configured to receive and direct light from the projector to the eye of the user, and wherein the control circuitry is further configured to control the projector to emit light representing one or more pixels of virtual content.

Example 71 is the optical system of example(s) 70, wherein the virtual content comprises a virtual object, and wherein the one or more portions of the environment of the user with which the one or more levels of brightness are associated include a particular portion of the environment of the user that is to be perceived by the user as occluded by the virtual object.

Example 72 is the optical system of example(s) 70, wherein the control circuitry is further configured to control the projector to emit light representing one or more pixels of virtual content based at least in part on the one or more levels of brightness associated with the one or more portions of the environment of the user.

Example 73 is the optical system of example(s) 48, wherein the eye tracker is configured to monitor the positioning of the eye of the user relative to the dimming component.

Example 74 is an optical system comprising: a frame configured to be worn about a head of a user of the optical system; a left dimming component carried by the frame and configured to be positioned between a left eye of the user and an environment of the user; a right dimming component carried by the frame and configured to be positioned between a right eye of the user and the environment of the user; and control circuitry communicatively coupled to the left and right dimming components, the control circuitry configured to: identify one or more points in three-dimensional space located within the environment of the user; and for each of the one or more identified points within the environment of the user: identify a set of one or more pixels of the left dimming component based at least in part on the respective point in three-dimensional space located within the environment of the user; identify a set of one or more pixels of the right dimming component based at least in part on the respective point in three-dimensional space located within the environment of the user; control the left dimming component to dim the identified set of one or more pixels of the left dimming component; and control the right dimming component to dim the identified set of one or more pixels of the right dimming component.

Example 75 is the optical system of example(s) 74 further comprising: a left eye tracker communicatively coupled to the control circuitry and configured to monitor a positioning of the left eye of the user; and a right eye tracker communicatively coupled to the control circuitry and configured to monitor a positioning of the left eye of the user; wherein the control circuitry is further configured to: receive data from the left and right eye trackers; determine, based on the data received from the left eye tracker, a location along an optical axis of the left eye of the user at which a particular anatomical region of the left eye of the user is positioned; and determine, based on the data received from the right eye tracker, a location along an optical axis of the right eye of the user at which a particular anatomical region of the right eye of the user is positioned;

Example 76 is the optical system of example(s) 75, wherein the control circuitry is configured to: identify the set of one or more pixels of the left dimming component based at least in part on the determined location of the particular anatomical region of the left eye of the user and the respective point in three-dimensional space located within the environment of the user; and identify the set of one or more pixels of the right dimming component based at least in part on the determined location of the particular anatomical region of the right eye of the user and the respective point in three-dimensional space located within the environment of the user.

Numerous benefits are achieved by way of the present disclosure over conventional techniques. For example, augmented reality (AR) devices described herein may be used in varying light levels, from dark indoors to bright outdoors, by globally dimming and/or selectively dimming the ambient light reaching the user's eyes. Embodiments of the present invention allow for AR and virtual reality (VR) capabilities in a single device by using the pixelated dimmer to attenuate the world light by greater than 99%. Embodiments of the present invention also mitigate vergence accommodation conflict using a variable focal element with discrete or continuous variable depth plane switching technologies. Embodiments of the present invention improve the battery life of the AR device by optimizing the projector brightness based on the amount of detected ambient light. Other benefits of the present disclosure will be readily apparent to those skilled in the art.

BRIEF DESCRIPTION OF THE DRAWINGS

FIG. 6 illustrates a technique for determining a gaze vector based on a pupil position of an eye of a user.

FIG. 7 illustrates a technique for determining a gaze vector based on a center of rotation of an eye of a user.

FIGS. 19A and 19B illustrate an approach for determining a portion of the system field of view to be dimmed based on image information.

DETAILED DESCRIPTION OF SPECIFIC EMBODIMENTS

An ongoing technical challenge with optical see through (OST) augmented reality (AR) devices is the variation in the opacity and/or visibility of the virtual content under varying ambient light conditions. The problem worsens in extreme lighting conditions such as a completely dark room or outside in full bright sunlight. Embodiments of the present invention solve these and other problems by dimming the world light at different spatial locations within the field of view of the AR device. The portion of the field of view to which dimming is applied and the amount of dimming that is applied are each determined based on various information detected by the AR device. This information may include detected ambient light, detected gaze information, and/or the detected brightness of the virtual content being projected. The functionality of the AR device is further improved by detecting a direction associated with the ambient light by, for example, detecting a plurality of spatially-resolved light values. This allows the AR device to improve its battery life by only dimming the portions of the field of view in which dimming is needed and/or increasing the projector brightness in certain portions of the field of view. Accordingly, embodiments of the present invention enable usage of the AR device in a much wider variety of conditions than traditionally possible.

Figure 1:
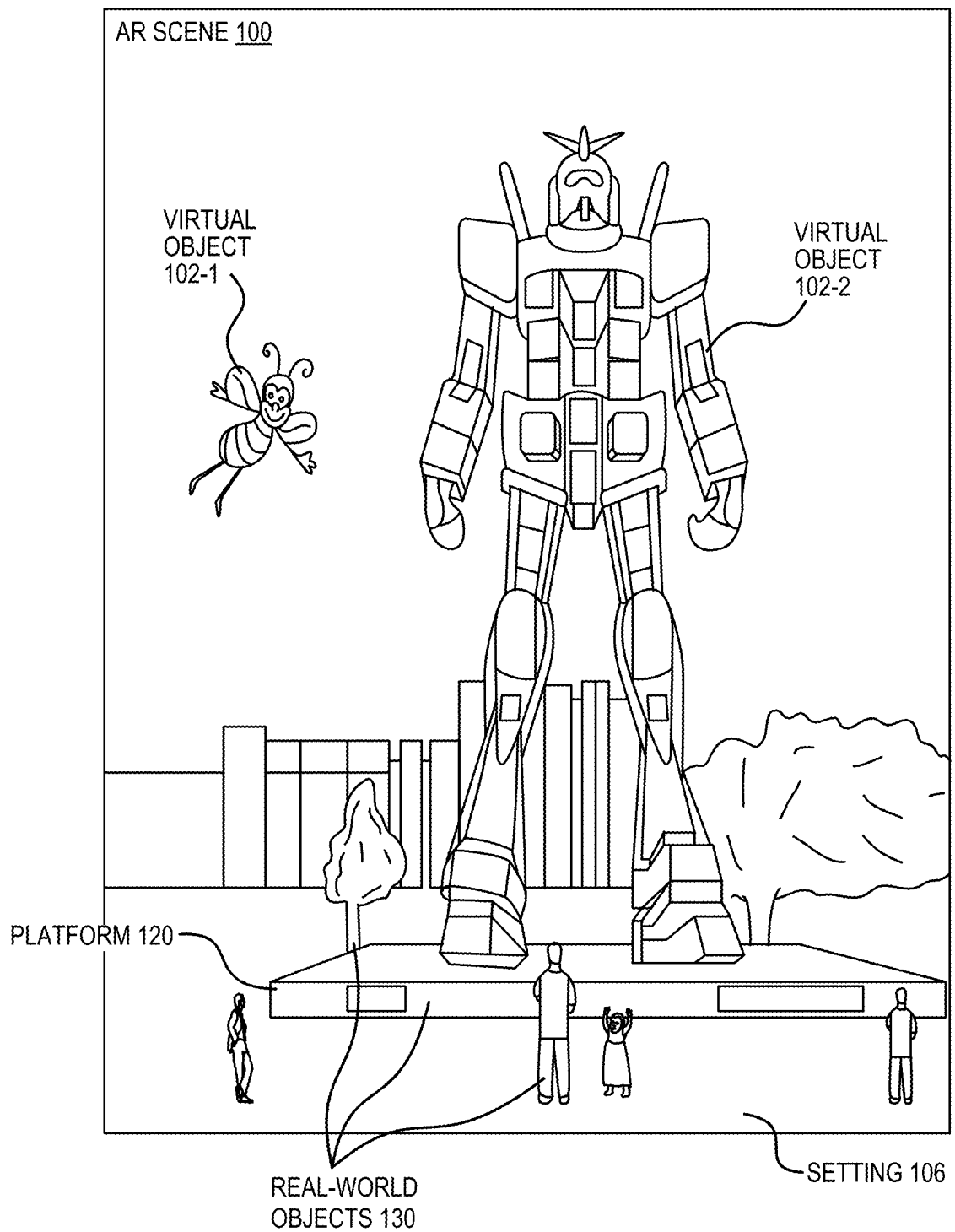
FIG. 1 illustrates an augmented reality (AR) scene as viewed through a wearable AR device according to some embodiments described herein.

FIG. 1 illustrates an AR scene 100 as viewed through a wearable AR device, according to some embodiments of the present invention. AR scene 100 is depicted wherein a user of an AR technology sees a real-world park-like setting 106 featuring various real-world objects 130 such as people, trees, buildings in the background, and a real-world concrete platform 120. In addition to these items, the user of the AR technology also perceives that they "see" various virtual objects 102 such as a robot statue 102-2 standing upon the real-world concrete platform 120, and a cartoon-like avatar character 102-1 flying by, which seems to be a personification of a bumble bee, even though these elements (character 102-1 and statue 102-2) do not exist in the real world. Due to the extreme complexity of the human visual perception and nervous system, it is challenging to produce a virtual reality (VR) or AR technology that facilitates a comfortable, natural-feeling, rich presentation of virtual image elements amongst other virtual or real-world imagery elements.

Figure 2A:
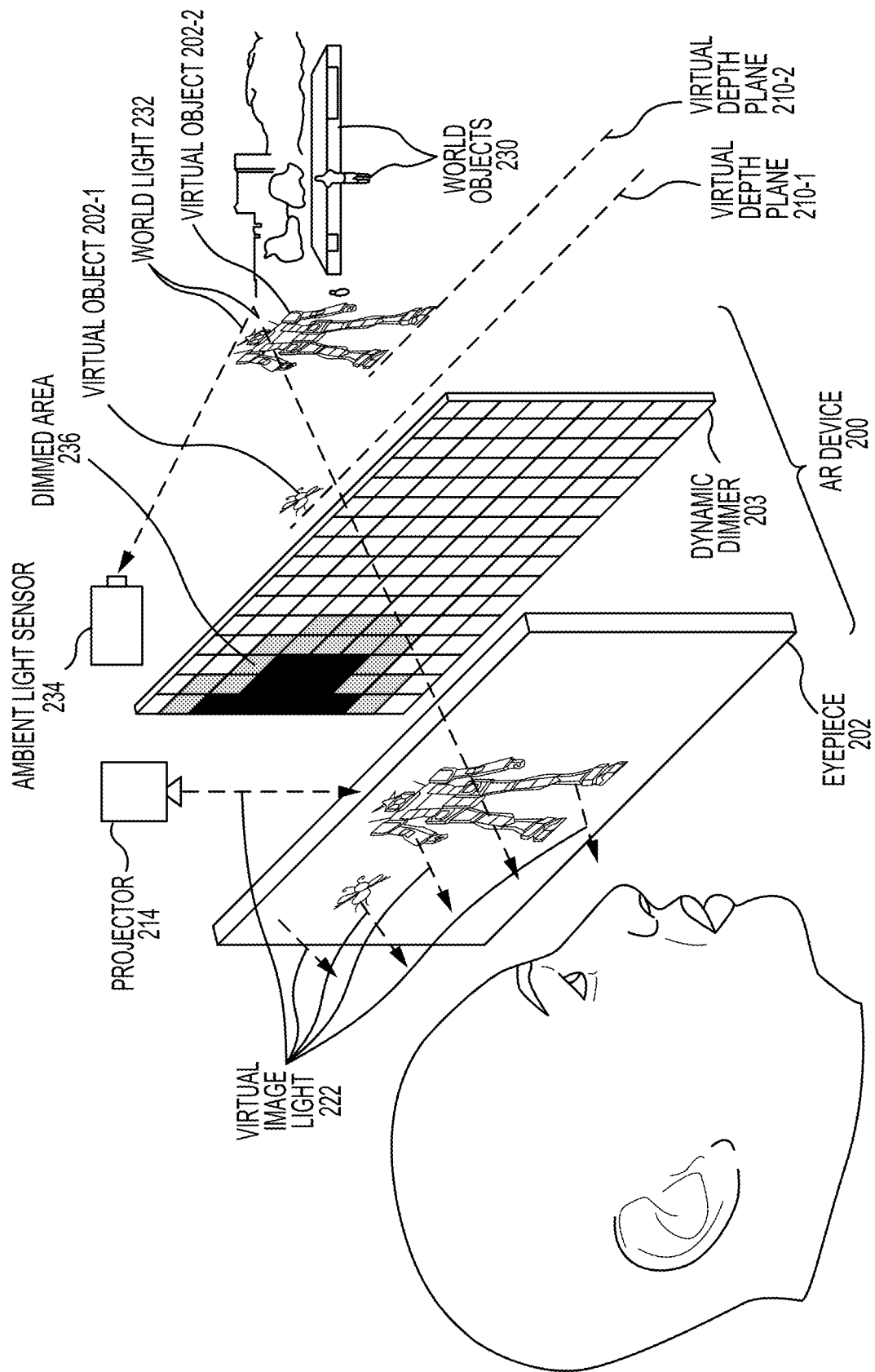
FIG. 2A illustrates one or more general features of an AR device according to the present invention.

FIG. 2A illustrates one or more general features of an AR device 200 according to the present invention. In some embodiments, an AR device 200 may include an eyepiece 202 and a dynamic dimmer 203 configured to be transparent or semi-transparent when AR device 200 is in an inactive mode or an off mode such that a user may view one or more world objects 230 when looking through eyepiece 202 and dynamic dimmer 203. As illustrated, eyepiece 202 and dynamic dimmer 203 may be arranged in a side-by-side configuration and may form a system field of view that a user sees when looking through eyepiece 202 and dynamic dimmer 203. In some embodiments, the system field of view is defined as the entire two-dimensional region occupied by one or both of eyepiece 202 and dynamic dimmer 203. Although FIG. 2A illustrates a single eyepiece 202 and a single dynamic dimmer 203 (for illustrative reasons), AR device 200 may include two eyepieces and two dynamic dimmers, one for each eye of a user.

During operation, dynamic dimmer 203 may be adjusted to reduce an intensity of a world light 232 associated with world objects 230 impinging on dynamic dimmer 203, thereby producing a dimmed area 236 within the system field of view. Dimmed area 236 may be a portion or subset of the system field of view, and may be partially or completely dimmed. Dynamic dimmer 203 may be adjusted according to a plurality of spatially-resolved dimming values for dimmed area 236. Furthermore, during operation of AR device 200, projector 214 may project a virtual image light 222 (i.e., light associated with virtual content) onto eyepiece 202 which may be observed by the user along with world light 232.

Projecting virtual image light 222 onto eyepiece 202 may cause a light field (i.e., an angular representation of virtual content) to be projected onto the user's retina in a manner such that the user perceives the corresponding virtual content as being positioned at some location within the user's environment. For example, virtual image light 222 outcoupled by eyepiece 202 may cause the user to perceive character 202-1 as being positioned at a first virtual depth plane 210-1 and statue 202-2 as being positioned at a second virtual depth plane 210-2. The user perceives the virtual content along with world light 232 corresponding to one or more world objects 230, such as platform 120.

In some embodiments, AR device 200 may include an ambient light sensor 234 configured to detect world light 232. Ambient light sensor 234 may be positioned such that world light 232 detected by ambient light sensor 234 is similar to and/or representative of world light 232 that impinges on dynamic dimmer 203 and/or eyepiece 202. In some embodiments, ambient light sensor 234 may be configured to detect a plurality of spatially-resolved light values corresponding to different pixels of dynamic dimmer 203. In these embodiments, ambient light sensor 234 may, for example, correspond to an imaging sensor (e.g., CMOS, CCD, etc.) or a plurality of photodiodes (e.g., in an array or another spatially-distributed arrangement). In some embodiments, or in the same embodiments, ambient light sensor 234 may be configured to detect a global light value corresponding to an average light intensity or a single light intensity of world light 232. In these embodiments, ambient light sensor 234 may, for example, correspond to a set of one or more photodiodes. Other possibilities are contemplated.

Figure 2B:
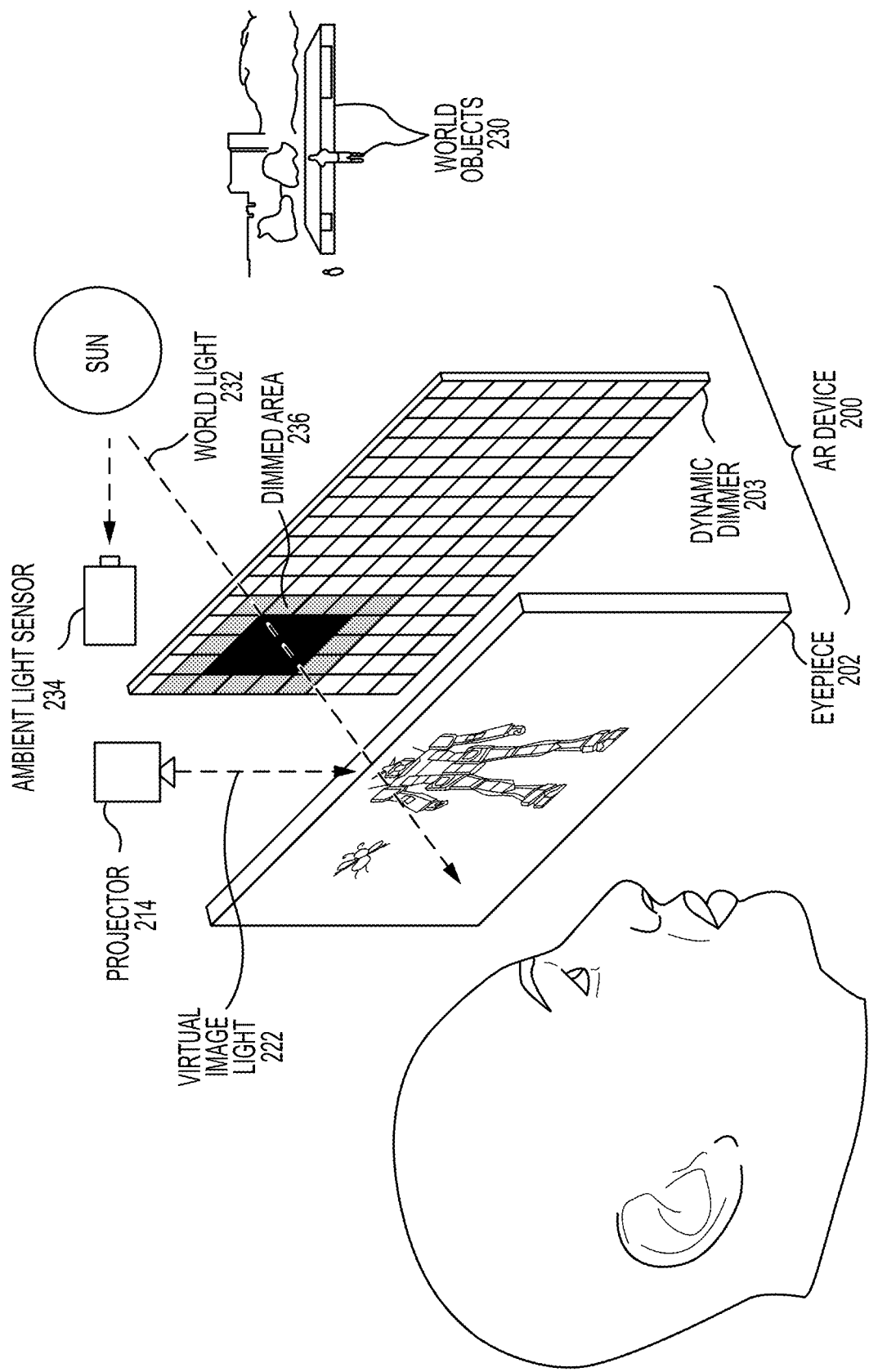
FIG. 2B illustrates an example of an AR device in which a dimmed area is determined based on detected light information.

FIG. 2B illustrates an example of AR device 200 in which dimmed area 236 is determined based on detected light information corresponding to world light 232. Specifically, ambient light sensor 234 may detect world light 232 associated with the sun and may further detect a direction and/or a portion of the system field of view at which world light 232 associated with the sun passes through AR device 200. In response, dynamic dimmer 203 may be adjusted to set dimmed area 236 to cover a portion of the system field of view corresponding to the detected world light. As illustrated, dynamic dimmer 203 may be adjusted so as to reduce the intensity of world light 232 at the center of dimmed area 236 at a greater amount than the extremities of dimmed area 236.

Figure 2C:
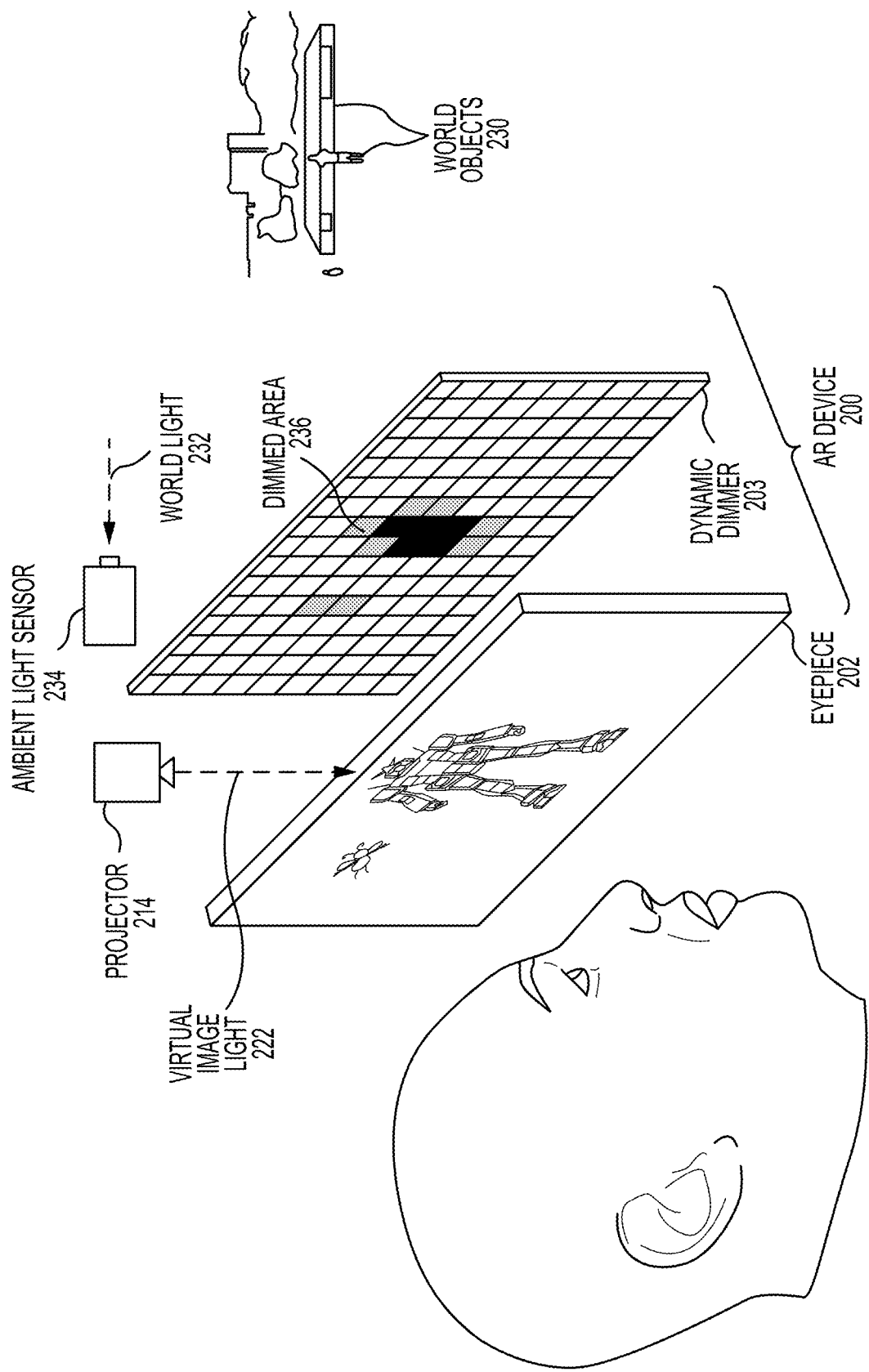
FIG. 2C illustrates an example of an AR device in which a dimmed area is determined based on a virtual image.

FIG. 2C illustrates an example of AR device 200 in which dimmed area 236 is determined based on virtual image light 222. Specifically, dimmed area 236 may be determined based on the virtual content perceived by the user resulting from the user observing virtual image light 222. In some embodiments, AR device 200 may detect image information that includes a location of virtual image light 222 (e.g., a location within dynamic dimmer 203 through which the user perceives the virtual content) and/or a brightness of virtual image light 222 (e.g., a brightness of the perceived virtual content and/or the light generated at projector 214), among other possibilities. As illustrated, dynamic dimmer 203 may be adjusted to set dimmed area 236 to cover a portion of the system field of view corresponding to virtual image light 222 or, alternatively, in some embodiments dimmed area 236 may cover a portion of the system field of view that is not aligned with virtual image light 222. In some embodiments, the dimming values of dimmed area 236 may be determined based on world light 232 detected by ambient light sensor 234 and/or the brightness of virtual image light 222.

Figure 2D:
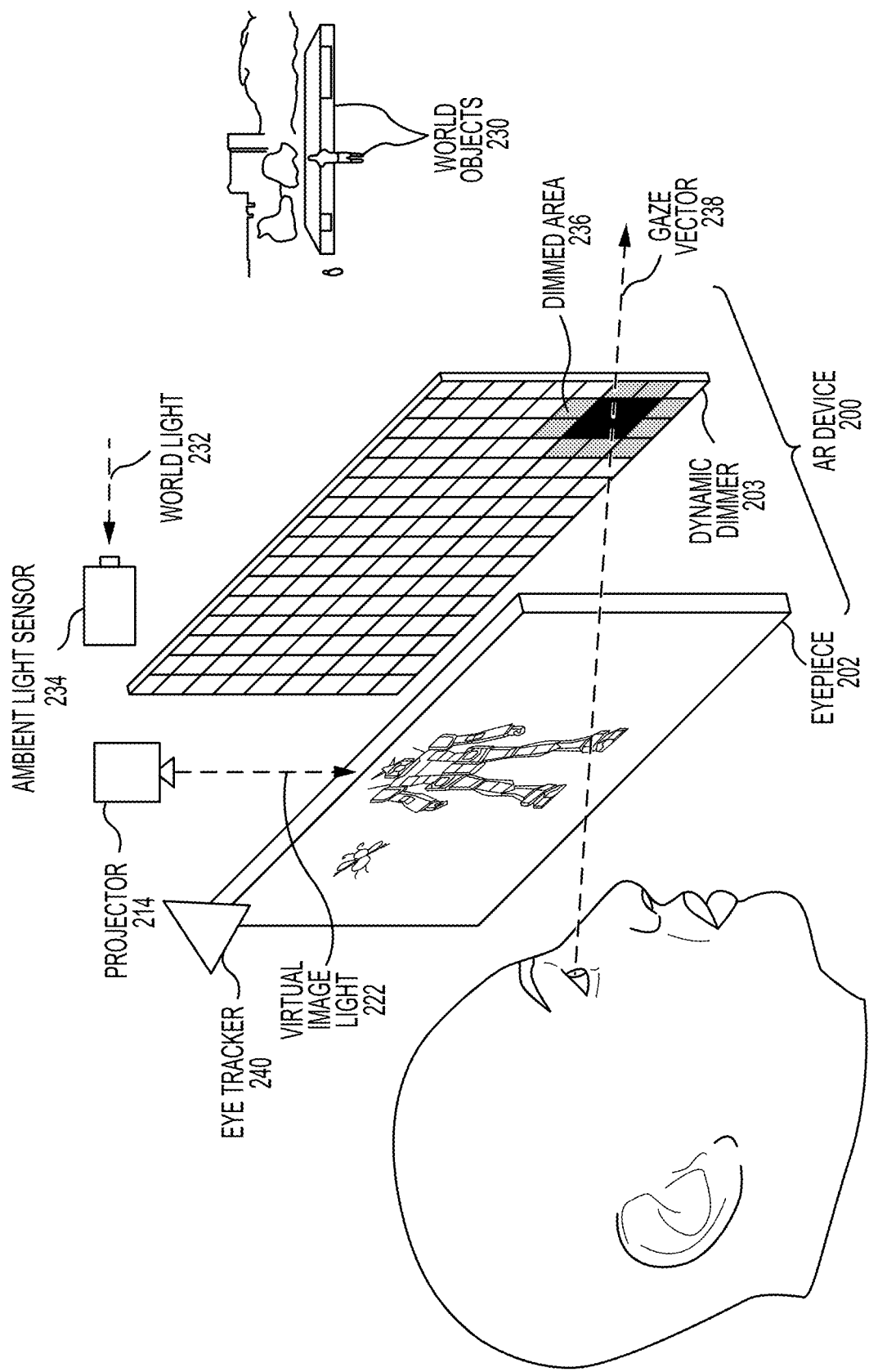
FIG. 2D illustrates an example of an AR device in which a dimmed area is determined based on gaze information.

FIG. 2D illustrates an example of AR device 200 in which dimmed area 236 is determined based on gaze information corresponding to an eye of a user. In some embodiments, the gaze information includes a gaze vector 238 of the user and/or a pixel location of dynamic dimmer 203 at which gaze vector 238 intersects with dynamic dimmer 203. As illustrated, dynamic dimmer 203 may be adjusted to set dimmed area 236 to cover a portion of the system field of view corresponding to an intersection point (or intersection region) between gaze vector 238 and dynamic dimmer 203 or, alternatively, in some embodiments dimmed area 236 may cover a portion of the system field of view that does not correspond to the intersection point (or intersection region) between gaze vector 238 and dynamic dimmer 203. In some embodiments, the dimming values of dimmed area 236 may be determined based on world light 232 detected by ambient light sensor 234 and/or the brightness of virtual image light 222. In some embodiments, gaze information may be detected by an eye tracker 240 mounted to AR device 200.

Figure 3:
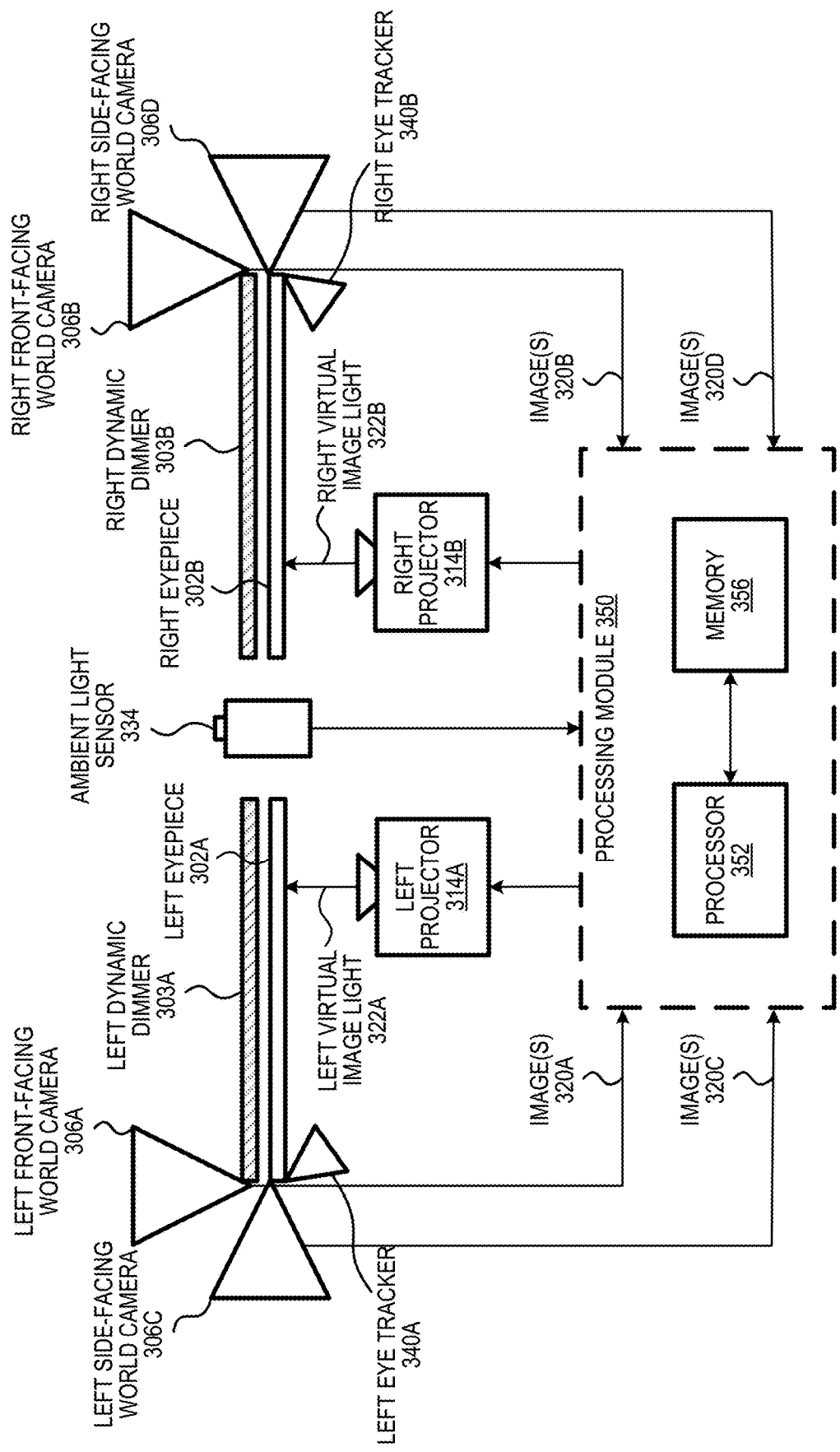
FIG. 3 illustrates a schematic view of a wearable AR device according to the present invention.

FIG. 3 illustrates a schematic view of a wearable AR device 300 according to the present invention. AR device 300 may include a left eyepiece 302A and a left dynamic dimmer 303A arranged in a side-by-side configuration and a right eyepiece 302B and a right dynamic dimmer 303B also arranged in a side-by-side configuration. In some embodiments, AR device 300 includes one or more sensors including, but not limited to: a left front-facing world camera 306A attached directly to or near left eyepiece 302A, a right front-facing world camera 306B attached directly to or near right eyepiece 302B, a left side-facing world camera 306C attached directly to or near left eyepiece 302A, a right side-facing world camera 306D attached directly to or near right eyepiece 302B, a left eye tracker 340A positioned so as to observe a left eye of a user, a right eye tracker 340B positioned so as to observe a right eye of a user, and an ambient light sensor 334. In some embodiments, AR device 300 includes one or more image projection devices such as a left projector 314A optically linked to left eyepiece 302A and a right projector 314B optically linked to right eyepiece 302B.

Some or all of the components of AR device 300 may be head mounted such that projected images may be viewed by a user. In one particular implementation, all of the components of AR device 300 shown in FIG. 3 are mounted onto a single device (e.g., a single headset) wearable by a user. In another implementation, a processing module 350 is physically separate from and communicatively coupled to the other components of AR device 300 by one or more wired and/or wireless connections. For example, processing module 350 may be mounted in a variety of configurations, such as fixedly attached to a frame, fixedly attached to a helmet or hat worn by a user, embedded in headphones, or otherwise removably attached to a user (e.g., in a backpack-style configuration, in a belt-coupling style configuration, etc.).

Processing module 350 may include a processor 352 and an associated digital memory 356, such as non-volatile memory (e.g., flash memory), both of which may be utilized to assist in the processing, caching, and storage of data. The data may include data captured from sensors (which may be, e.g., operatively coupled to AR device 300) or otherwise attached to a user, such as cameras 306, ambient light sensor 334, eye trackers 340, microphones, inertial measurement units, accelerometers, compasses, GPS units, radio devices, and/or gyros. For example, processing module 350 may receive image(s) 320 from cameras 306. Specifically, processing module 350 may receive left front image(s) 320A from left front-facing world camera 306A, right front image (s) 320B from right front-facing world camera 306B, left side image(s) 320C from left side-facing world camera 306C, and right side image(s) 320D from right side-facing world camera 306D. In some embodiments, image(s) 320 may include a single image, a pair of images, a video comprising a stream of images, a video comprising a stream of paired images, and the like. Image(s) 320 may be periodically generated and sent to processing module 350 while AR device 300 is powered on, or may be generated in response to an instruction sent by processing module 350 to one or more of the cameras. As another example, processing module 350 may receive light information from ambient light sensor 334. In some embodiments, some or all of the functionality of ambient light sensor 334 may be provided by way of one or more of world cameras 306A-306D. As another example, processing module 350 may receive gaze information from one or both of eye trackers 340. As another example, processing module 350 may receive image information (e.g., image brightness values) from one or both of projectors 314.

Eyepieces 302A and 302B may comprise transparent or semi-transparent waveguides configured to direct light from projectors 314A and 314B, respectively. Specifically, processing module 350 may cause left projector 314A to output a left virtual image light 322A onto left eyepiece 302A (causing a corresponding light field associated with left virtual image light 322A to be projected onto the user's retina), and may cause right projector 314B to output a right virtual image light 322B onto right eyepiece 302B (causing a corresponding light field associated with right virtual image light 322B to be projected onto the user's retina). In some embodiments, each of eyepieces 302 may comprise a plurality of waveguides corresponding to different colors and/or different depth planes. In some embodiments, dynamic dimmers 303 may be coupled to and/or integrated with eyepieces 302. For example, one of dynamic dimmers 303 may be incorporated into a multi-layer eyepiece and may form one or more layers that make up one of eyepieces 302.

Cameras 306A and 306B may be positioned to capture images that substantially overlap with the field of view of a user's left and right eyes, respectively. Accordingly, placement of cameras 306 may be near a user's eyes but not so near as to obscure the user's field of view. Alternatively or additionally, cameras 306A and 306B may be positioned so as to align with the incoupling locations of virtual image light 322A and 322B, respectively. Cameras 306C and 306D may be positioned to capture images to the side of a user, e.g., in a user's peripheral vision or outside the user's peripheral vision. Image(s) 320C and 320D captured using cameras 306C and 306D need not necessarily overlap with image(s) 320A and 320B captured using cameras 306A and 306B.

One or more components of AR device 300 may be similar to one or more components described in reference to FIGS. 2A-2D. For example, in the some embodiments the functionality of eyepieces 302, dynamic dimmers 303, projectors 314, ambient light sensor 334, and eye trackers 340 may be similar to eyepiece 202, dynamic dimmer 203, projector 214, ambient light sensor 234, and eye tracker 240, respectively. In some embodiments, the functionality of processing module 350 may be implemented by two or more sets of electronic hardware components that are housed separately but communicatively coupled. For example, the functionality of processing module 350 may be carried out by electronic hardware components housed within a headset in conjunction with electronic hardware components housed within a computing device physically tethered to the headset, one or more electronic devices within the environment of the headset (e.g., smart phones, computers, peripheral devices, smart appliances, etc.), one or more remotely-located computing devices (e.g., servers, cloud computing devices, etc.), or a combination thereof. One example of such a configuration is described in further detail below in reference to FIG. 29.

Figure 4:
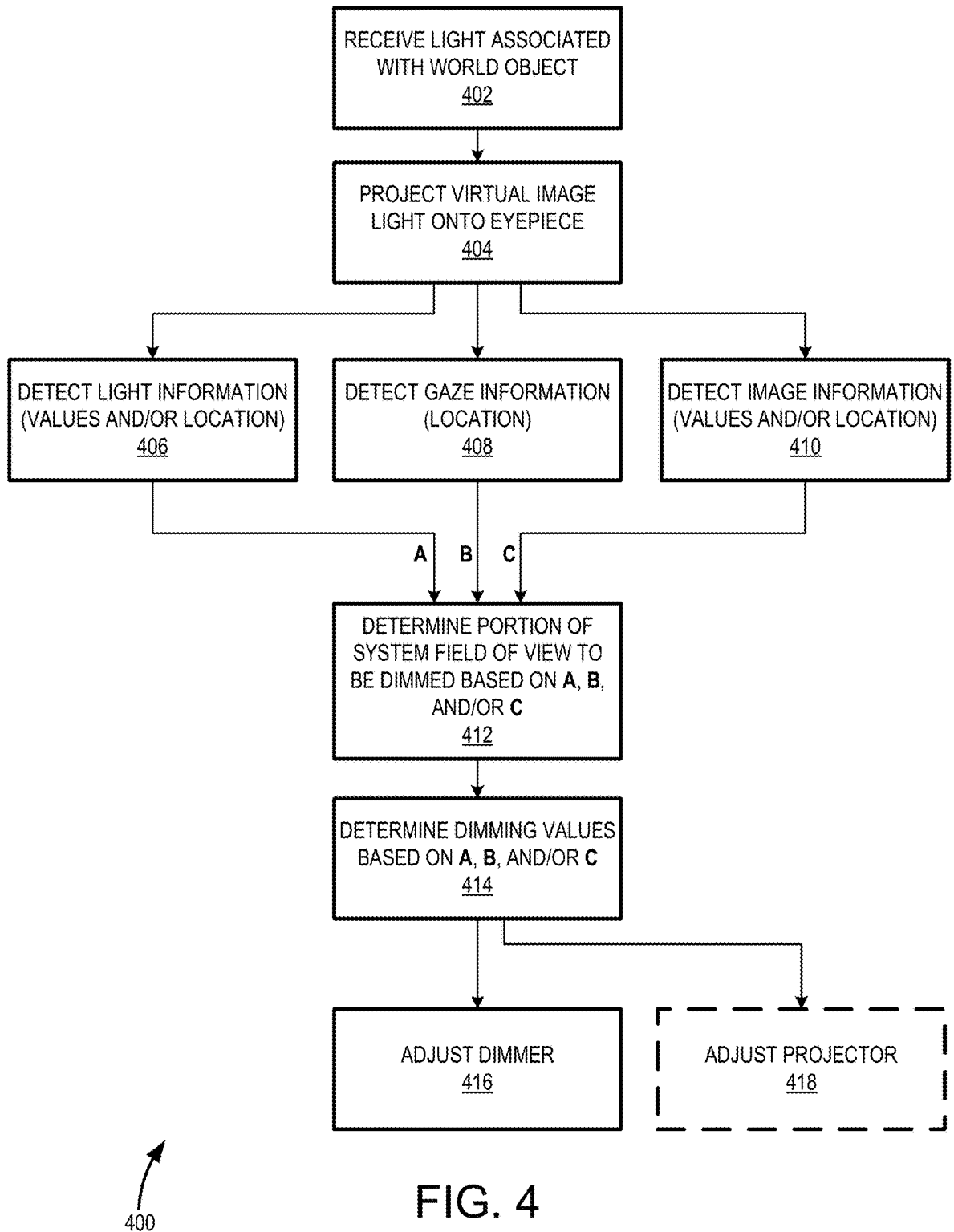
FIG. 4 illustrates a method for operating an optical system.

FIG. 4 illustrates a method 400 for operating an optical system (e.g., AR device 200 or 300). Steps of method 400 may be performed in a different order than that shown in FIG. 4, and not all of the steps need be performed. For example, in some embodiments, one or more of steps 406, 408, and 410 may be omitted during performance of method 400. One or more steps of method 400 may be performed by a processor (e.g., processor 352) or by some other component within the optical system.

At step 402, light (e.g., world light 232) associated with a world object (e.g., world objects 230) is received at the optical system. The world object may be any number of real-world objects, such as a tree, a person, a house, a building, the sun, etc., that is viewed by a user of the optical system. In some embodiments, the light associated with the world object is first received by a dynamic dimmer (e.g., dynamic dimmer 203 or 303) or by an external cosmetic lens of the optical system. In some embodiments, the light associated with the world object is considered to be received at the optical system when the light reaches one or more components of the optical system (e.g., when the light reaches the dynamic dimmer).

At step 404, virtual image light (e.g., virtual image light 222 or 322) is projected onto an eyepiece (e.g., eyepiece 202 or 302). The virtual image light may be projected onto the eyepiece by a projector (e.g., projector 214 or 314) of the optical system. The virtual image light may correspond to a single image, a pair of images, a video comprising a stream of images, a video comprising a stream of paired images, and the like. In some embodiments, the virtual image light is considered to be projected onto the eyepiece when any light associated with the virtual image light reaches the eyepiece. In some embodiments, projecting the virtual image light onto the eyepiece causes a light field (i.e., an angular representation of virtual content) to be projected onto the user's retina in a manner such that the user perceives the corresponding virtual content as being positioned at some location within the user's environment.

During steps 406, 408, and 410, information may be detected by the optical system using, for example, one or more sensors of the optical system. At step 406, light information corresponding to the light associated with the world object is detected. The light information may be detected using a light sensor (e.g., ambient light sensor 234 or 334) mounted to the optical system. In some embodiments, the light information includes a plurality of spatially-resolved light values. Each of the plurality of spatially-resolved light values may correspond to a two-dimensional position within the system field of view. For example, each of the light values may be associated with a pixel of the dynamic dimmer. In other embodiments, or in the same embodiments, the light information may include a global light value. The global light value may be associated with the entire system field of view (e.g., an average light value of light impinging on all pixels of the dynamic dimmer).

At step 408, gaze information corresponding to an eye of a user of the optical system is detected. The gaze information may be detected using an eye tracker (e.g., eye tracker 240 or 340) mounted to the optical system. In some embodiments, the gaze information includes a gaze vector (e.g., gaze vector 238) of the eye of the user. In some embodiments, the gaze information includes one or more of a pupil position of the eye of the user, a center of rotation of the eye of the user, a pupil size of the eye of the user, a pupil diameter of the eye of the user, and cone and rod locations of the eye of the user. The gaze vector may be determined based on one or more components of the gaze information, such as the pupil position, the center of rotation of the eye, the pupil size, the pupil diameter, and/or the cone and rod locations. When the gaze vector is determined based on the cone and rod locations, it may further be determined based on the light information (e.g., the global light value) so as to determine an origin of the gaze vector within a retinal layer of the eye containing the cone and rod locations. In some embodiments, the gaze information includes a pixel or group of pixels of the dynamic dimmer at which the gaze vector intersects with the dynamic dimmer.

At step 410, image information corresponding to the virtual image light (e.g., virtual image light 222 or 322) projected by the projector onto the eyepiece is detected. The image information may be detected by the projector, by a processor (e.g., processor 352), or by a separate light sensor. In some embodiments, the image information includes one or more locations within the dynamic dimmer through which the user perceives the virtual content when the user observes the virtual image light. In some embodiments, the image information includes a plurality of spatially-resolved image brightness values (e.g., brightness of the perceived virtual content). For example, each of the image brightness values may be associated with a pixel of the eyepiece or of the dynamic dimmer. In one particular implementation, when the processor sends instructions to the projector to project the virtual image light onto the eyepiece, the processor may determine, based on the instructions, the spatially-resolved image brightness values. In another particular implementation, when the projector receives the instructions from the processor to project the virtual image light onto the eyepiece, the projector sends the spatially-resolved image brightness values to the processor. In another particular implementation, a light sensor positioned on or near the eyepiece detects and sends the spatially-resolved image brightness values to the processor. In other embodiments, or in the same embodiments, the image information includes a global image brightness value. The global image brightness value may be associated with the entire system field of view (e.g., an average image brightness value of all of the virtual image light).

At step 412, a portion of the system field of view to be at least partially dimmed is determined based on the detected information. The detected information may include the light information detected during step 406, the gaze information detected during step 408, and/or the image information detected during step 410. In some embodiments, the portion of the system field of view is equal to the entire system field of view. In various embodiments, the portion of the system field of view may be equal to 1%, 5%, 10%, 25%, 50%, or 75%, etc., of the system field of view. In some embodiments, the different types of information may be weighted differently in determining the portion to be at least partially dimmed. For example, gaze information, when available, may be weighted more heavily in determining the portion to be at least partially dimmed than light information and image information. In one particular implementation, each type of information may independently be used to determine a different portion of the system field of view to be at least partially dimmed, and subsequently the different portions may be combined into a single portion using an AND or an OR operation.

In some embodiments, the information used to determine a portion of the system field of view to be at least partially dimmed includes information associated with one or more objects that are presented within the virtual content. For example, the virtual content may include text, navigational indicators (e.g., arrows), and/or other content. The portion of the field of view in which such content is to be presented, and/or the field of view proximal to the content, can be dimmed such that the user can more easily read perceive and understand the content, and distinguish the content from world object(s). The dimmer can selectively dim one or more pixels and/or zone(s) of pixels, or enhance viewing of the content. In one example, a section of the lower portion of the field of view can be selectively and dynamically dimmed to make is easier for the user to see directional (e.g., navigation) arrows, text messages, and so forth. Such dimming may be performed while the content is being displayed in response to a determination that such content is to be displayed, and the dimming may be removed when the content is no longer displayed. In some instances, the dimming may be performed to mitigate artifacts caused by the pixel structure that enables dimming over the entire field of view.

At step 414, a plurality of spatially-resolved dimming values for the portion of the system field of view are determined based on the detected information. In some embodiments, the dimming values are determined using a formulaic approach based on a desired opacity or visibility of the virtual content. In one particular implementation, the visibility of the virtual content may be calculated using the following equation:

$$V = \frac{I_{max}\left(1 - \frac{1}{C}\right)}{I_{max}\left(1 + \frac{1}{C}\right) + 2I_{back}}$$

where V is the visibility, $I_{max}$ is the brightness of the virtual image light as indicated by the image information, $I_{back}$ is related to a light value associated with the world object as indicated by the light information (which may be modified by the determined dimming value), and C is a desired contrast (e.g., 100:1). For example, the visibility equation may be used at each pixel location of the dimmer to calculate a dimming value for the particular pixel location using the brightness of the virtual image light at the particular pixel location and the light value associated with the world object at the particular pixel location. In some embodiments, $I_{back}$ may be defined using the following equation:

$$I_{back} = T_v * I_{world}$$

where $T_v$ is the percentage of light that is allowed to pass through one or more pixels of the dimmer, and $I_{world}$ is the brightness of ambient light from the world as indicated by the light information. In some examples, $T_v$ may be representative of or related to a dimming value.

At step 416, the dimmer is adjusted to reduce an intensity of the light associated with the object in the portion of the system field of view. For example, the dimmer may be adjusted such that the intensity of the light associated with the object impinging on each pixel location of the dimmer is reduced according to the dimming value determined for that particular pixel location. As used in the present disclosure, adjusting the dimmer may include initializing the dimmer, activating the dimmer, powering on the dimmer, modifying or changing a previously initialized, activated, and/or powered on dimmer, and the like. In some embodiments, the processor may send data to the dimmer indicating both the portion of the system field of view and the plurality of spatially-resolved dimming values.

At step 418, the projector is adjusted to adjust a brightness associated with the virtual image light. For example, in some embodiments it may be difficult to achieve a desired opacity or visibility of the virtual content without increasing or decreasing the brightness of the virtual object. In such embodiments, the brightness of the virtual image light may be adjusted before, after, simultaneously, or concurrently with adjusting the dimmer.

Figure 5:
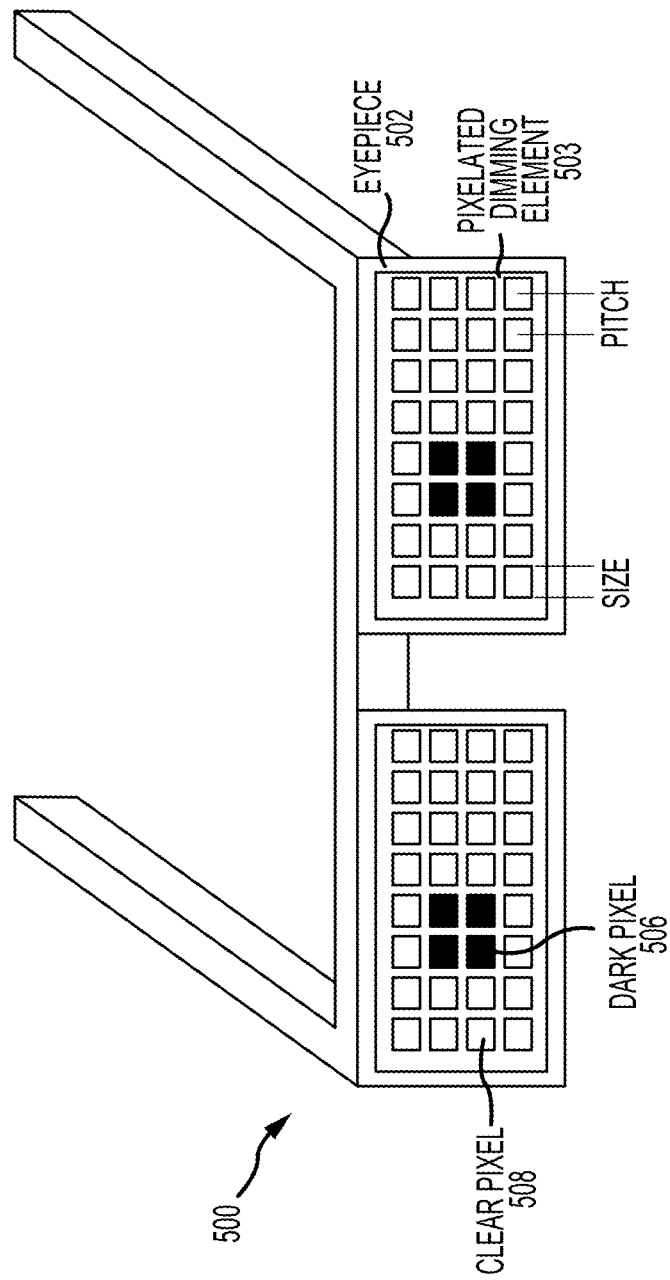
FIG. 5 illustrates an AR device with an eyepiece and a pixelated dimming element.

FIG. 5 illustrates an AR device 500 with an eyepiece 502 and a pixelated dimming element 503 consisting of a spatial grid of dimming areas (i.e., pixels) that can have various levels of dimming. Each of the dimming areas may have an associated size (i.e., width) and an associated spacing (i.e., pitch). As illustrated, the spatial grid of dimming areas may include one or more dark pixels 506 providing complete dimming of incident light and one or more clear pixels 508 providing complete transmission of incident light. Adjacent pixels within pixelated dimming element 503 may be bordering (e.g., when the pitch is equal to the size) or may be separated by gaps (e.g., when the pitch is greater than the size). In various embodiments, pixelated dimming element 503 may employ liquid crystal technology such as dye doped or guest host liquid crystals, twisted nematic (TN) or vertically aligned (VA) liquid crystals, or ferroelectric liquid crystals. In some embodiments, pixelated dimming element 503 may comprise an electrochromic device, among other possibilities. In some implementations, pixelated dimming element 503 may employ electrically controlled birefringence ("ECB") technology, such as an ECB cell.

FIG. 6 illustrates a technique for determining the gaze vector based on the pupil position of the eye of the user. In some instances, the pupil position relative to the AR device is detected using the eye tracker and the gaze vector is subsequently defined as the vector orthogonal to the surface of the eye at the pupil position. The gaze vector may alternatively or additionally be defined as the vector intersecting the center of rotation of the eye and the pupil position. The center of rotation may be estimated using data gathered by the eye tracker. The gaze vector may alternatively or additionally be defined as the vector intersecting the geometric center of the eye and the pupil position. The geometric center of the eye may be estimated using data gathered by the eye tracker. Other possibilities are contemplated.

One of several inherent problems with using the pupil position to determine the gaze vector is illustrated in FIG. 6. In the upper diagram, a first distance $D_1$ between the pupil position and the eyepiece is shown when the eye is looking generally toward the center of the eyepiece. In the lower diagram, a second distance $D_2$ between the pupil position and the eyepiece is shown when the eye is looking generally toward the top of the eyepiece. Here, the first distance $D_1$ is less than the second distance $D_2$, causing render registration problems due to the varying vergence distance as the eye of the user moves.

FIG. 7 illustrates a technique for determining the gaze vector based on the center of rotation of the eye of a user. This technique is described in depth in U.S. Application No. 62/618,559, filed on Jan. 17, 2018, titled "EYE CENTER OF ROTATION DETERMINATION, DEPTH PLANE SELECTION, AND RENDER CAMERA POSITIONING IN DISPLAY SYSTEMS", the disclosure of which is incorporated by reference herein. The center of rotation may be estimated using data gathered by the eye tracker, and the gaze vector may subsequently be defined as the vector formed by connecting the center of rotation and the pupil position. One of several benefits of using the center of rotation for determining the gaze vector is that the distance between the center of rotation and the eyepiece may be the same irrespective of the direction the eye is looking. In the upper diagram of FIG. 7, a third distance $D_3$ between the center of rotation and the eyepiece is shown when the eye is looking generally toward the center of the eyepiece. In the lower diagram, a fourth distance $D_4$ between the center of rotation and the eyepiece is shown when the eye is looking generally toward the top of the eyepiece. Here, the third distance $D_3$ is the same as the fourth distance $D_4$ thereby improving the render registration.

Figure 8:
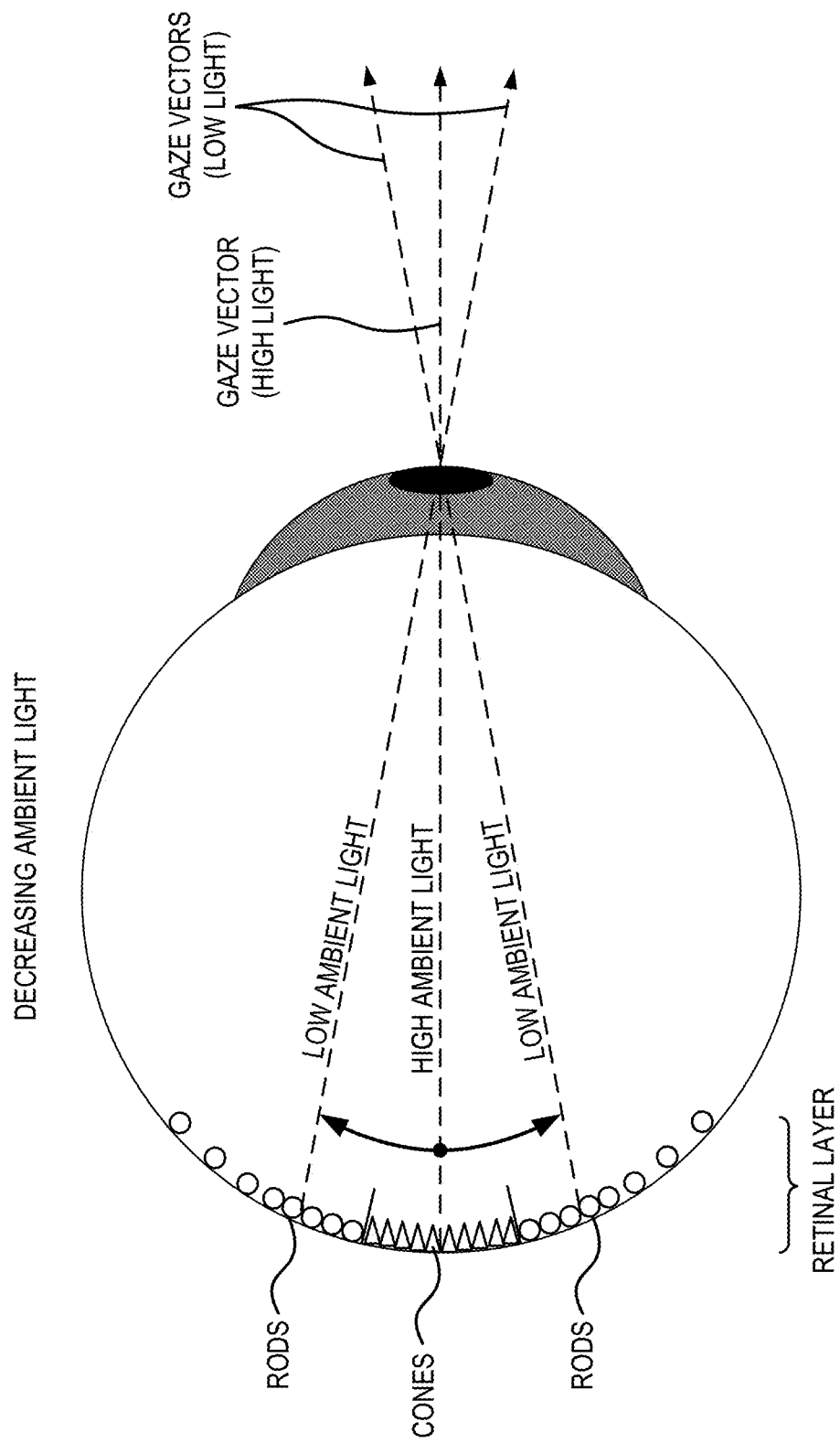
FIG. 8 illustrates a technique for determining a gaze vector based on detected light information and cone and rod locations within an eye.

FIG. 8 illustrates a technique for determining the gaze vector based on detected light information and the cone and rod locations within the eye. Because cones are more sensitive to light in high light conditions and rods are more sensitive to light in low light conditions, as the detected ambient light decreases (e.g., the global light value), the origin of the gaze vector may be adjusted from a center position of the retinal layer corresponding to a high density of cones outward to one or more points along an annulus corresponding to a high density of rods. Accordingly, in high light conditions the determined gaze vector may be a single gaze vector formed by connecting a center position of the retinal layer to the pupil position, and in low light conditions the determined gaze vector(s) may be a single or a plurality of gaze vectors formed by connecting one or more points along an annulus surrounding the center position of the retinal layer to the pupil position. Alternatively or additionally, the plurality of gaze vectors may be described/represented as a cone of gaze vectors or a "gaze cone" comprising an infinite number of possible gaze vectors.

Cone and rod locations may be estimated using information gathered by the eye tracker or, in some embodiments, the center position of the retinal layer corresponding to a high density of cones may be defined by continuing the gaze vector determined using the pupil position through the eye toward the back of the eye such that the gaze vector determined using the pupil position is co-linear with the gaze vector determined using cone and rod locations in high light conditions. In some embodiments, the AR device is configured such that the gaze vector is determined using cone and rod locations in low light conditions (e.g., "low light mode") and is determined using the center of rotation of the eye in high light conditions. In such embodiments, a light threshold may be established that a detected light value may be evaluated against, causing the gaze vector to be determined using cone and rod locations when the detected light value is below the light threshold and causing the gaze vector to be determined using the center of rotation of the eye when the detected light value is above the light threshold.

In some embodiments in which the dimmed area is significantly large and/or the dimming values are significantly high, the detected ambient light using the light sensor of the AR device may not be indicative of the actual amount of light reaching the eye. In such embodiments, the size of the pupil may be used as a proxy for the amount of light reaching the eye. For example, the AR device may switch to a "low light mode" (causing the gaze vector to be determined using cone and rod locations) when the pupil size exceeds a pupil size threshold. For example, in some implementations the pupil size threshold may be set to be 20% above an average pupil size of a user in high light conditions (e.g., pupil size may correspond to area, diameter, circumference, etc. of the pupil). In another particular embodiment, the pupil size threshold may be predetermined based on average known pupil sizes in low light and high light conditions. Other possibilities are contemplated.

Figure 9:
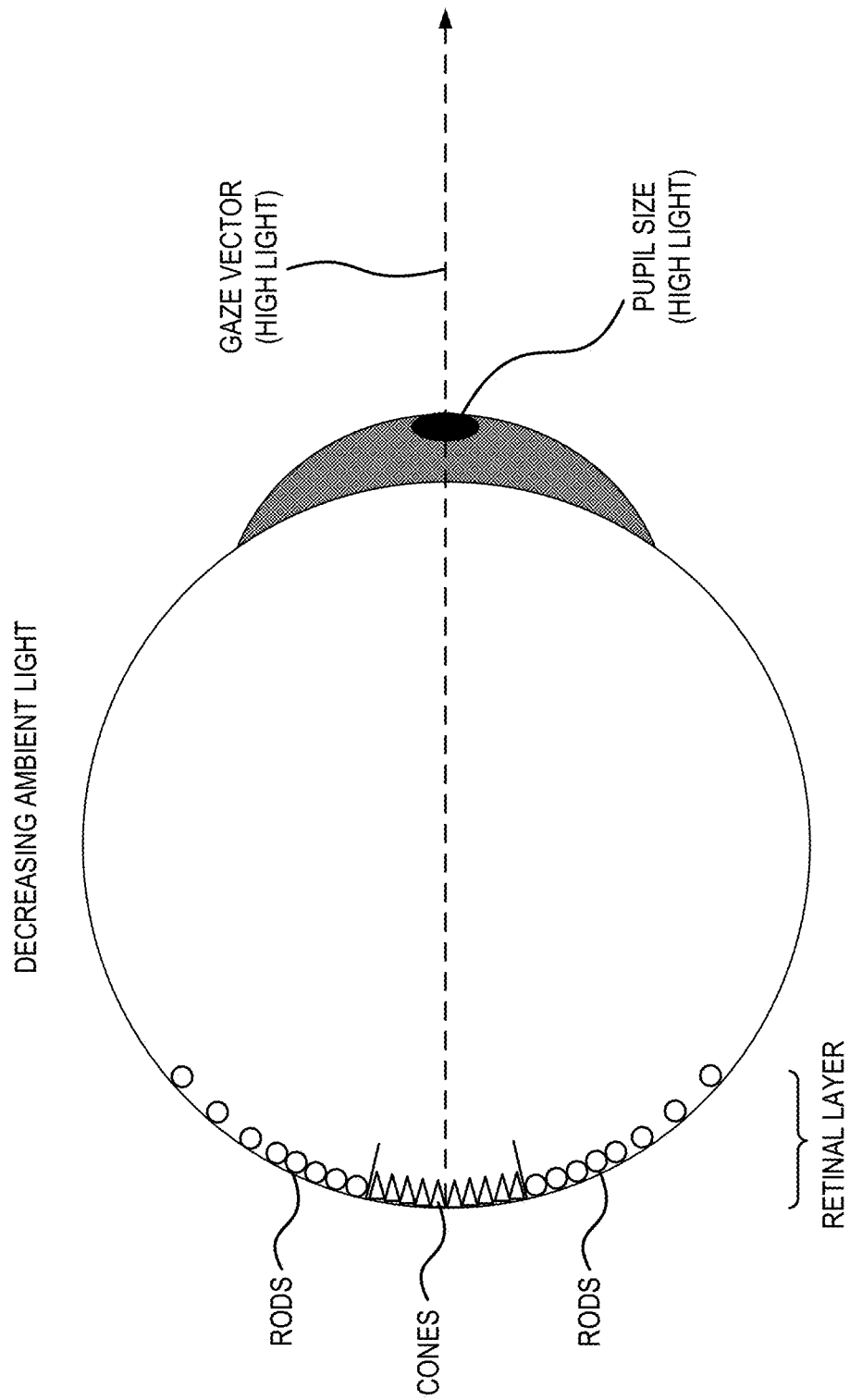
FIG. 9 illustrates a determined gaze vector in high light conditions in which a pupil is contracted.

FIG. 9 illustrates a determined gaze vector in high light conditions in which the pupil is contracted. In some embodiments, the pupil size may be used to estimate the ambient light (e.g., the global light value) or, alternatively or additionally, the origin(s) of the gaze vector(s) may be determined directly using the pupil size without estimation or detection of the ambient light. For example, different pupil diameters may be related to different cone and rod locations within the retinal layer at which the origin(s) of the gaze vector(s) may be defined.

Figure 10:
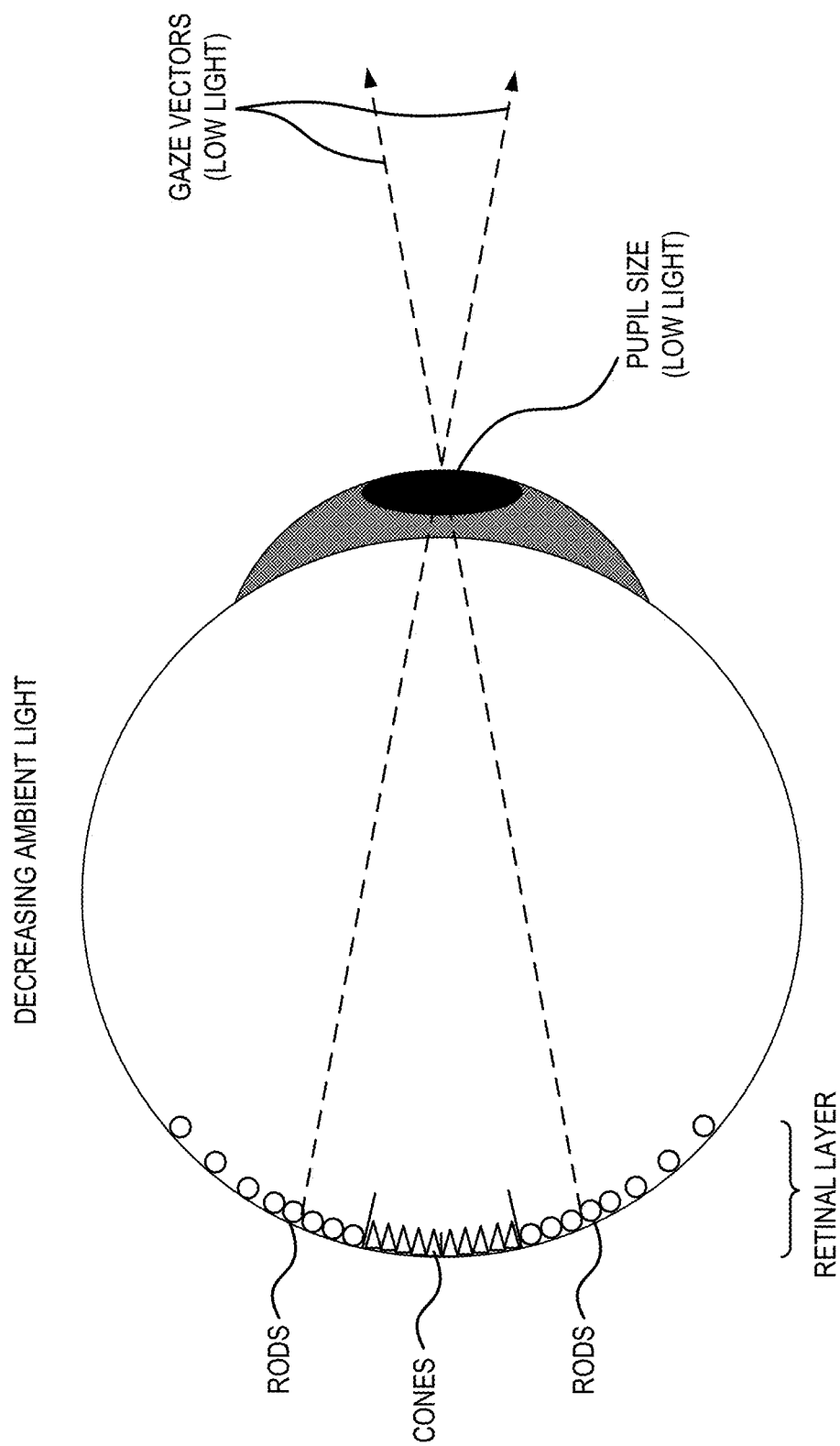
FIG. 10 illustrates determined gaze vectors in low light conditions in which a pupil is dilated.

FIG. 10 illustrates determined gaze vectors in low light conditions in which the pupil is dilated. Similar to the scenario in high light conditions, in low light conditions the pupil size may be used to estimate the ambient light (e.g., the global light value) or, alternatively or additionally, the origin(s) of the gaze vector(s) may be determined directly using the pupil size.

Figure 11:
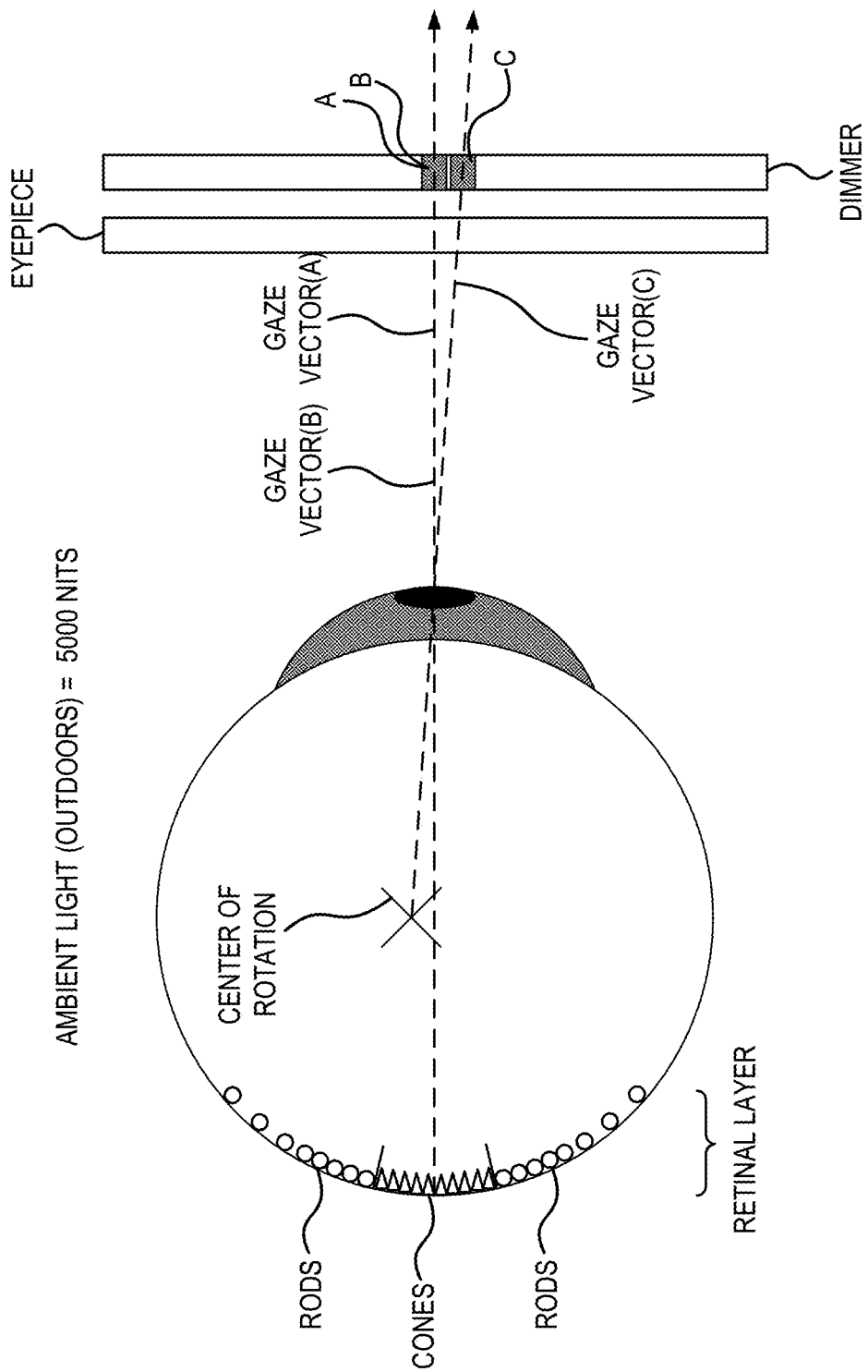
FIG. 11 illustrates three techniques for determining a gaze vector in high light conditions and corresponding dimmed areas.
Figure 12:
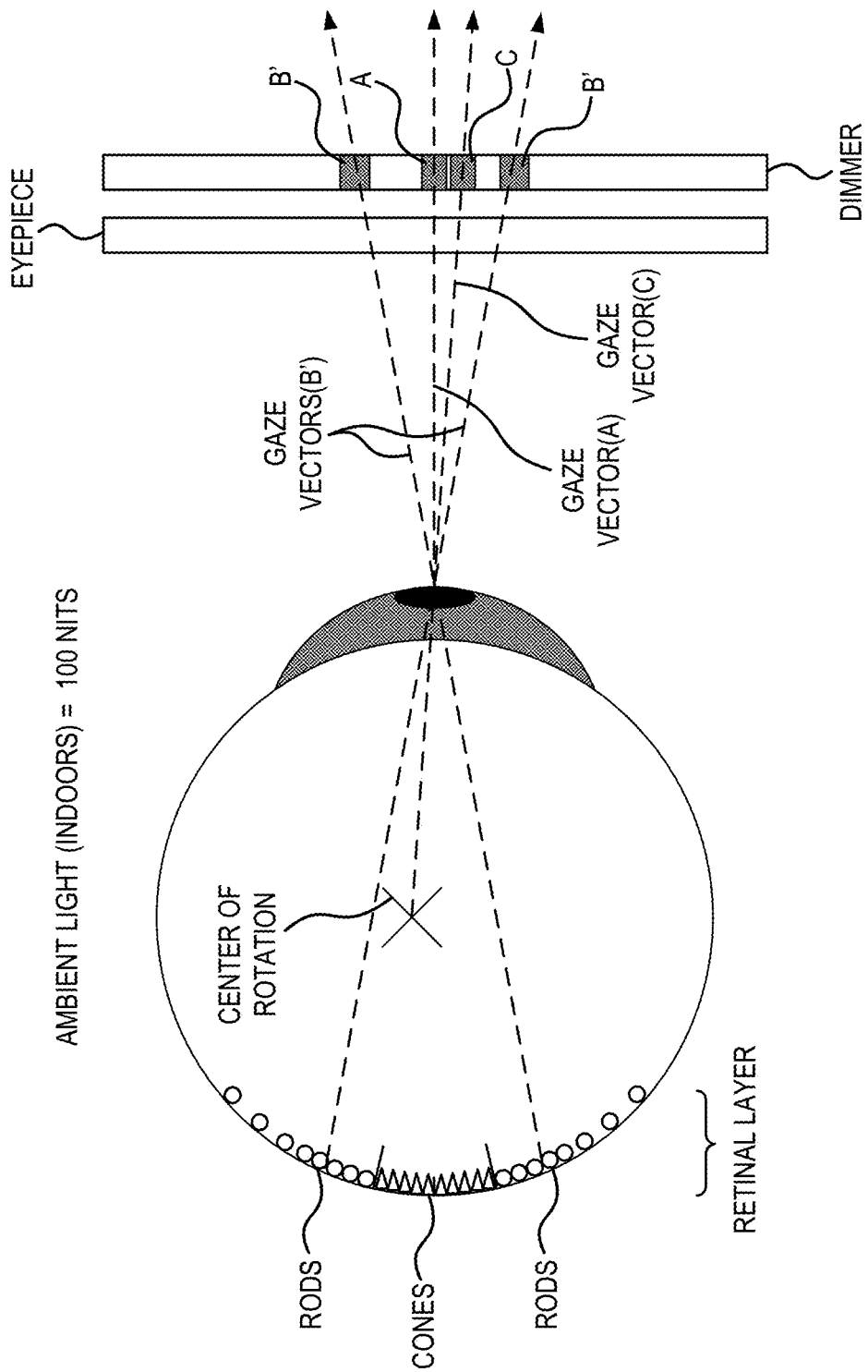
FIG. 12 illustrates three techniques for determining a gaze vector in low light conditions and corresponding dimmed areas.

FIG. 11 illustrates three techniques for determining the gaze vector in high light conditions and the corresponding dimmed areas determined using each of the three techniques. In the first technique, the gaze vector is determined using the pupil position, i.e., "GAZE VECTOR(A)", resulting in a gaze vector that extends orthogonally from the surface of the pupil toward the dimmed area A (or in some embodiments, the area that is not dimmed). In the second technique, the gaze vector is determined using cone and rod locations within the eye, i.e., "GAZE VECTOR(B)", resulting in a gaze vector that extends from a center position of the retinal layer through the pupil position toward the dimmed area B (or in some embodiments, the area that is not dimmed). The second technique may be further facilitated by one or more of: the pupil position (for providing a second point for defining the gaze vector), the detected ambient light (for determining the origin(s) of the gaze vector(s) along the retinal layer), and the pupil size/diameter (for estimating the ambient light and/or for directly determining the origin(s) of the gaze vector(s) along the retinal layer). In the third technique, the gaze vector is determined using the center of rotation of the eye, i.e., "GAZE VECTOR(C)", resulting in a gaze vector that extends from the center of rotation of the eye through the pupil position toward the dimmed area C (or in some embodiments, the area that is not dimmed). In the example of FIG. 12, dimmed area A is the same as dimmed area B.

FIG. 12 illustrates the same techniques illustrated in FIG. 11 but in low light conditions. The determined gaze vectors and the corresponding dimmed areas are the same using the first and third techniques (using pupil position and center of rotation, respectively) but have been modified using the second technique (using cone and rod locations). In the second technique, the gaze vectors are determined using cone and rod locations within the eye, i.e., "GAZE VECTOR(B')", resulting in a set of gaze vectors that extend from various points along an annulus surrounding the center position of the retinal layer through the pupil position toward the dimmed area B' (or in some embodiments, the area that is not dimmed). In the example shown in FIG. 12, each of dimmed areas A, B', and C differ from each other.

Figure 13:
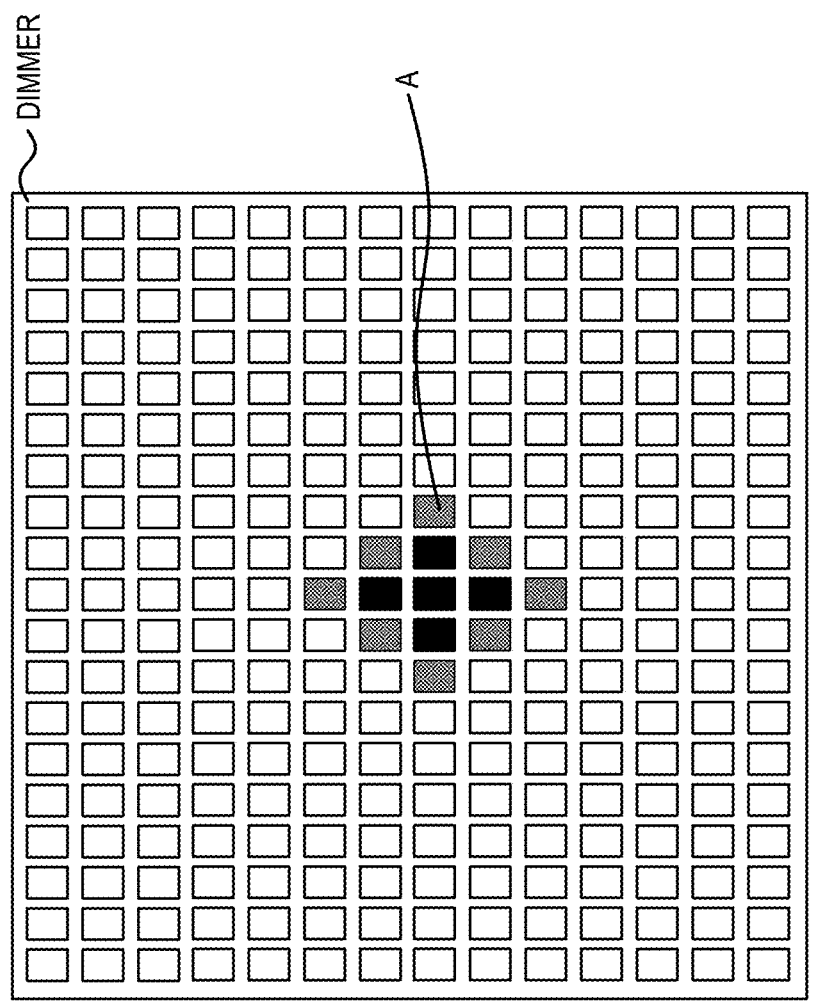
FIG. 13 illustrates a dimmer having been adjusted to produce a dimmed area determined using a gaze vector calculated using a pupil position.

FIG. 13 illustrates a dimmer having been adjusted to produce dimmed area A determined using a gaze vector calculated using the pupil position.

Figure 14:
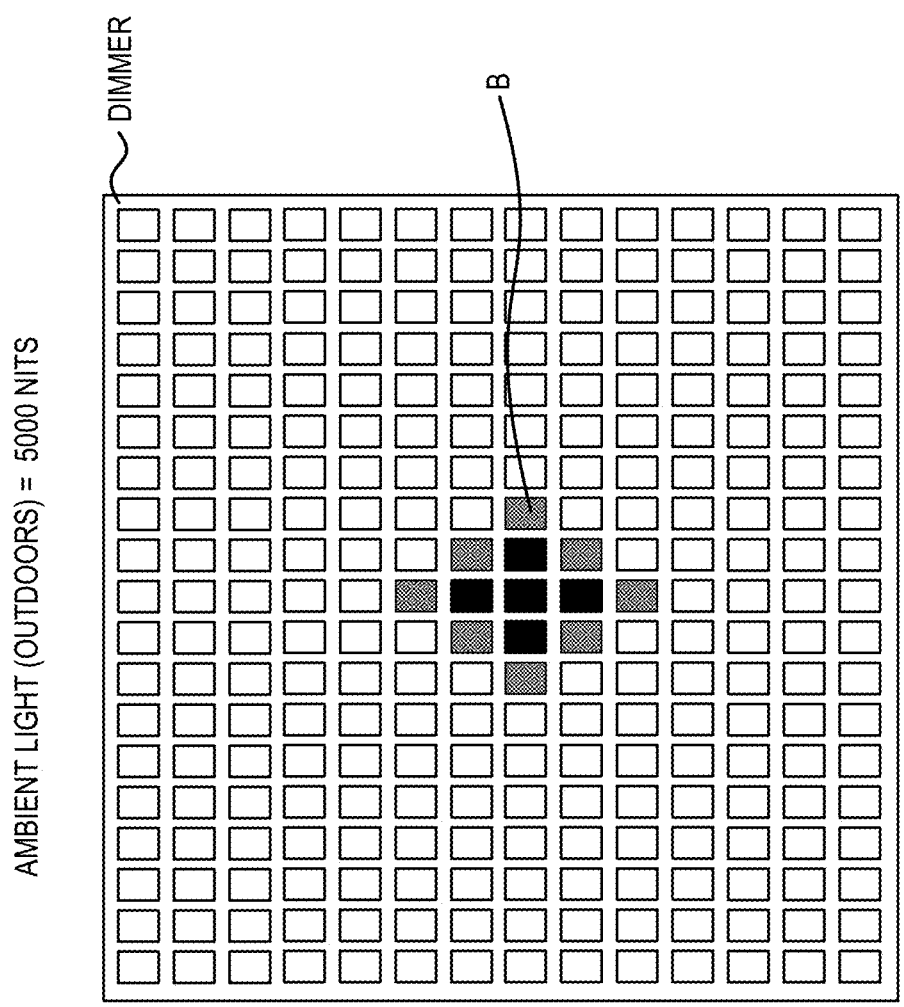
FIG. 14 illustrates a dimmer having been adjusted to produce a dimmed area determined using a gaze vector calculated using cone and rod locations in high light conditions.

FIG. 14 illustrates a dimmer having been adjusted to produce dimmed area B determined using a gaze vector calculated using cone and rod locations in high light conditions.

Figure 15:
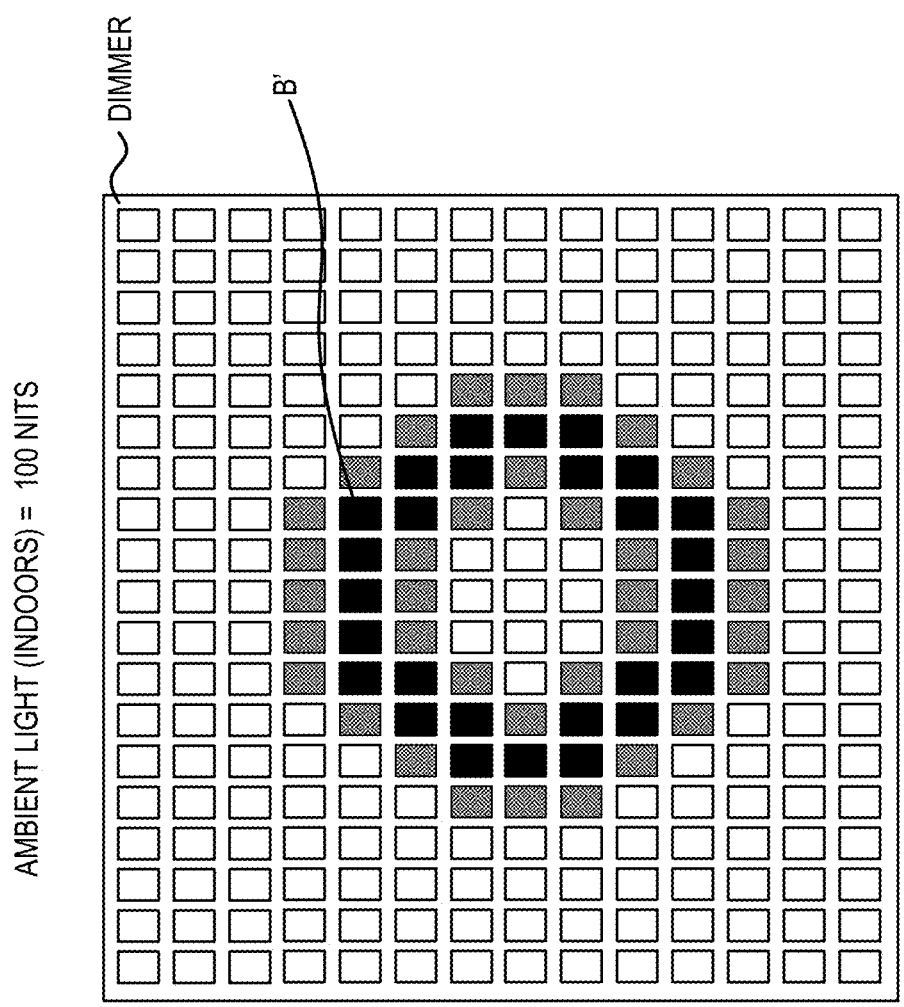
FIG. 15 illustrates a dimmer having been adjusted to produce a dimmed area determined using a gaze vector calculated using cone and rod locations in low light conditions.

FIG. 15 illustrates a dimmer having been adjusted to produce dimmed area B' determined using a gaze vector calculated using cone and rod locations in low light conditions. In alternative embodiments, dimmed area B' may include only portions of the annular region shown in FIG. 15 and not the region in its entirety.

Figure 16:
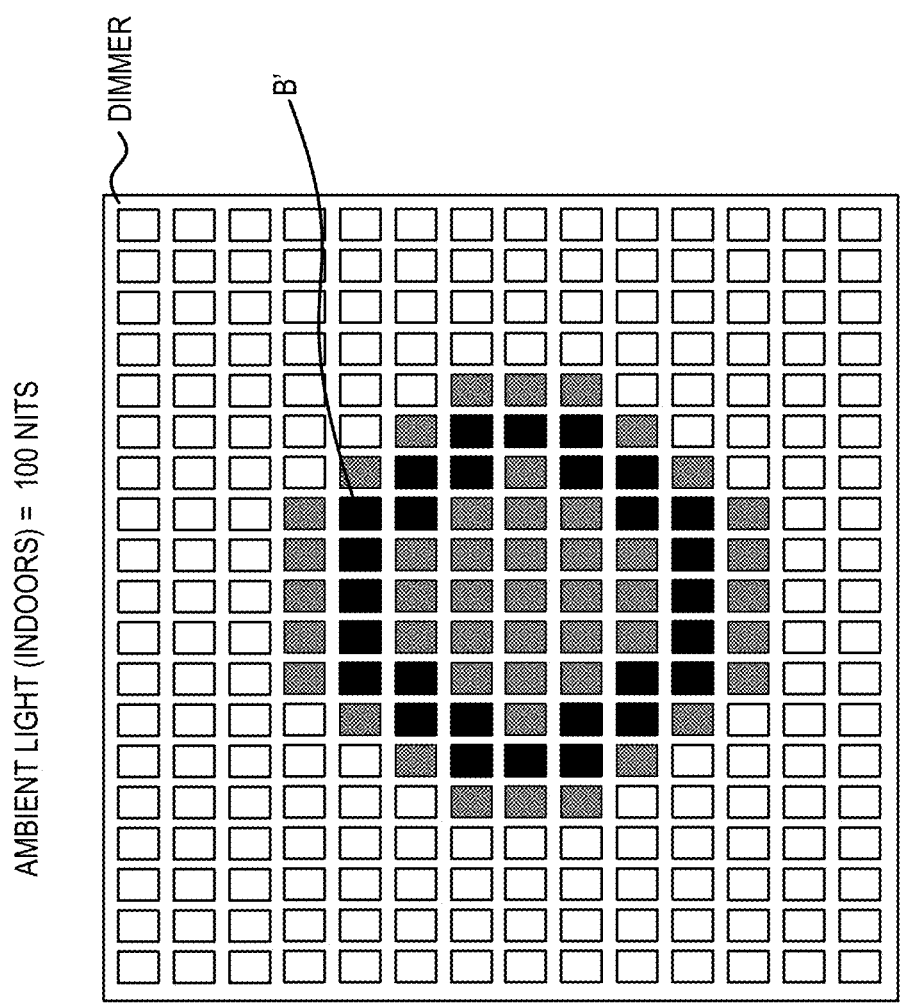
FIG. 16 illustrates an example in which a dimmed area includes a center portion within an annular region.

FIG. 16 illustrates an example in which dimmed area B' further includes the center portion within the annular region.

Figure 17:
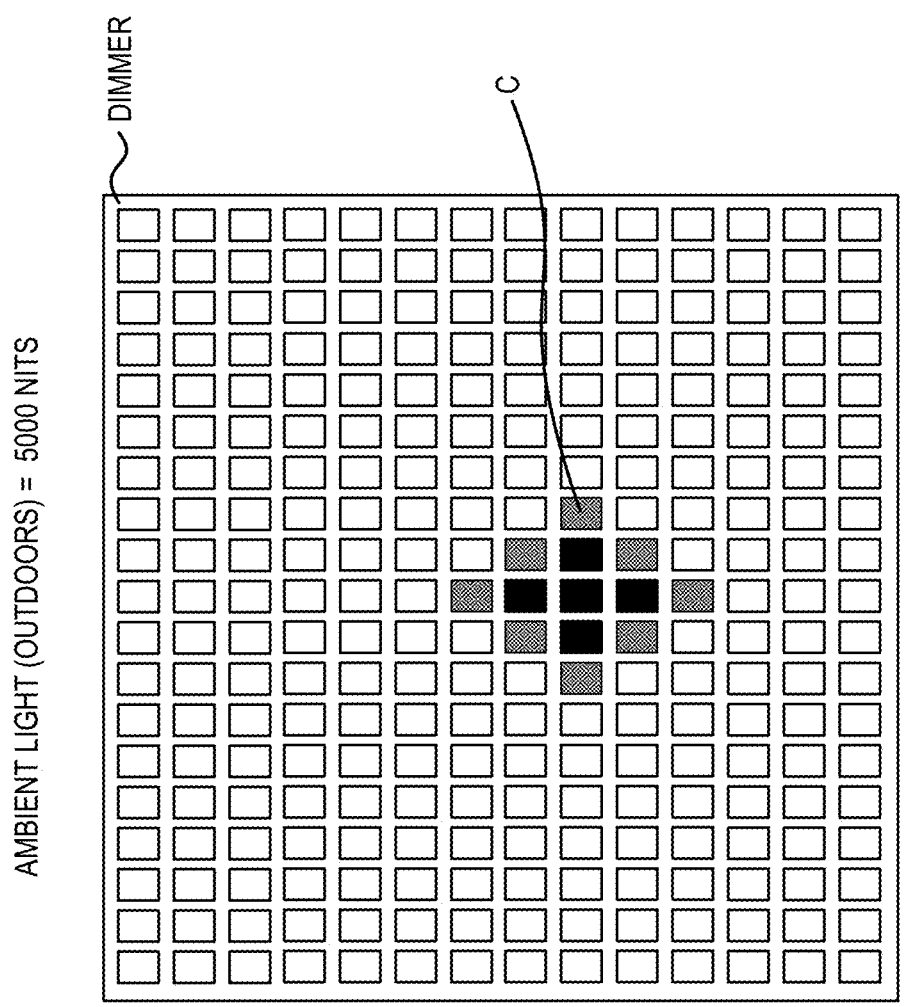
FIG. 17 illustrates a dimmer having been adjusted to produce a dimmed area determined using a gaze vector calculated using a center of rotation of an eye.

FIG. 17 illustrates a dimmer having been adjusted to produce dimmed area C determined using a gaze vector calculated using the center of rotation of the eye.

Figure 18A:
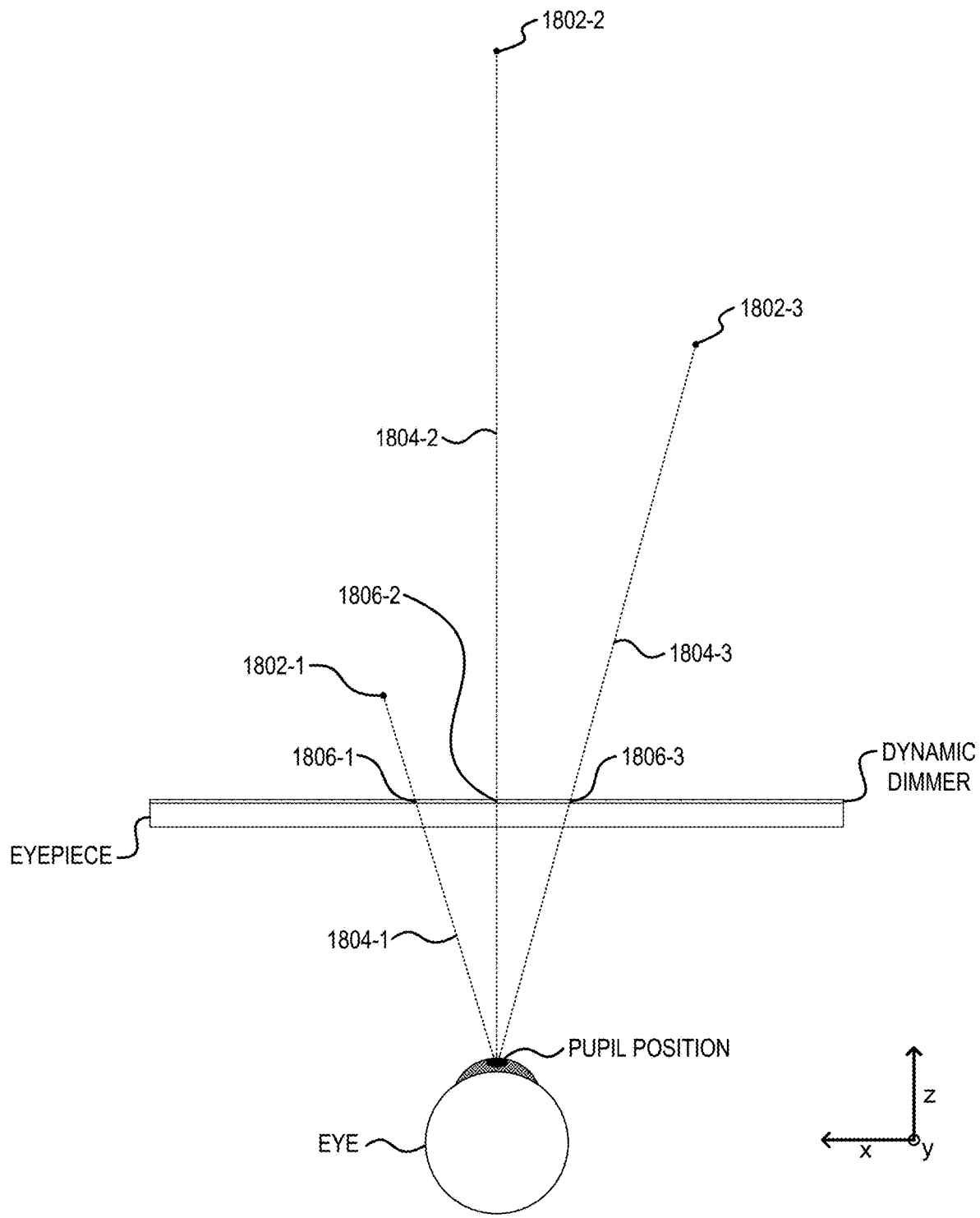
FIGS. 18A and 18B illustrate an approach for determining a portion of the system field of view to be dimmed based on image information.
Figure 18B:
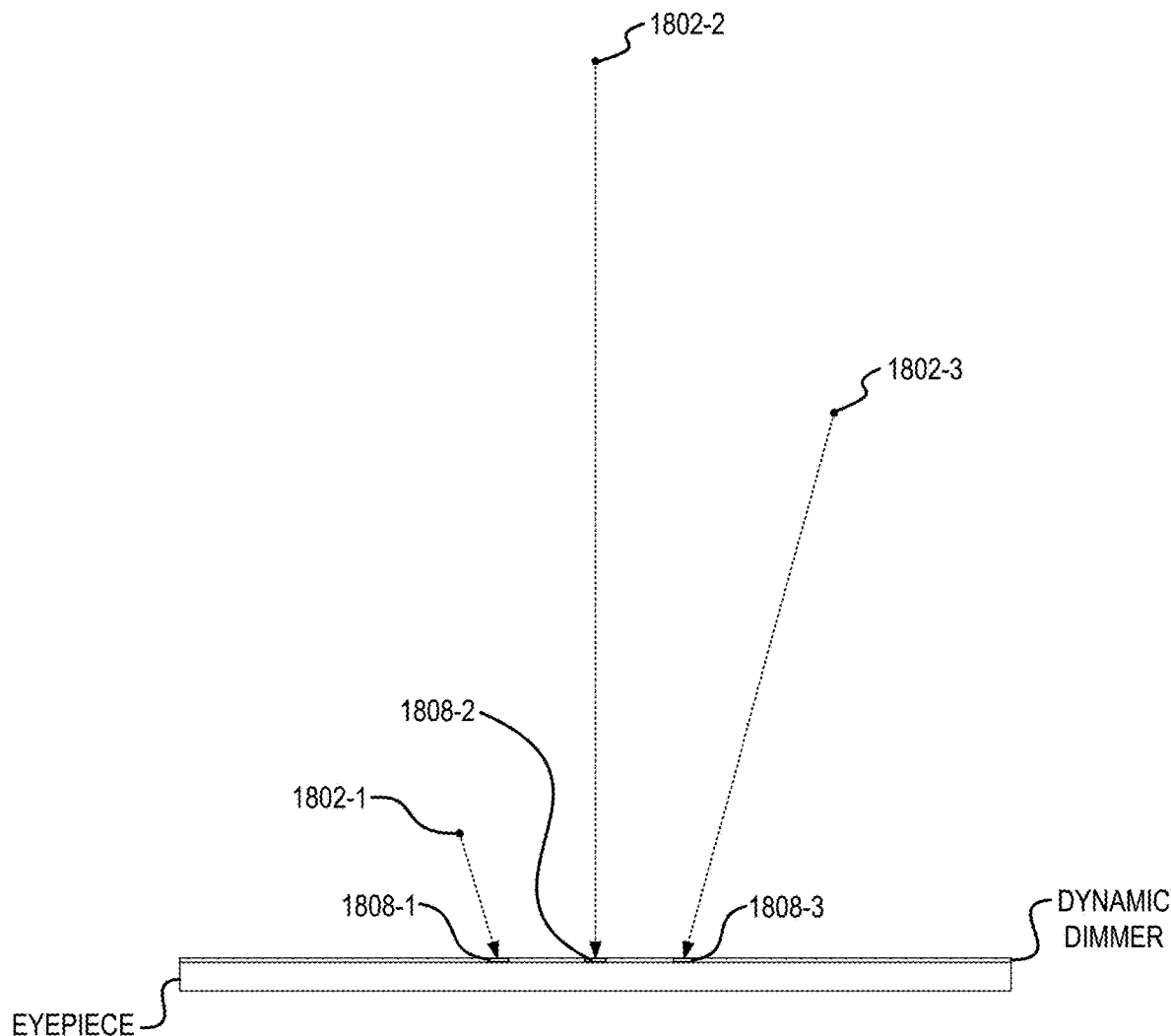

FIGS. 18A and 18B illustrate an approach for determining a portion of the system field of view to be dimmed based on image information. For example, one or more steps shown in FIGS. 18A and 18B may correspond to steps 410 and/or 412. In some embodiments, the AR device may project light onto the eyepiece in such a way that virtual content is perceived by the user at various points in space beyond the eyepiece and the dynamic dimmer, such as points 1802. Points 1802 may, for example, correspond to locations in three-dimensional space including locations at which pixels of virtual content (e.g., one or more virtual objects) are to be perceived by the user when presented through the eyepiece, locations at which dark virtual content (e.g., a virtual "shadow" cast by or otherwise associated with virtual content presented through the eyepiece) is to be perceived by the user, locations physically occupied by one or more real-world objects or persons located in the user's environment (e.g., a virtual black "top hat" anchored to the head of someone in the user's environment), and the like. In some implementations, points 1802 may be randomly sampled from the virtual content or, in some embodiments, points 1802 may be selected based on key features of the virtual content, such as edges, corners, centers of surfaces, among other possibilities. In some embodiments, points 1802 may be sampled from the outer perimeter of the virtual content (as viewed from a reference point). In other embodiments, or in the same embodiments, an image brightness of the virtual content is also determined at each of points 1802, which may be used to determine a level of dimming (i.e., dimming value) at points 1802 to achieve a desired visibility V of the virtual content. The number of points 1802 used may vary based on a speed-accuracy tradeoff.

To dim in alignment with the perceived virtual content, vectors 1804 may be defined as intersecting each of points 1802 and the pupil position (i.e., a reference point). Intersection points 1806 may then be defined at each location where vectors 1804 intersect with the dynamic dimmer. As shown in reference to FIG. 18B, dimmed portions 1808 may be determined based on intersection points 1806. In some implementations, one or more ray- or cone-casting techniques may be employed to define vectors 1804 and identify or otherwise determine intersection points 1806. In some embodiments, each of dimmed portions 1808 may be set to an area encompassing each of intersection points 1806, or to particular pixels of the dynamic dimmer encompassing intersection points 1806. In some embodiments, the size of dimmed portions 1808 may be a function of the number of sampled points 1802 and/or the density of points 1802. For example, in some instances the size of dimmed portions 1808 may be inversely proportional to the number of points 1802. In embodiments in which points 1802 are sampled from the outer perimeter of the virtual content, dimmed portions 1808 may be formed by connecting neighboring intersection points 1806 and dimming the enclosed area. In some examples, the size and/or shading of dimmed portions 1808 may be a function of determined distances from the reference point to intersection points 1806, determined distances from intersection points 1806 to points 1802, or a combination thereof. In the example of FIGS. 18A and 18B, the pupil position (e.g., center of the pupil), which is the location from which vectors 1804 are defined (i.e., a reference point), may change over time as eye movement occurs. As such, the locations of intersection points 1806 and dimmed portions 1808 may also change over time as eye movement occurs.

Figure 19A:
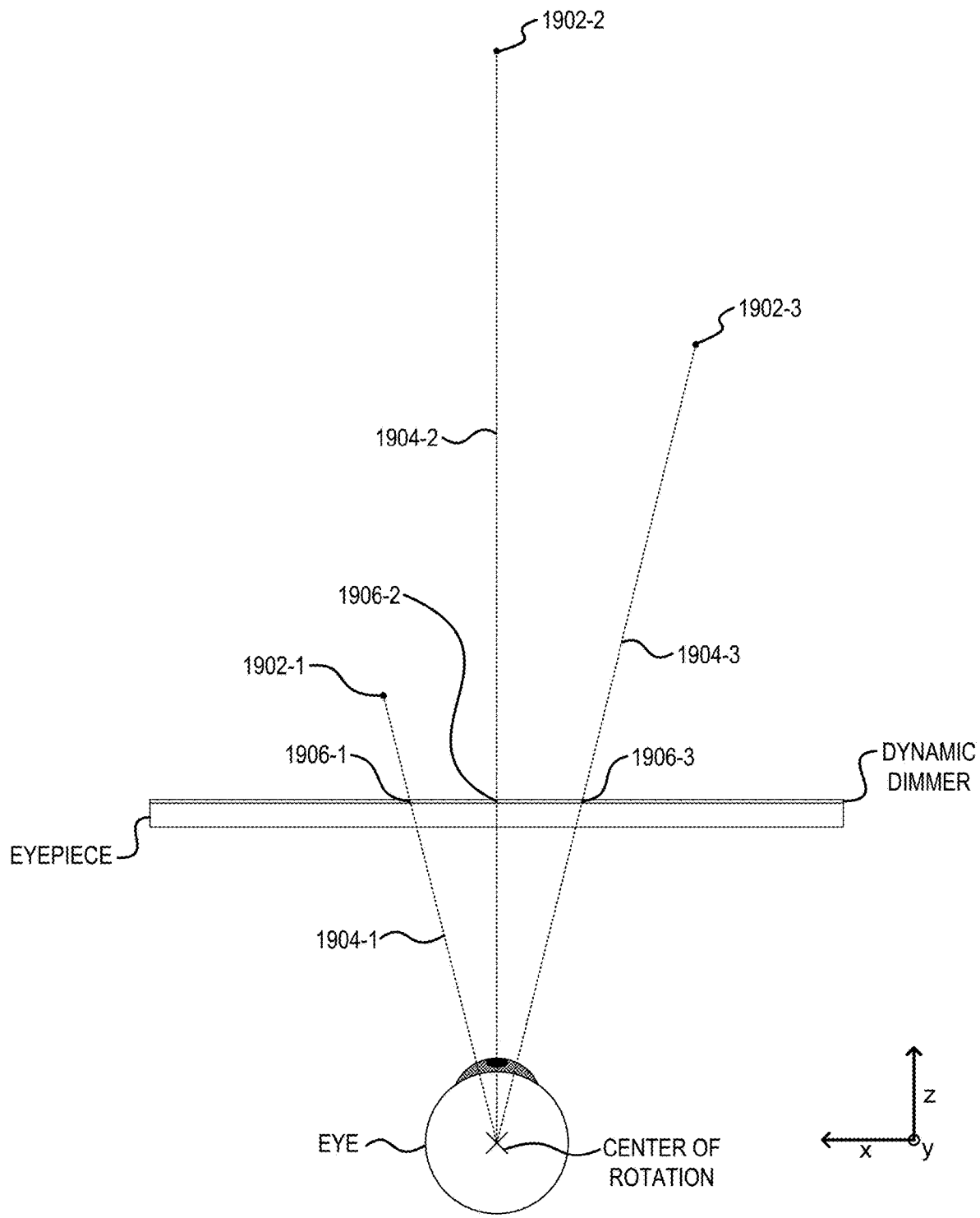

FIGS. 19A and 19B illustrate an approach for determining a portion of the system field of view to be dimmed based on image information similar to shown in reference to FIGS. 18A and 18B but with a different reference point. Points 1902 may represent different points in space where the virtual content is perceived by the user. Vectors 1904 may be defined as intersecting each of points 1902 and the center of rotation of the eye (i.e., a reference point). Intersection points 1906 may then be defined at each location where vectors 1904 intersect with the dynamic dimmer. As shown in reference to FIG. 19B, dimmed portions 1908 may be determined based on intersection points 1906. In some embodiments, each of dimmed portions 1908 may be set to an area encompassing each of intersection points 1906 or to particular pixels of the dynamic dimmer encompassing intersection points 1906. In some examples, the size and/or shading of dimmed portions 1908 may be a function of determined distances from the reference point to intersection points 1906, determined distances from intersection points 1906 to points 1902, or a combination thereof. The position of the center of rotation of the eye, which is the location from which vectors 1904 are defined (i.e., a reference point) in the example of FIGS. 19A and 19B, may be more stable over time as eye movement occurs than that of the pupil position, which is the reference point in the example of FIGS. 18A and 18B. It follows that, in the example of FIGS. 19A and 19B, the locations of intersection points 1906 and dimmed portions 1908 may remain static or change relatively little over time as eye movement occurs. Although the pupil position and the center of rotation of the eye are described above in reference to FIGS. 18A, 18B, 19A, and 19B as examples of reference points that may be utilized in determining a portion of the system field of view to be dimmed, it is to be understood that examples of such reference points may also include any of a variety of other locations along the optical axis of the eye. Systems and techniques for identifying the optical axis of the eye and the locations of particular anatomical regions of the eye that lie along the optical axis, such as the center of the pupil and the center of rotation of the eye, are described in further detail in U.S. Application No. 62/618,559, filed on Jan. 17, 2018, titled "EYE CENTER OF ROTATION DETERMINATION, DEPTH PLANE SELECTION, AND RENDER CAMERA POSITIONING IN DISPLAY SYSTEMS," which, as mentioned above, is incorporated by reference herein in its entirety.

Figure 20:
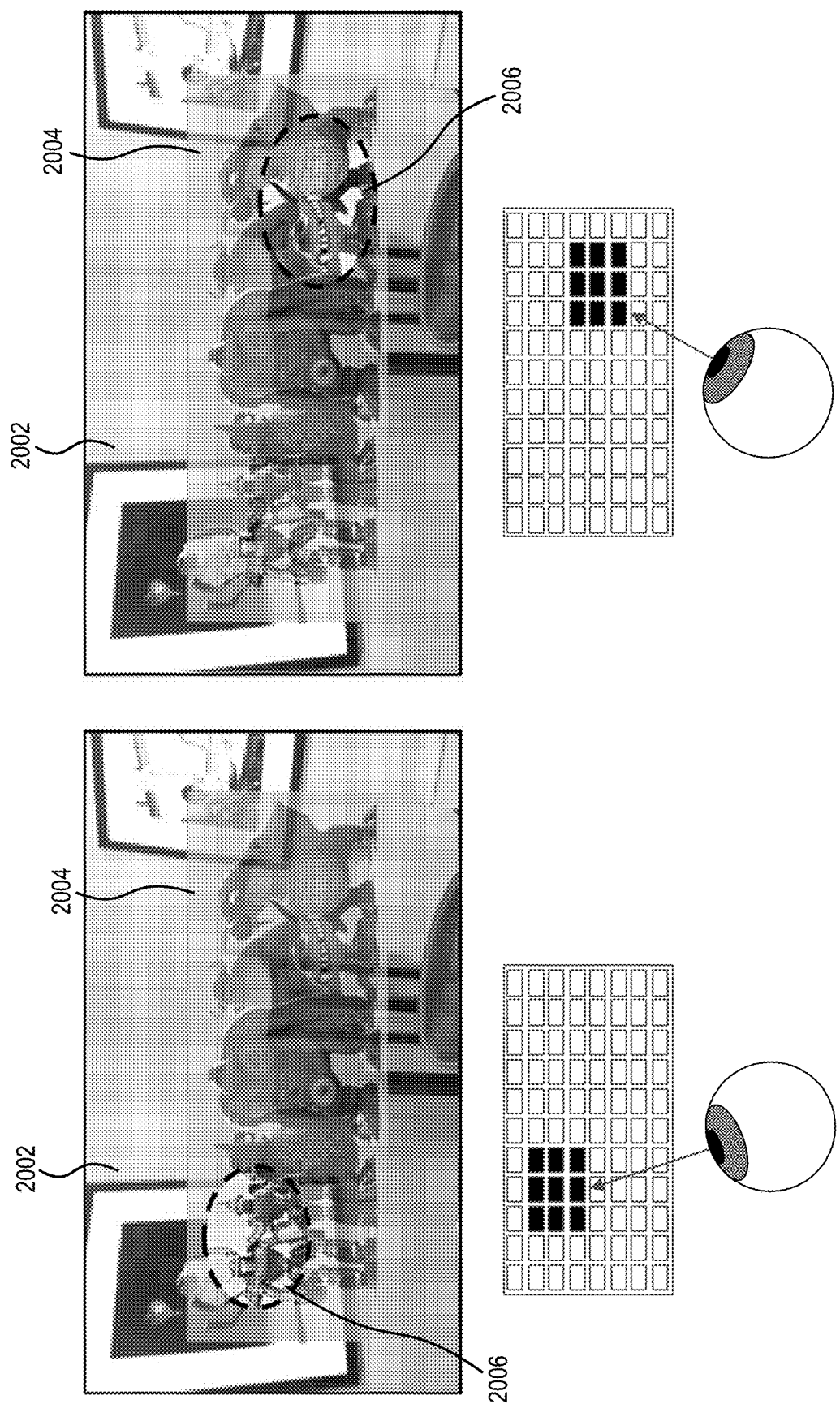
FIG. 20 illustrates an example of improving the opacity of the virtual content by adjusting the dimmer and/or adjusting the projector.

FIG. 20 illustrates examples of improving the solidity of displayed virtual content using any of the techniques described herein, such as adjusting the dimmer and/or adjusting the projector based on light information, gaze information, and/or image information. In reference to both the left and right side field of views, virtual content 2004 which is displayed alongside world objects 2002 appears washed out except for portions 2006 of virtual content 2004 where the virtual content appears more solid than the remaining portions of virtual content 2004. As shown in the illustrated examples, the solidity of the virtual content is improved only at the portions of the system field of view where the user is looking.

Figure 21:
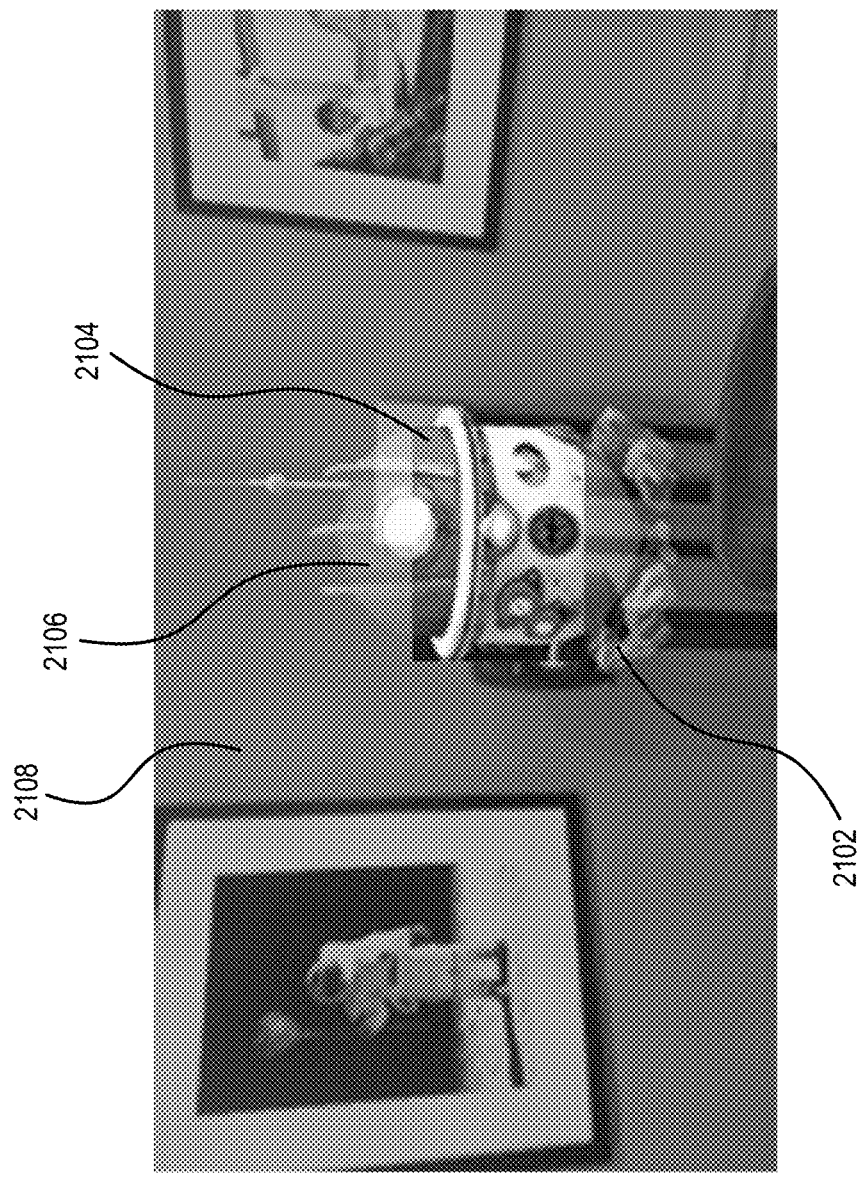
FIG. 21 illustrates an example of improving the opacity of the virtual content by dimming a portion of the system field of view corresponding to the virtual object.

FIG. 21 illustrates an example of improving the solidity of a displayed virtual object 2102 by dimming a portion of the system field of view corresponding to the virtual object. As illustrated, the opacity and visibility of a portion 2104 of virtual object 2102 in the region with dimming is relatively greater than that of a portion 2106 of virtual object 2102 in the region without dimming. By dimming the light associated with world objects 2108 at portion 2104, the virtual content can be more clearly perceived by the user.

Figure 22:
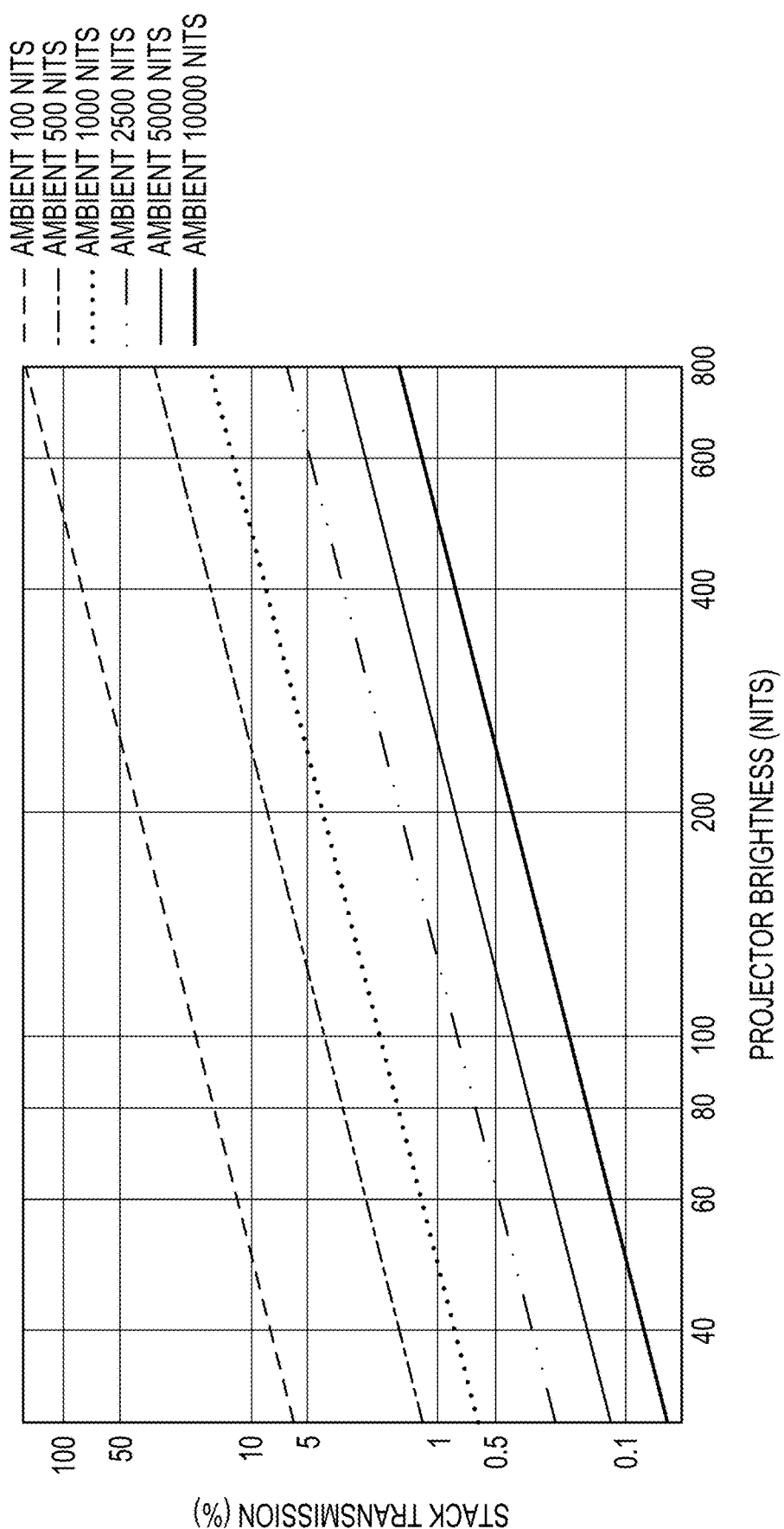
FIG. 22 illustrates a plot showing the relationship between virtual image brightness and ambient light levels.

FIG. 22 illustrates a plot showing the relationship between virtual image light brightness (x-axis) and ambient light levels for maintaining a visibility equal to 0.7 (i.e., V=0.7). The solid slanted lines are fixed visibility level lines (for V=0.7) for different ambient light level conditions. For example, for a projector brightness of 200 nits being used in an indoor area of about 100 nits, a dimming level close to 30% may be employed to keep the visibility close to 0.7. Referring once again to the visibility equation described above in reference to FIG. 4, in some examples, the x and y axes of the plot illustrated in FIG. 22 may correspond to $I_{max}$ and $T_v$, respectively, while the solid slanted lines are fixed visibility level lines (for V=0.7) for different $I_{world}$ values.

Figure 23A:
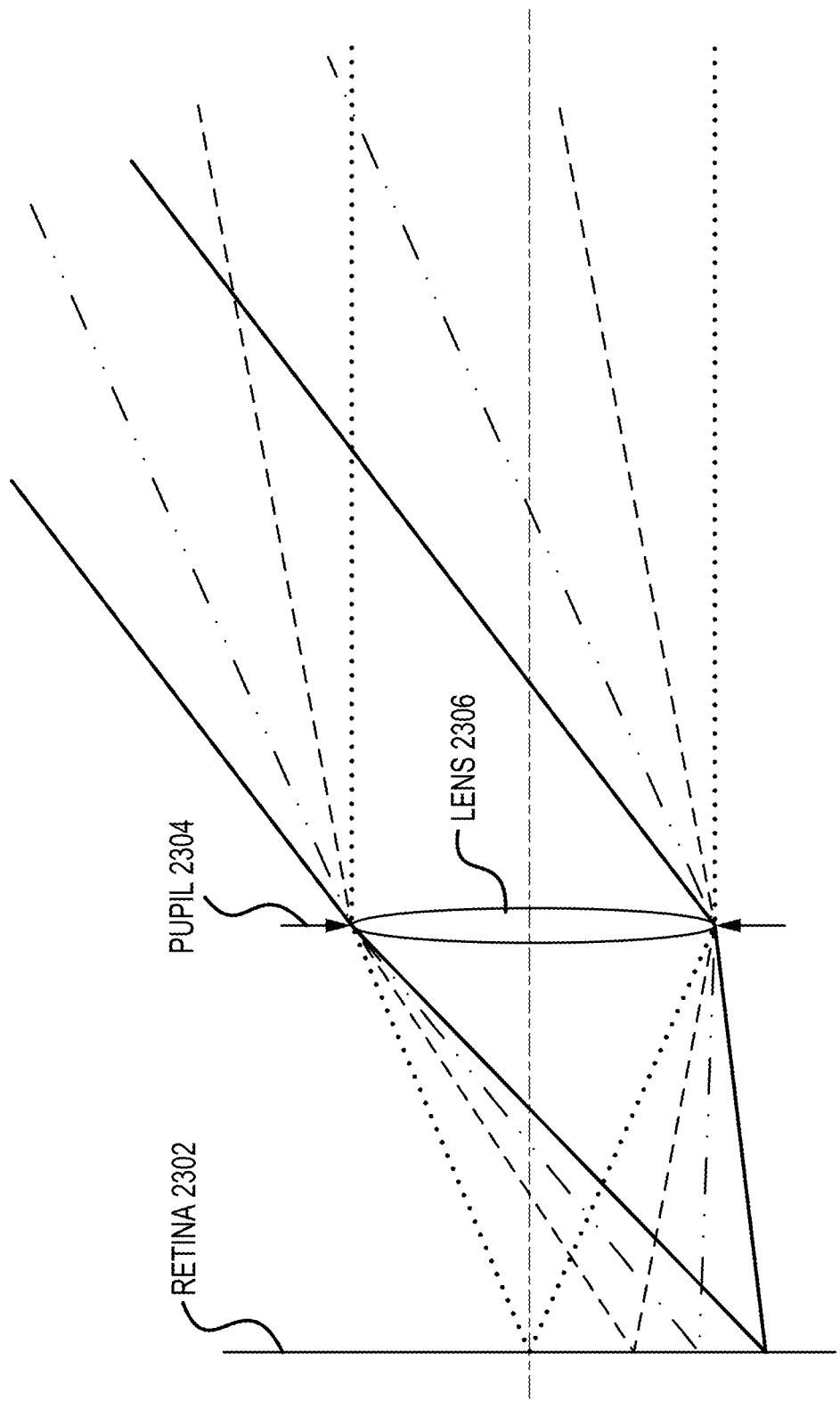
FIGS. 23A and 23B illustrate diagrams showing the effect of a small occlusion on a world scene.
Figure 23B:
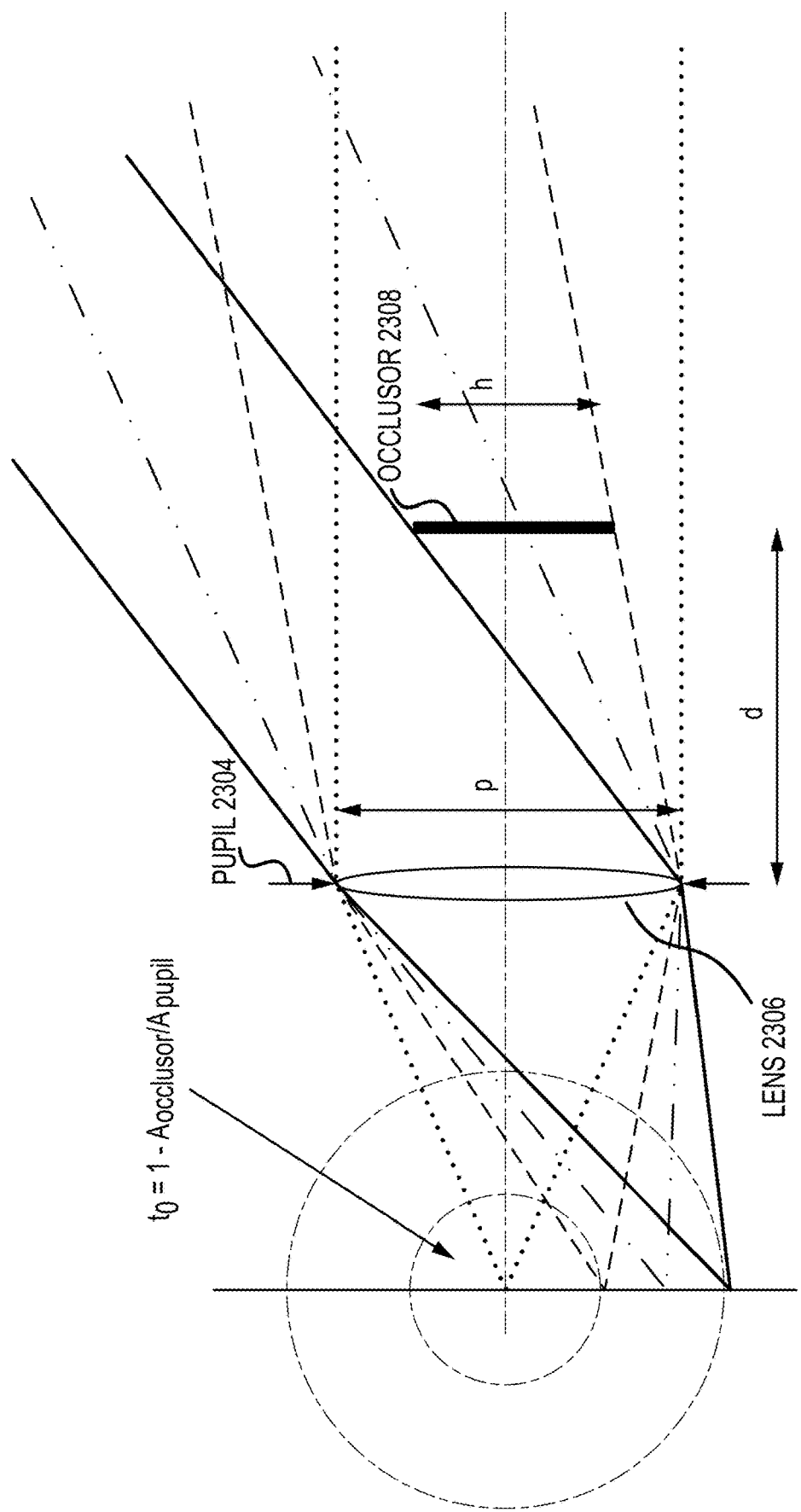

FIGS. 23A and 23B illustrate diagrams showing the effect of a small occlusion on a world scene. FIG. 23A illustrates a simple case in which an eye of the user is looking at infinity. The eye includes a retina 2302, a pupil 2304, and a lens 2306. Light from different angles are focused to different positions on retina 2302. FIG. 23B shows an occlusor 2308 placed in front of the eye at a distance d away from pupil 2304. A gradient disk at the retina may be constructed using simple ray geometry. Ignoring diffraction, the relative transmission at the center of the gradient disk is $t_0=1-(h/p)^2$, where h is the diameter of the occlusor and p is the diameter of the pupil. Put another way, to $=1-A_{occlusor}/A_{pupil}$, where $A_{ocausor}$ is the area of the occlusor and $A_{pupil}$ is the area of the pupil.

Figure 24:
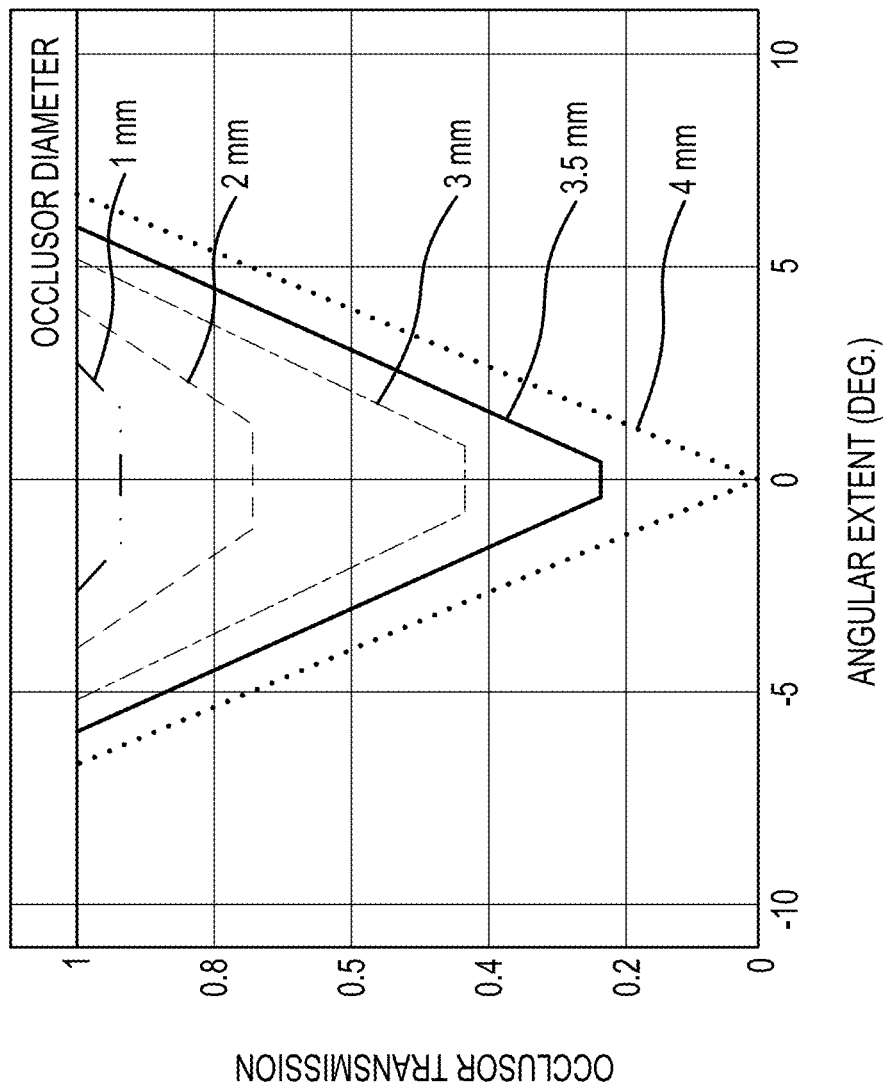
FIG. 24 illustrates a plot showing the effect of varying the occlusor diameter on the transmission of the dimming element as a function of angular extent.

FIG. 24 illustrates a plot showing the effect of varying the occlusor diameter on the transmission of the dimming element as a function of angular extent (in degrees). As illustrated, a smaller occlusor diameter (e.g., 1 mm) has very little effect on the transmission but is much more stable over angular extent than a larger occlusor diameter (e.g., 4 mm) which has a higher effect on the transmission which varies significantly over angular extent.

Figure 25:
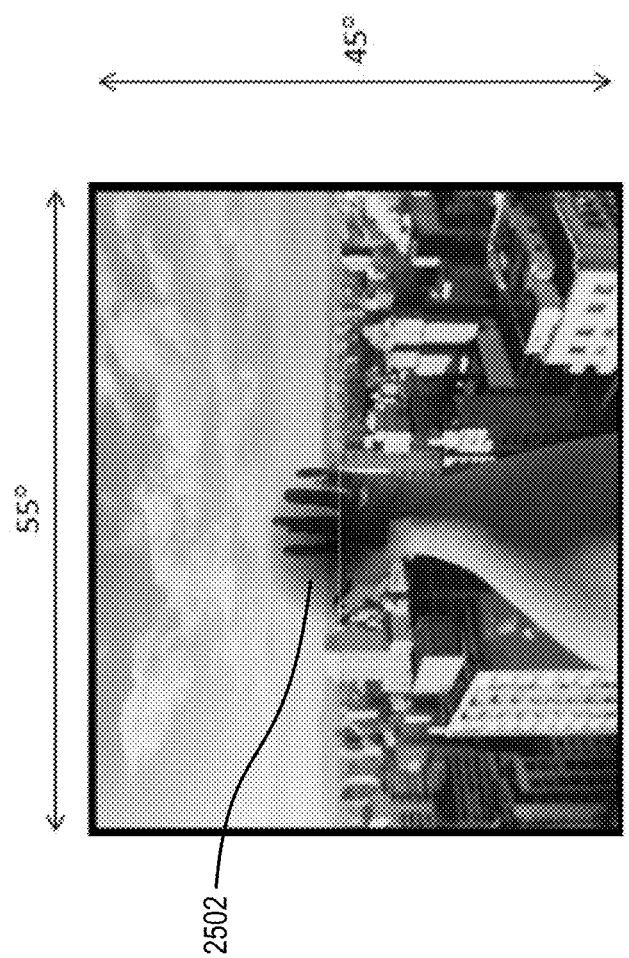
FIG. 25 illustrates an example of dimming using a single occlusor.

FIG. 25 illustrates an example of dimming using a single occlusor in which d=17 mm, p=4 mm, and h=1 mm. The dimmed area shows a point spread function (PSF) 2502 of a single pixel. Using the dimming shown, the pixel size requirement for the particular dimming element used can be estimated as a 200 μm pixel.

Figure 26:
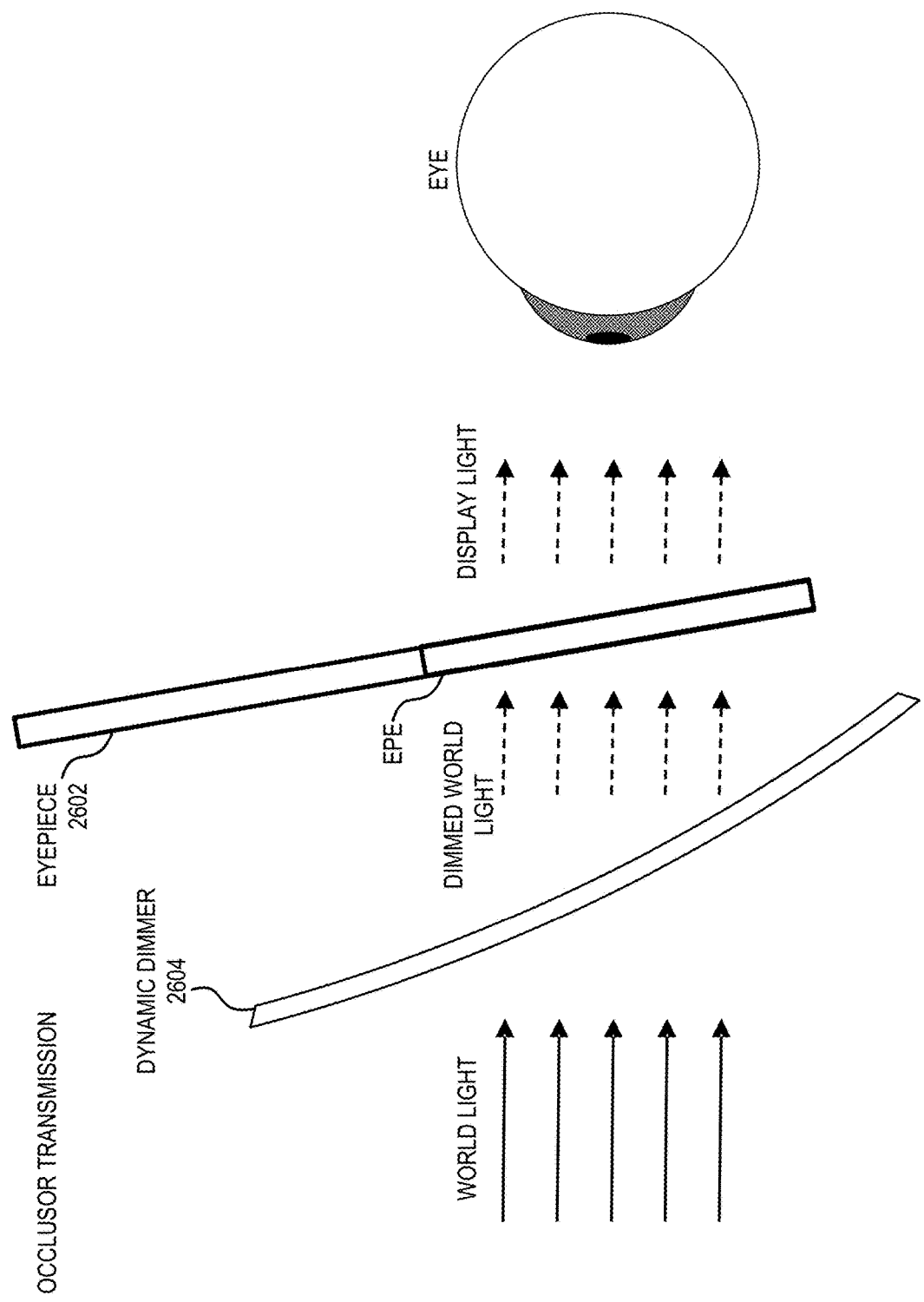
FIG. 26 illustrates an example of an architecture of an optical see through (OST) head-mounted display (HMD).

FIG. 26 illustrates an example of an architecture of an OST head-mounted display (HMD) consisting of a diffractive waveguide eyepiece 2602 that delivers the virtual content to the user's eyes. The diffractive waveguide eyepiece 2602 may include one or more diffractive optical elements (DOEs), such as an in-coupling grating (ICG), an orthogonal pupil expander (OPE), and/or an exit pupil expander (EPE). The world light also passes through the same element to reach the user's eyes. As shown, a dynamic dimmer 2604 allows management of the world light level to keep the virtual content at a certain opacity level. In some embodiments, the dimmer 2604 may correspond to a pixelated dimming element that is functionally similar or equivalent to pixelated dimming element 503 as described above in reference to FIG. 5. In other embodiments, the dimmer 2604 may correspond to a global (non-pixelated) dimming element. As shown in FIG. 26, in some implementations, the dimmer 2604 may be shaped and curved independent of the eyepiece so as to improve the aesthetics and/or the functionality of the OST-HMD.

Figure 27:
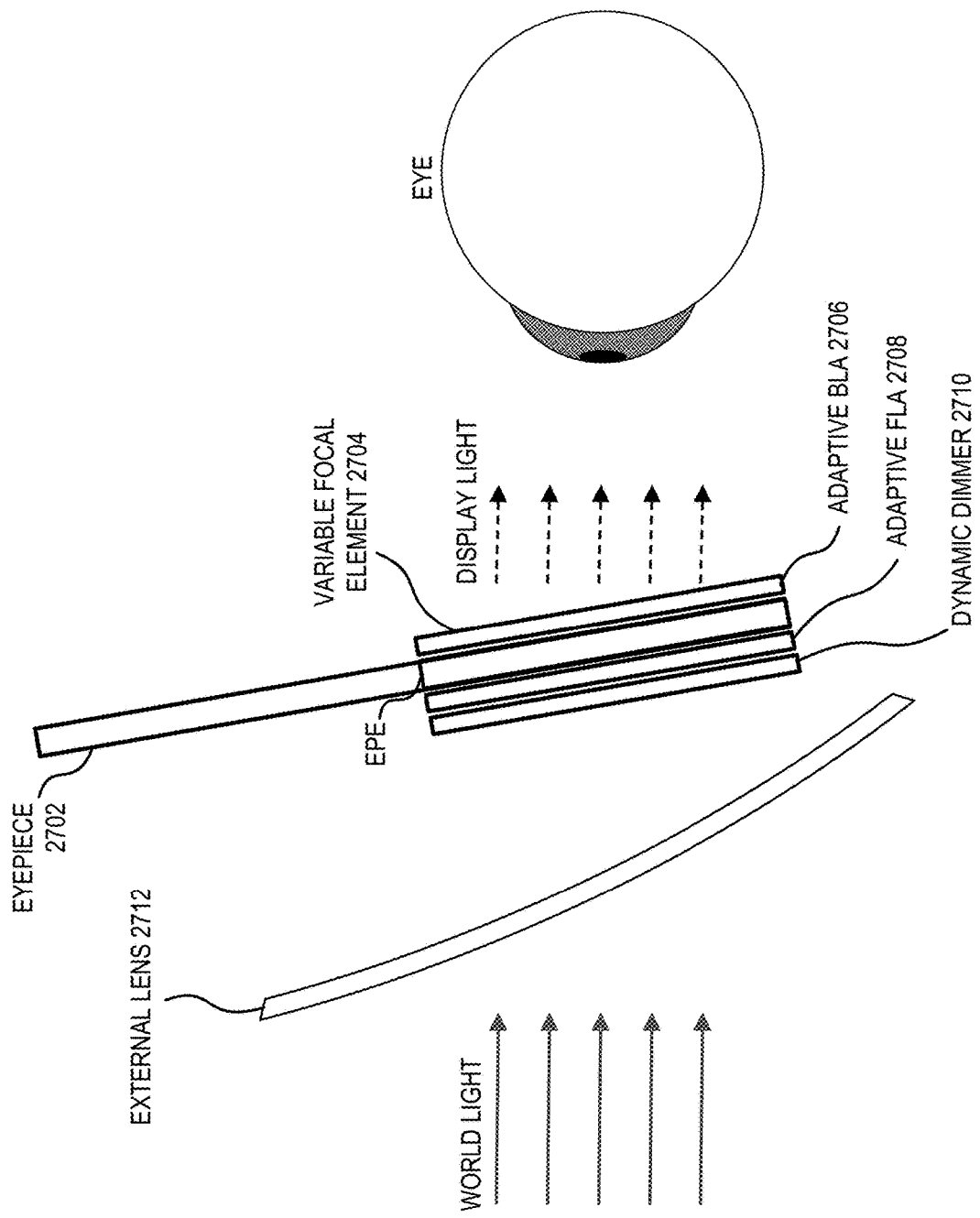
FIG. 27 illustrates an additional example of an architecture of an OST-HMD.

FIG. 27 illustrates an additional example of an architecture of an OST-HMD consisting of a micro-display (e.g., LCOS, MEMS, or fiber scanner display type) that delivers light with a relay optics system into an in-coupling grating of a diffractive waveguide structure. The waveguide structure may include an outcoupling grating (e.g., EPE) that magnifies the input image plane and delivers to the user's eyebox. As shown, various elements may be positioned between the user's eye and the world objects. An eyepiece 2702 may be a diffractive waveguide combiner that delivers the virtual light to the user's eye and also allows the world light to transmit through. A variable focal element 2704 may consist of a depth plane variation/switching element between the eye and the eyepiece to act on the virtual display. In some embodiments, variable focus element 2704 is a back lens assembly (BLA) 2706. The BLA also invariably acts on the world light and therefore a front lens assembly (FLA) 2708 is added to cancel the impact on the world display.

A dynamic dimming element 2710 in this embodiment is mounted on the outside of the integrated stack. This allows switching from a transparent display for an AR mode to an opaque display completely blocking out the world light for a VR mode. The dimming element 2710 may correspond to a global dimming element or a pixelated dimming element. An external lens 2712 is positioned separate from the optical stack so as to provide a protective and/or supportive structure for the OST-HMD. External lens 2712 may also provide an amount of dimming to the entire system field of view.

Figure 28:
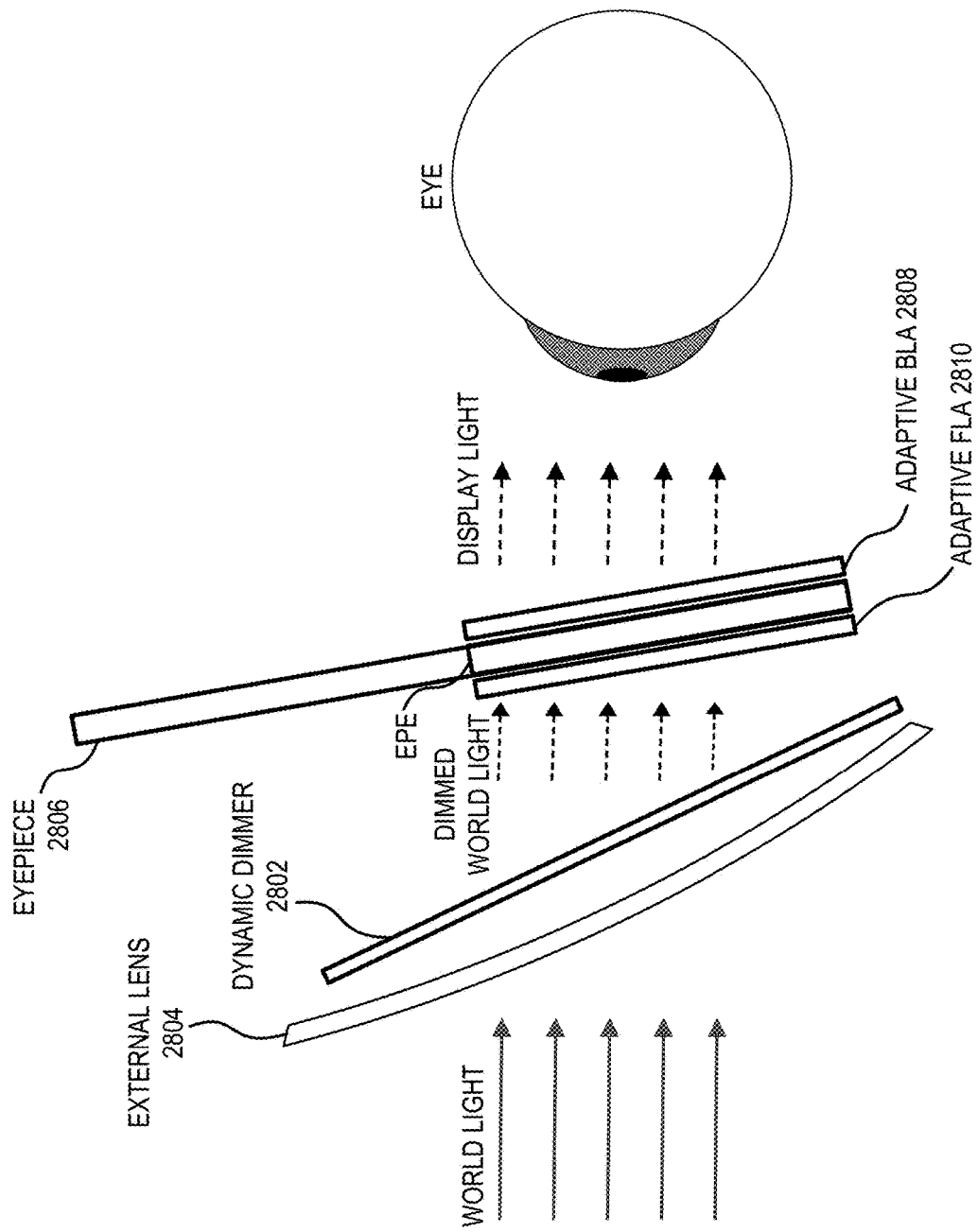
FIG. 28 illustrates an additional example of an architecture of an OST-HMD.

FIG. 28 illustrates an additional example of an architecture of an OST-HMD in which a flat dynamic dimmer 2802 is positioned along the inside of a curved external cosmetic lens 2804. The dimmer 2802 may correspond to a global dimming element or a pixelated dimming element. In some embodiments, external cosmetic lens 2804 may provide an amount of dimming to the entire system field of view which may be accounted for when determining the spatially-resolved dimming values of the dynamic dimmer. The OST-HMD may also include an eyepiece 2806, an adaptive BLA 2808, and an adaptive FLA 2810, as described herein.

Figure 29:
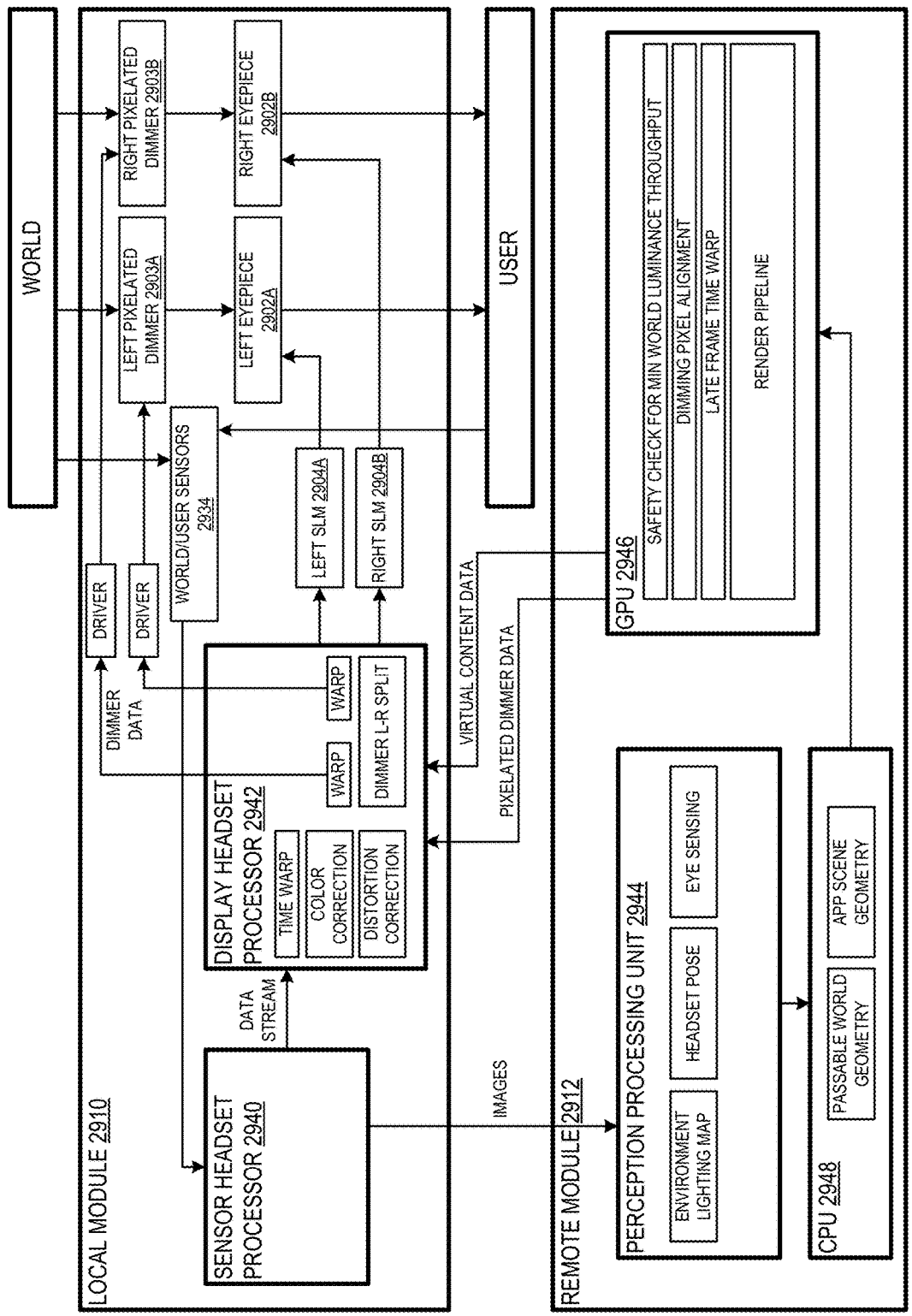
FIG. 29 illustrates a schematic view of an AR device according to the present invention.

FIG. 29 illustrates a schematic view of an AR device 2900 according to the present invention. AR device 2900 generally includes a local module 2910 and a remote module 2912. Partitioning of components of AR device 2900 between local module 2910 and remote module may allow separation of bulky and/or high power-consuming components from those positioned close to the user's head when AR device 2900 is in use, thereby increasing user comfort as well as device performance. Local module 2910 may be head mounted and may include various mechanical and electronic modules to facilitate control of pixelated dimmers 2903 and spatial light modulators 2904. Control of spatial light modulators 2904 may cause virtual content to be projected onto eyepieces 2902 which, in conjunction with world light modified by dimmers 2903, are viewed by the user of AR device 2900. One or more sensors 2934 of local module 2910 may detect information from the world and/or the user and send the detected information to a sensor headset processor 2940 which may send a data stream to a display headset processor 2942 of local module 2910 and raw or processed images to perception processing unit 2944 of remote module 2912.

In some embodiments, one or more components of local module 2910 may be similar to one or more components described with reference to FIG. 3. For example, in such embodiments, the functionality of eyepieces 2902 and dimmers 2903 may be similar to that of eyepieces 302 and dimmers 303, respectively. In some examples, the one or more sensors 2934 may include one or more world cameras, ambient light sensors, and/or eye trackers similar to one or more of world cameras 306, ambient light sensor 334, and/or eye trackers 340, respectively. In some embodiments, the functionality of spatial light modulators 2904 may be similar to that of one or more components included in projectors 314, and the functionality of one or both of the sensor headset processor 2940 and the display headset processor 2942 may be similar to that of one or more components included in processing module 350.

In some embodiments, display headset processor 2942 may receive virtual content data and pixelated dimmer data from a graphics processing unit (GPU) 2946 of remote module 2912 and may perform various correction and warping techniques prior to controlling pixelated dimmers 2903 and spatial light modulators 2904. Dimmer data generated by display headset processor 2942 may pass through one or more drivers which may modify or generate voltages for controlling dimmers 2903. In some embodiments, display headset processor 2942 may receive a depth image and a headset pose from sensor headset processor 2940 which can be used to improve the accuracy of the dimming and the projected virtual content.

Remote module 2912 may be electrically coupled to local module 2910 through one or more wired or wireless connections, and may be fixedly attached to the user or carried by the user, among other possibilities. Remote module 2912 may include a perception processing unit 2944 for performing/generating an environment lighting map, a headset pose, and eye sensing.

Perception processing unit 2944 may send data to a CPU 2948 which may be configured to perform/generate passable world geometry and app scene geometry. CPU 2948 may send data to GPU 2946 which may be configured to perform a check for a minimum world luminance throughput, a dimming pixel alignment, a late frame time warp, and a render pipeline, among other operations. In some embodiments, CPU 2948 may be integrated with GPU 2946 such that a single processing unit may perform one or more of the functions described in reference to each. In some embodiments, the functionality of one or more of the components included in remote module 2912 may be similar to that of one or more components included in processing module 350.

Figure 30:
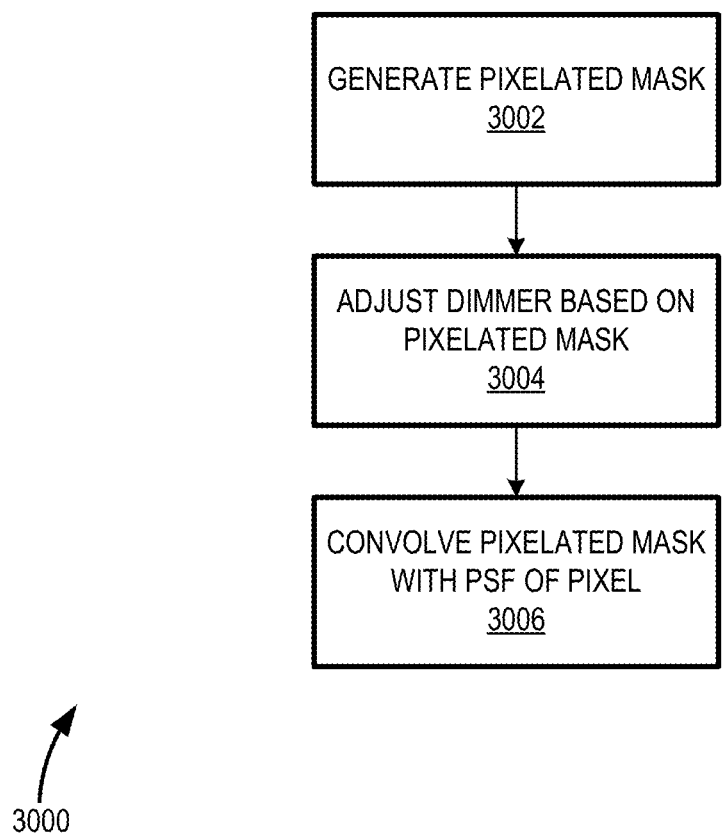
FIG. 30 illustrates a method for sharpening out-of-focus pixelated dimming.

FIG. 30 illustrates a method 3000 for sharpening out-of-focus pixelated dimming. Method 3000 may be used in addition to method 400 to improve the performance of the dimmer. For example, one or more steps of method 3000 may be performed prior to step 416 and/or subsequent to step 414. Steps of method 3000 may be performed in a different order than that shown in FIG. 30, and not all of the steps need be performed. For example, in some embodiments, one or more of steps 3002, 3004, and 3006 may be omitted during performance of method 3000. One or more steps of method 3000 may be performed by a processor (e.g., processor 352) or by some other component within the AR device.

At step 3002, a pixelated mask is generated. When method 3000 is used in conjunction with method 400, the pixelated mask may be generated based on the portion of the system field of view to be dimmed determined in step 412 and/or the dimming values determined in step 414 (i.e., dimmed area 236). In some embodiments, the pixelated mask may be generated using one or both of the techniques described in reference to FIGS. 31 and 32.

At step 3004, the dimmer is adjusted in accordance with the pixelated mask. For example, each pixel of the dimmer may be set to a particular dimming value as indicated by the pixelated mask. For examples in which method 3000 is used in conjunction with method 400, one or more operations of step 3004 may at least in part correspond to one or more operations of step 416.

At step 3006, the user looks through the dimmer and the observable dimming (to the user) is equivalent to the pixelated mask convolved with the PSF of a single pixel. Accordingly, step 3006 is inherently performed by the optics of the eye when the user is wearing the AR device, rather than being performed directly by a component of the AR device. On the other hand, steps 3002 and 3004 may, for example, be performed by one or more components of the AR device.

Figure 31:
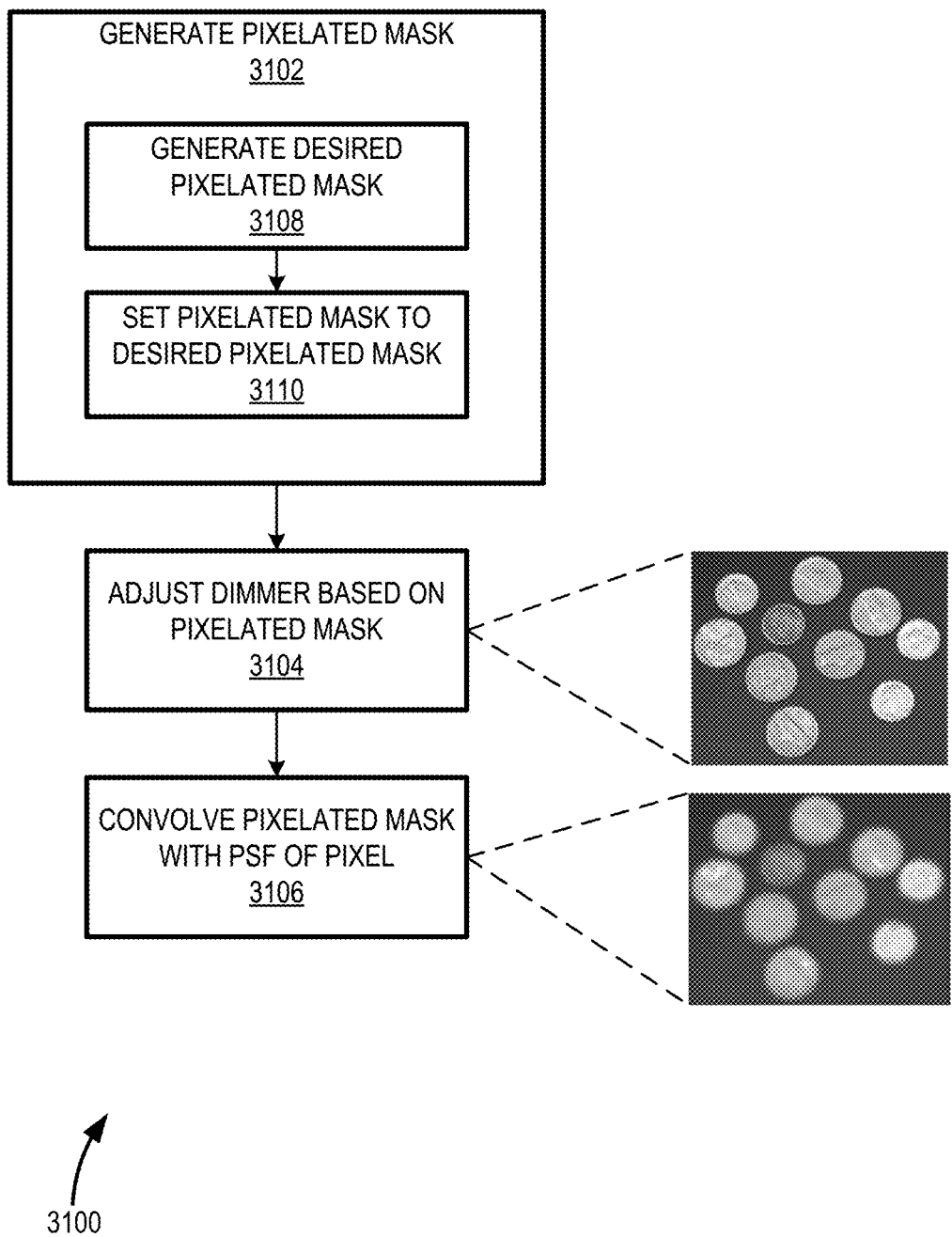
FIG. 31 illustrates a method for sharpening out-of-focus pixelated dimming.

FIG. 31 illustrates a method 3100 for sharpening out-of-focus pixelated dimming in which step 3102 comprises step 3108 at which a desired pixelated mask is generated and step 3110 at which the pixelated mask is set to the desired pixelated mask. The observable dimming to the user (shown adjacent to step 3106) is significantly blurred in comparison to the pixelated mask (shown adjacent to step 3104) due to the smearing caused by the PSF of a single pixel. In some embodiments, one or more steps of method 3100 may correspond to one or more steps of method 3000.

Figure 32:
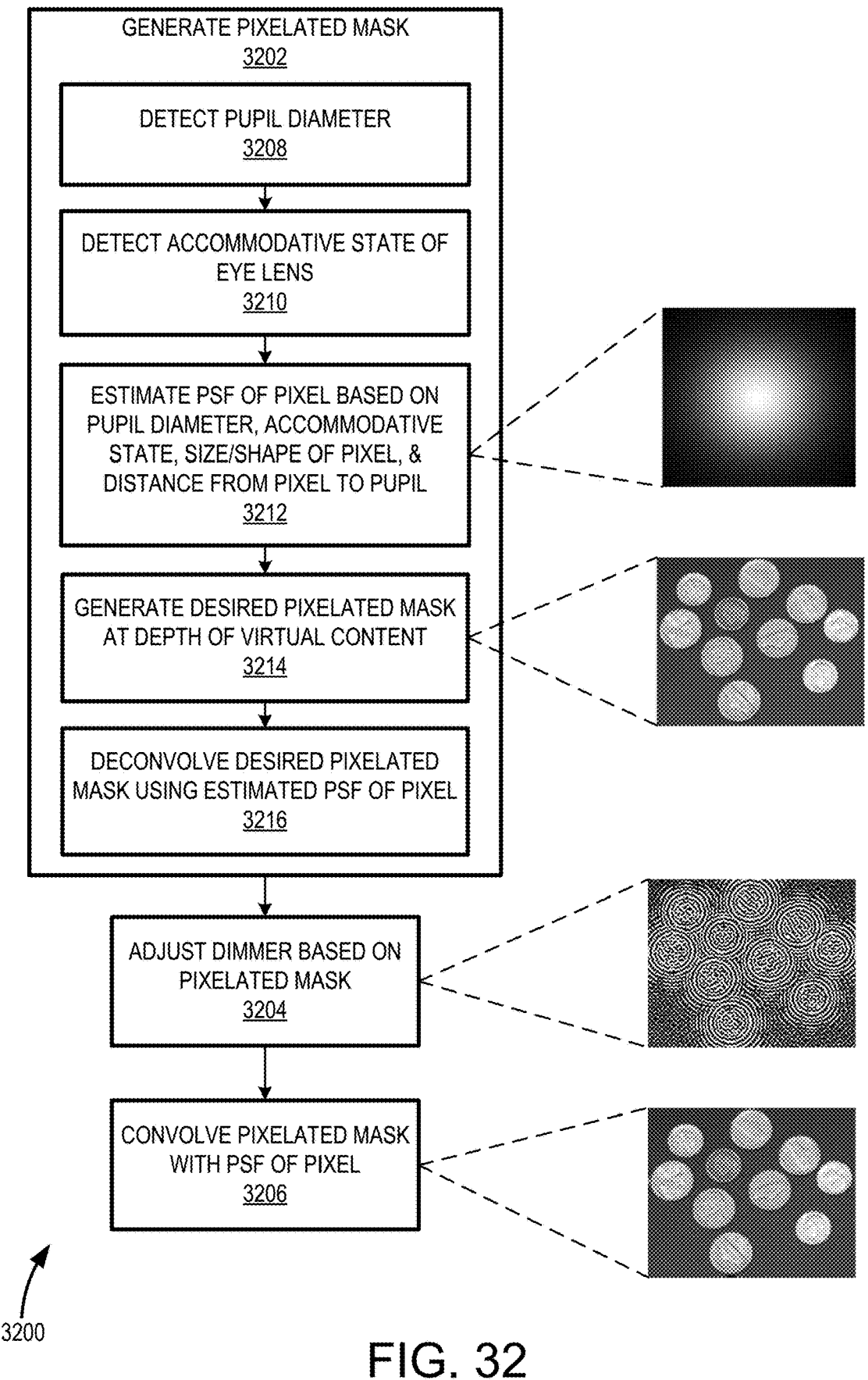
FIG. 32 illustrates a method for sharpening out-of-focus pixelated dimming.

FIG. 32 illustrates a method 3200 for sharpening out-of-focus pixelated dimming in which step 3202 includes a deconvolution technique. At step 3208, the diameter of the pupil of the eye of the user is detected using a sensor directed at the eye (e.g., a camera such as eye tracker 240). At step 3210, the accommodative state of the eye lens is detected using the same or a different sensor as used in step 3208.

At step 3212, the PSF of a single pixel is estimated based on the pupil diameter, the accommodative state of the eye lens, the size/shape of a pixel, and the distance from a pixel to the pupil. Where the shape of a pixel can be approximated using a circle, the size/shape of a pixel may be represented as diameter h, the pupil diameter as diameter p, and the distance from a pixel to the pupil as distance d (using the nomenclature established in FIGS. 23A and 23B). In some embodiments, the distance from a pixel to the pupil may be different for different pixels of the dimmer such that the estimated PSF may be pixel dependent. In some embodiments, the distance from the centermost pixel to the pupil is used as an approximation for the remaining pixels.

At step 3214, a desired pixelated mask at the depth of the virtual content is generated. At step 3216, the desired pixelated mask is deconvolved using the estimated PSF of a single pixel. In some embodiments, the deconvolution is performed in the spatial frequency domain by dividing the Fourier Transform of the desired pixelated mask at the depth of the virtual content by the Fourier Transform of the estimated PSF of a single pixel and performing an inverse-Fourier Transform. Alternatively or additionally, the deconvolution may be performed dividing the Fourier Transform of the estimated PSF of a single pixel by the Fourier Transform of the desired pixelated mask at the depth of the virtual content and performing an inverse-Fourier Transform. The pixelated mask used subsequently in step 3204 is set to the result of the deconvolution.

As a result of performing method 3200, the observable dimming to the user (shown adjacent to step 3206) is significantly less blurred in comparison to the technique in method 3100 despite the dissimilarity between the pixelated mask (shown adjacent to step 3204) and the desired pixelated mask (shown adjacent to step 3214). In some embodiments, one or more steps of method 3200 may correspond to one or more steps of methods 3000 and 3100. In some embodiments, one or more steps of method 3200 may be omitted or modified.

Figure 33:
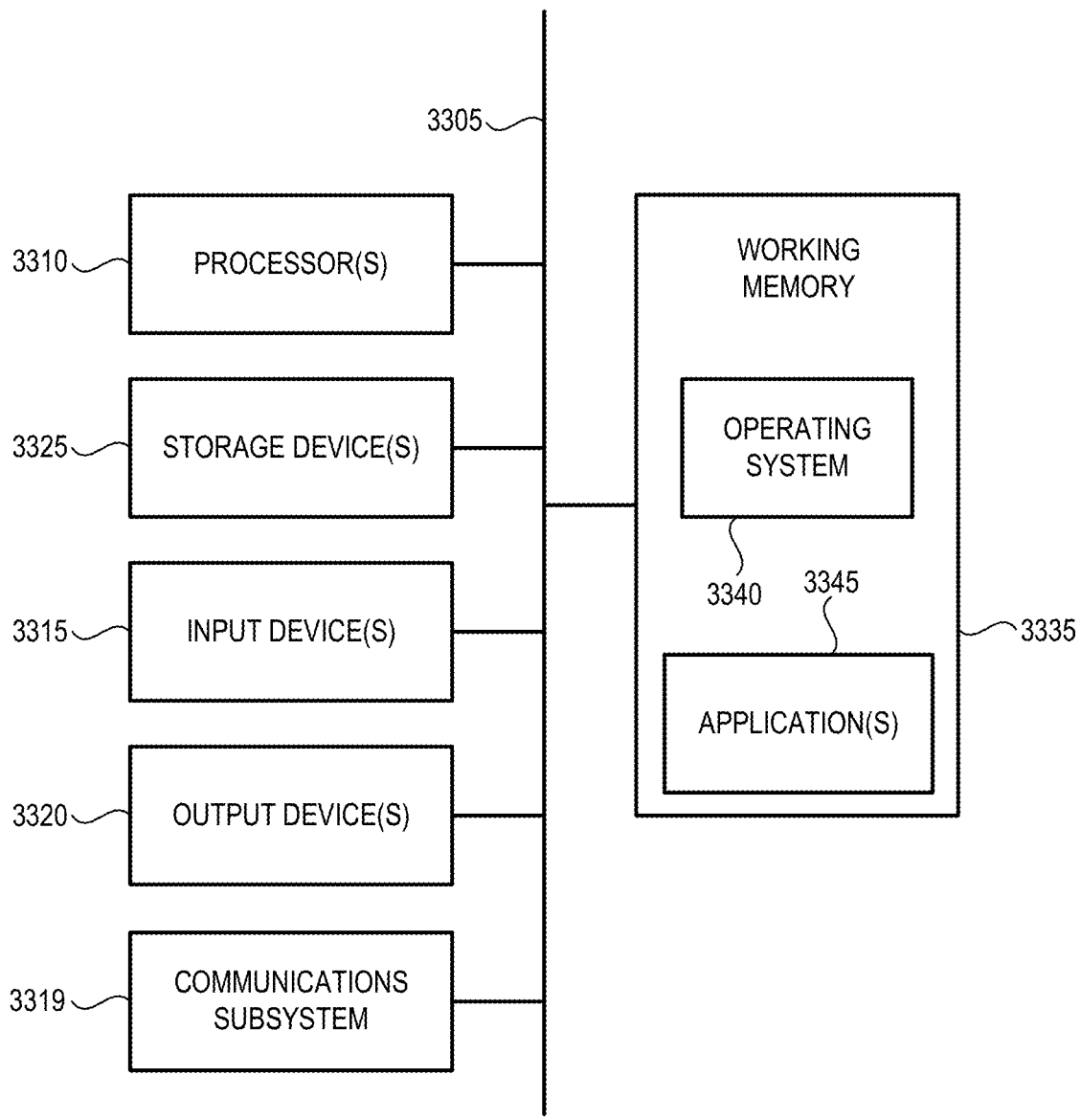
FIG. 33 illustrates a simplified computer system according to some embodiments described herein.

FIG. 33 illustrates a simplified computer system 3300 according to some embodiments described herein. Computer system 3300 as illustrated in FIG. 33 may be incorporated into devices such as AR device 200 or 300 as described herein. FIG. 33 provides a schematic illustration of one example of computer system 3300 that can perform some or all of the steps of the methods provided by various embodiments. It should be noted that FIG. 33 is meant only to provide a generalized illustration of various components, any or all of which may be utilized as appropriate. FIG. 33, therefore, broadly illustrates how individual system elements may be implemented in a relatively separated or relatively more integrated manner.

Computer system 3300 is shown comprising hardware elements that can be electrically coupled via a bus 3305, or may otherwise be in communication, as appropriate. The hardware elements may include one or more processors 3310, including without limitation one or more general-purpose processors and/or one or more special-purpose processors such as digital signal processing chips, graphics acceleration processors, and/or the like; one or more input devices 3315, which can include without limitation a mouse, a keyboard, a camera, and/or the like; and one or more output devices 3320, which can include without limitation a display device, a printer, and/or the like.

Computer system 3300 may further include and/or be in communication with one or more non-transitory storage devices 3325, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

Computer system 3300 might also include a communications subsystem 3319, which can include without limitation a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. The communications subsystem 3319 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 3319. In other embodiments, a portable electronic device, e.g. the first electronic device, may be incorporated into computer system 3300, e.g., an electronic device as an input device 3315. In some embodiments, computer system 3300 will further comprise a working memory 3335, which can include a RAM or ROM device, as described above.

Computer system 3300 also can include software elements, shown as being currently located within the working memory 3335, including an operating system 3340, device drivers, executable libraries, and/or other code, such as one or more application programs 3345, which may comprise computer programs provided by various embodiments, and/or may be designed to implement methods, and/or configure systems, provided by other embodiments, as described herein. Merely by way of example, one or more procedures described with respect to the methods discussed above, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 3325 described above. In some cases, the storage medium might be incorporated within a computer system, such as computer system 3300. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by computer system 3300 and/or might take the form of source and/or installable code, which, upon compilation and/or installation on computer system 3300 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as computer system 3300 to perform methods in accordance with various embodiments of the technology. According to a set of embodiments, some or all of the procedures of such methods are performed by computer system 3300 in response to processor 3310 executing one or more sequences of one or more instructions, which might be incorporated into the operating system 3340 and/or other code, such as an application program 3345, contained in the working memory 3335. Such instructions may be read into the working memory 3335 from another computer-readable medium, such as one or more of the storage device(s) 3325. Merely by way of example, execution of the sequences of instructions contained in the working memory 3335 might cause the processor(s) 3310 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In embodiments implemented using computer system 3300, various computer-readable media might be involved in providing instructions/code to processor(s) 3310 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 3325. Volatile media include, without limitation, dynamic memory, such as the working memory 3335.

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 3310 for execution. Merely by way of example, the instructions may initially be carried on a magnetic disk and/or optical disc of a remote computer. A remote computer might load the instructions into its dynamic memory and send the instructions as signals over a transmission medium to be received and/or executed by computer system 3300.

The communications subsystem 3319 and/or components thereof generally will receive signals, and the bus 3305 then might carry the signals and/or the data, instructions, etc. carried by the signals to the working memory 3335, from which the processor(s) 3310 retrieves and executes the instructions. The instructions received by the working memory 3335 may optionally be stored on a non-transitory storage device 3325 either before or after execution by the processor(s) 3310.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of operating an optical system, the method comprising:
   receiving, at the optical system, light associated with a world object;
   detecting world light information for the light associated with the world object, the world light information including a plurality of spatially-resolved world light values;
   determining a first portion of a system field of view of the optical system to be at least partially dimmed based on the plurality of spatially-resolved world light values;
   generating, at a projector of the optical system, virtual image light to be projected onto an eyepiece of the optical system, the virtual image light representing one or more virtual objects to be displayed;
   projecting the virtual image light onto the eyepiece;
   detecting virtual image information for the virtual image light, the virtual image information including a plurality of spatially-resolved virtual image brightness values;
   determining a second portion of the system field of view of the optical system to be at least partially dimmed based on the plurality of spatially-resolved virtual image brightness values, wherein the second portion of the system field of view is different from the first portion of the system field of view;
   combining the first portion of the system field of view and the second portion of the system field of view into a combined portion of the system field of view; and
   adjusting a dimmer to reduce an intensity of the light associated with the world object in the combined portion of the system field of view.

2. The method of claim 1, wherein the optical system comprises a light sensor configured to detect the world light information.

3. The method of claim 1, wherein the optical system comprises an eye tracker configured to detect gaze information corresponding to an eye of a user of the optical system, wherein a third portion of the system field of view of the optical system to be at least partially dimmed is determined based on the gaze information.

4. The method of claim 1, further comprising:
   determining a plurality of spatially-resolved dimming values for the combined portion of the system field of view based on detected information, wherein the dimmer is adjusted according to the plurality of dimming values.

5. The method of claim 1, wherein the dimmer comprises a plurality of pixels.

6. A non-transitory computer-readable medium comprising instructions that, when executed by a processor, cause the processor to perform operations comprising:
   receiving, at an optical system, light associated with a world object;
   detecting world light information for the light associated with the world object, the world light information including a plurality of spatially-resolved world light values;
   determining a first portion of a system field of view of the optical system to be at least partially dimmed based on the plurality of spatially-resolved world light values;
   generating, at a projector of the optical system, virtual image light to be projected onto an eyepiece of the optical system, the virtual image light representing one or more virtual objects to be displayed;
   projecting the virtual image light onto the eyepiece;
   detecting virtual image information for the virtual image light, the virtual image information including a plurality of spatially-resolved virtual image brightness values;
   determining a second portion of the system field of view of the optical system to be at least partially dimmed based on the plurality of spatially-resolved virtual image brightness values, wherein the second portion of the system field of view is different from the first portion of the system field of view;
   combining the first portion of the system field of view and the second portion of the system field of view into a combined portion of the system field of view; and
   adjusting a dimmer to reduce an intensity of the light associated with the world object in the combined portion of the system field of view.

7. The non-transitory computer-readable medium of claim 6, wherein the optical system comprises a light sensor configured to detect the world light information.

8. The non-transitory computer-readable medium of claim 6, wherein the optical system comprises an eye tracker configured to detect gaze information corresponding to an eye of a user of the optical system, wherein a third portion of the system field of view of the optical system to be at least partially dimmed is determined based on the gaze information.

9. The non-transitory computer-readable medium of claim 6, wherein the operations further comprise:
determining a plurality of spatially-resolved dimming values for the combined portion of the system field of view based on detected information, wherein the dimmer is adjusted according to the plurality of dimming values.

10. The non-transitory computer-readable medium of claim 6, wherein the dimmer comprises a plurality of pixels.

11. An optical system comprising:
a projector configured to project virtual image light onto an eyepiece;
a dimmer configured to dim light associated with a world object;
a processor communicatively coupled to the projector and the dimmer, wherein the processor is configured to perform operations comprising:
generating the virtual image light to be projected onto the eyepiece, the virtual image light representing one or more virtual objects to be displayed;
detecting virtual image information for the virtual image light, the virtual image information including a plurality of spatially-resolved virtual image brightness values;
determining a second portion of the system field of view of the optical system to be at least partially dimmed based on the plurality of spatially-resolved virtual image brightness values, wherein the second portion of the system field of view is different from the first portion of the system field of view;
combining the first portion of the system field of view and the second portion of the system field of view into a combined portion of the system field of view; and
adjusting the dimmer to reduce an intensity of the light associated with the world object in the combined portion of the system field of view.

12. The optical system of claim 11, further comprising:
a light sensor configured to detect the world light information.

13. The optical system of claim 11, further comprising:
an eye tracker configured to detect gaze information corresponding to an eye of a user of the optical system, wherein a third portion of the system field of view of the optical system to be at least partially dimmed is determined based on the gaze information.

\* \* \* \* \*